United States Patent
Slepchenkov et al.

(10) Patent No.: US 12,391,132 B2
(45) Date of Patent: Aug. 19, 2025

(54) MODULE-BASED ENERGY SYSTEMS CAPABLE OF CASCADED AND INTERCONNECTED CONFIGURATIONS, AND METHODS RELATED THERETO

(71) Applicant: TAE Technologies, Inc., Foothill Ranch, CA (US)

(72) Inventors: Mikhail Slepchenkov, Lake Forest, CA (US); Roozbeh Naderi, Foothill Ranch, CA (US)

(73) Assignee: TAE Technologies, Inc., Foothill Ranch, CA (US)

( * ) Notice: Subject to any disclaimer, the term of this patent is extended or adjusted under 35 U.S.C. 154(b) by 0 days.

(21) Appl. No.: 18/178,757

(22) Filed: Mar. 6, 2023

(65) Prior Publication Data
US 2023/0406120 A1 Dec. 21, 2023

Related U.S. Application Data

(63) Continuation of application No. 17/463,793, filed on Sep. 1, 2021, now Pat. No. 11,597,284, which is a
(Continued)

(51) Int. Cl.
*B60L 50/51* (2019.01)
*B60L 1/00* (2006.01)
(Continued)

(52) U.S. Cl.
CPC .............. *B60L 50/66* (2019.02); *B60L 1/00* (2013.01); *B60L 50/51* (2019.02); *B60L 58/18* (2019.02);
(Continued)

(58) Field of Classification Search
CPC ........ B60L 15/007; B60L 50/14; B60L 50/50; B60L 50/51; B60L 50/60; B60L 50/66;
(Continued)

(56) References Cited

U.S. PATENT DOCUMENTS 5,204,548 A 4/1993 Daehler et al.
5,428,522 A 6/1995 Millner et al.
(Continued)

FOREIGN PATENT DOCUMENTS

CA 2810369 3/2012
CN 201789411 4/2011
(Continued)

OTHER PUBLICATIONS

De Simone, "Modular Multilevel Converter with Integrated Storage System for Automotive Applications," Dissertation for the degree of Doctor of Electrical Engineering, Politecnico di Milano, Department of Electronics, Information and Bioengineering, Sep. 21, 2021, 181 pages.
(Continued)

*Primary Examiner* — Levi Gannon
(74) *Attorney, Agent, or Firm* — ALSTON & BIRD LLP

(57) ABSTRACT

Module-based energy systems are provided having multiple converter-source modules. The converter-source modules can each include an energy source and a converter. The systems can further include control circuitry for the modules. The modules can be arranged in various ways to provide single phase AC, multi-phase AC, and/or DC outputs. Each module can be independently monitored and controlled.

17 Claims, 43 Drawing Sheets

US 12,391,132 B2
Page 2

Related U.S. Application Data continuation of application No. 16/832,812, filed on Mar. 27, 2020, now Pat. No. 11,135,923.

(60) Provisional application No. 62/906,007, filed on Sep. 25, 2019, provisional application No. 62/826,238, filed on Mar. 29, 2019, provisional application No. 62/826,158, filed on Mar. 29, 2019.

(51) Int. Cl.
  *B60L 50/60* (2019.01)
  *B60L 58/18* (2019.01)
  *B60L 58/26* (2019.01)
  *H02J 3/28* (2006.01)
  *H02J 3/32* (2006.01)
  *H02J 3/46* (2006.01)
  *H02J 7/00* (2006.01)
  *H02J 7/14* (2006.01)
  *H02M 7/49* (2007.01)

(52) U.S. Cl.
  CPC .............. *B60L 58/26* (2019.02); *H02J 3/28* (2013.01); *H02J 3/32* (2013.01); *H02J 3/46* (2013.01); *H02J 7/0013* (2013.01); *H02J 7/0014* (2013.01); *H02J 7/00712* (2020.01); *H02J 7/1423* (2013.01); *H02J 7/1492* (2013.01); *H02M 7/49* (2013.01); *B60L 2210/40* (2013.01); *H02J 2310/48* (2020.01)

(58) Field of Classification Search
  CPC ...... B60L 58/18; B60L 58/26; B60L 2210/40; H02J 1/10; H02J 3/28; H02J 3/32; H02J 3/38; H02J 3/40; H02J 3/42; H02J 3/44; H02J 3/46; H02J 3/48; H02J 3/50; H02J 7/0013; H02J 7/0014; H02J 7/0047; H02J 7/00712; H02J 7/00714; H02J 7/00718; H02J 7/007182; H02J 7/007184; H02J 7/1423; H02J 7/1492; H02J 2207/20; H02J 2310/40; H02J 2310/48; H02M 7/49
  See application file for complete search history.

(56) References Cited

U.S. PATENT DOCUMENTS

| | | | |
|---|---|---|---|
| 5,642,275 A | 6/1997 | Peng et al. | |
| 5,905,371 A | 5/1999 | Limpaecher | |
| 5,933,339 A | 8/1999 | Duba et al. | |
| 5,949,664 A | 9/1999 | Bernet et al. | |
| 6,051,961 A | 4/2000 | Jang et al. | |
| 6,058,032 A | 5/2000 | Yamanaka et al. | |
| 6,064,180 A | 5/2000 | Sullivan et al. | |
| 6,236,580 B1 | 5/2001 | Aiello et al. | |
| 6,373,734 B1 | 4/2002 | Martinelli | |
| 7,091,701 B2 | 8/2006 | Turner et al. | |
| 7,485,987 B2 | 2/2009 | Mori et al. | |
| 8,395,280 B2 | 3/2013 | Graovac et al. | |
| 8,476,888 B1 | 7/2013 | Chen et al. | |
| 8,503,202 B2 | 8/2013 | Chimento et al. | |
| 8,614,525 B2 | 12/2013 | Teichmann et al. | |
| 8,829,723 B2 | 9/2014 | Graovac et al. | |
| 9,172,254 B2 | 10/2015 | Ganor | |
| 9,444,275 B2 | 9/2016 | Huang et al. | |
| 9,461,474 B2 | 10/2016 | Deboy et al. | |
| 9,621,073 B1 | 4/2017 | Liu et al. | |
| 9,673,732 B2 | 6/2017 | Deboy et al. | |
| 10,014,611 B2 | 7/2018 | Gotz | |
| 10,074,995 B2 | 9/2018 | Smedley et al. | |
| 10,193,359 B2 | 1/2019 | Ganor | |
| 10,218,189 B2 | 2/2019 | Goetz | |
| 10,291,037 B2 | 5/2019 | Birkl et al. | |
| 10,391,870 B2 | 8/2019 | Gotz et al. | |
| 10,396,682 B2 | 8/2019 | Gotz et al. | |
| 10,439,506 B2 | 10/2019 | Gotz | |
| 10,442,309 B2 | 10/2019 | Gotz | |
| 10,454,331 B2 | 10/2019 | Gotz | |
| 10,473,728 B2 | 11/2019 | Goetz | |
| 10,630,201 B2 | 4/2020 | Gotz et al. | |
| 10,700,587 B2 | 6/2020 | Gotz | |
| 10,759,284 B2 | 9/2020 | Jaensch et al. | |
| 10,784,698 B2 | 9/2020 | Jaensch et al. | |
| 10,840,714 B2 | 11/2020 | Gotz et al. | |
| 10,980,103 B2 | 4/2021 | Gotz et al. | |
| 10,985,551 B2 | 4/2021 | Gotz | |
| 10,998,739 B2 | 5/2021 | Hinterberger et al. | |
| 11,038,435 B2 | 6/2021 | Gotz | |
| 2003/0102845 A1 | 6/2003 | Aker et al. | |
| 2004/0008016 A1 | 1/2004 | Sutardja et al. | |
| 2004/0037101 A1 | 2/2004 | Meynard et al. | |
| 2004/0163409 A1 | 8/2004 | Nakajima et al. | |
| 2005/0045392 A1 | 3/2005 | Maslov et al. | |
| 2005/0065684 A1 | 3/2005 | Larson et al. | |
| 2006/0097782 A1 | 5/2006 | Ebner | |
| 2006/0202636 A1 | 9/2006 | Schneider | |
| 2007/0147098 A1 | 6/2007 | Mori et al. | |
| 2007/0194627 A1 | 8/2007 | Mori et al. | |
| 2007/0246635 A1 | 10/2007 | Nakajima et al. | |
| 2008/0080212 A1 | 4/2008 | Grbovic | |
| 2008/0245593 A1 | 10/2008 | Kim | |
| 2008/0304296 A1 | 12/2008 | Nadimpalliraju et al. | |
| 2009/0251212 A1 | 10/2009 | Pillonnet et al. | |
| 2009/0311891 A1 | 12/2009 | Lawrence et al. | |
| 2010/0025127 A1 | 2/2010 | Oyobe | |
| 2010/0060235 A1 | 3/2010 | Dommaschk et al. | |
| 2010/0085789 A1 | 4/2010 | Ulrich et al. | |
| 2010/0121511 A1 | 5/2010 | Onnerud et al. | |
| 2010/0298957 A1 | 11/2010 | Sanchez Rocha et al. | |
| 2010/0301827 A1 | 12/2010 | Chen et al. | |
| 2011/0133573 A1 | 6/2011 | Ratnaparkhi et al. | |
| 2011/0140533 A1 | 6/2011 | Zeng et al. | |
| 2011/0148198 A1 | 6/2011 | Tripathi et al. | |
| 2011/0187184 A1 | 8/2011 | Ichikawa | |
| 2011/0198936 A1 | 8/2011 | Graovac et al. | |
| 2012/0053871 A1 | 3/2012 | Sirard | |
| 2012/0074949 A1 | 3/2012 | Kepley et al. | |
| 2012/0112693 A1 | 5/2012 | Kusch et al. | |
| 2012/0155140 A1 | 6/2012 | Chen et al. | |
| 2012/0161858 A1 | 6/2012 | Permuy et al. | |
| 2012/0195084 A1 | 8/2012 | Norrga | |
| 2012/0262967 A1 | 10/2012 | Cuk | |
| 2013/0027126 A1 | 1/2013 | Jayaraman et al. | |
| 2013/0069662 A1 | 3/2013 | Tanabe | |
| 2013/0083563 A1 | 4/2013 | Wang et al. | |
| 2013/0088254 A1 | 4/2013 | Hoang et al. | |
| 2013/0088903 A1 | 4/2013 | Sagona et al. | |
| 2013/0090872 A1 | 4/2013 | Kurimoto | |
| 2013/0154379 A1 | 6/2013 | Tiefenbach | |
| 2013/0154521 A1 | 6/2013 | Butzmann et al. | |
| 2013/0155736 A1 | 6/2013 | Ilic et al. | |
| 2013/0260188 A1 | 10/2013 | Coates | |
| 2013/0285457 A1 | 10/2013 | Kepley | |
| 2013/0302652 A1 | 11/2013 | Wolff et al. | |
| 2014/0042815 A1 | 2/2014 | Maksimovic et al. | |
| 2014/0042827 A1 | 2/2014 | Wolff | |
| 2014/0104899 A1 | 4/2014 | Fischer et al. | |
| 2014/0152109 A1 | 6/2014 | Kanakasabai et al. | |
| 2014/0226379 A1 | 8/2014 | Harrison | |
| 2014/0239927 A1 | 8/2014 | Nascimento et al. | |
| 2014/0254219 A1 | 9/2014 | Davies | |
| 2014/0340052 A1 | 11/2014 | Dwertmann et al. | |
| 2014/0354212 A1 | 12/2014 | Sugeno et al. | |
| 2015/0009594 A1 | 1/2015 | Okaeme et al. | |
| 2015/0049532 A1 | 2/2015 | Bernet et al. | |
| 2015/0124506 A1 | 5/2015 | Sahoo et al. | |
| 2015/0229227 A1 | 8/2015 | Aeloiza et al. | |
| 2015/0249351 A1 | 9/2015 | Wolff et al. | |
| 2015/0270801 A1 | 9/2015 | Kessler et al. | |
| 2015/0280604 A1 | 10/2015 | Hassanpoor | |
| 2015/0288287 A1 | 10/2015 | Madawala et al. | |
| 2015/0296292 A1 | 10/2015 | Hogan et al. | |

(56) References Cited

U.S. PATENT DOCUMENTS

| | | |
|---|---|---|
| 2015/0303820 A1 | 10/2015 | Cubaines |
| 2015/0333654 A1 | 11/2015 | Song et al. |
| 2015/0340964 A1 | 11/2015 | Modeer |
| 2015/0364935 A1 | 12/2015 | Fetzer et al. |
| 2016/0072396 A1 | 3/2016 | Deboy et al. |
| 2016/0126737 A1 | 5/2016 | Dijkhuizen et al. |
| 2016/0183451 A1 | 6/2016 | Conrad et al. |
| 2016/0240894 A1 | 8/2016 | Wartenberg et al. |
| 2016/0254682 A1 | 9/2016 | Yip et al. |
| 2016/0272134 A1 | 9/2016 | Mackowiak et al. |
| 2016/0308466 A1 | 10/2016 | Oates |
| 2017/0054306 A1 | 2/2017 | Vo et al. |
| 2017/0099007 A1 | 4/2017 | Oates et al. |
| 2017/0163171 A1 | 6/2017 | Park |
| 2017/0179745 A1 | 6/2017 | Tritschler et al. |
| 2017/0217318 A1 | 8/2017 | Kowalewski |
| 2017/0282894 A1 | 10/2017 | Kamachi et al. |
| 2017/0338654 A1 | 11/2017 | Subramanian |
| 2017/0366079 A1 | 12/2017 | Bhowmik et al. |
| 2018/0043789 A1 | 2/2018 | Goetz |
| 2018/0123496 A1 | 5/2018 | Ilic et al. |
| 2018/0175744 A1 | 6/2018 | Jasim et al. |
| 2018/0241239 A1 | 8/2018 | Frost et al. |
| 2019/0031042 A1 | 1/2019 | Muller |
| 2019/0044451 A1 | 2/2019 | Huang et al. |
| 2019/0109891 A1 | 4/2019 | Paruchuri et al. |
| 2019/0131851 A1 | 5/2019 | Herb |
| 2019/0288522 A1 | 9/2019 | Hinterberger et al. |
| 2019/0288526 A1 | 9/2019 | Jaensch et al. |
| 2019/0288527 A1 | 9/2019 | Jaensch et al. |
| 2019/0288547 A1 | 9/2019 | Jaensch et al. |
| 2019/0288617 A1 | 9/2019 | Jaensch et al. |
| 2019/0312504 A1 | 10/2019 | Kim et al. |
| 2019/0326831 A1 | 10/2019 | Ying et al. |
| 2020/0212687 A1 | 7/2020 | Hinterberger et al. |
| 2020/0235439 A1 | 7/2020 | Frost et al. |
| 2020/0244076 A1 | 7/2020 | Wang et al. |
| 2020/0278936 A1 | 9/2020 | Gopalakrishnan et al. |
| 2020/0317086 A1 | 10/2020 | Goetz et al. |
| 2020/0328593 A1 | 10/2020 | Goetz |
| 2020/0338997 A1 | 10/2020 | Goetz et al. |
| 2020/0358370 A1 | 11/2020 | Goetz et al. |
| 2020/0395840 A1 | 12/2020 | Goetz |
| 2021/0005855 A1 | 1/2021 | Gotz et al. |
| 2021/0146791 A1 | 5/2021 | Hinterberger et al. |
| 2021/0151726 A1 | 5/2021 | Hinterberger et al. |
| 2021/0151727 A1 | 5/2021 | Hinterberger et al. |
| 2021/0151728 A1 | 5/2021 | Hinterberger et al. |
| 2021/0197676 A1 | 7/2021 | Goetz et al. |

FOREIGN PATENT DOCUMENTS

| | | |
|---|---|---|
| CN | 203707804 | 7/2014 |
| CN | 104242710 | 12/2014 |
| CN | 204156591 | 2/2015 |
| CN | 103812377 | 5/2016 |
| CN | 106356886 | 1/2017 |
| DE | 102014008399 | 12/2015 |
| DE | 102016109077 | 11/2017 |
| DE | 102017220175 | 5/2019 |
| DE | 102018109921 | 8/2019 |
| DE | 102018109922 | 10/2019 |
| DE | 102018109925 | 10/2019 |
| DE | 102018109926 | 12/2019 |
| DE | 102018121403 | 3/2020 |
| DE | 102018121490 | 3/2020 |
| DE | 102018121547 | 3/2020 |
| DE | 102018126780 | 4/2020 |
| DE | 102018129111 | 5/2020 |
| DE | 102018126779 | 6/2020 |
| DE | 102019112826 | 6/2020 |
| DE | 102019102306 | 7/2020 |
| DE | 102019102311 | 7/2020 |
| DE | 102019103757 | 7/2020 |
| DE | 102019120615 | 8/2020 |
| DE | 102019112373 | 11/2020 |
| DE | 102019112823 | 11/2020 |
| DE | 102019120616 | 11/2020 |
| DE | 102019120947 | 11/2020 |
| DE | 102019125577 | 11/2020 |
| DE | 102019125578 | 11/2020 |
| DE | 102019120945 | 2/2021 |
| DE | 102019130736 | 5/2021 |
| DE | 102019130737 | 5/2021 |
| DE | 102019132685 | 6/2021 |
| DE | 102020117264 | 6/2021 |
| DE | 102020117435 | 6/2021 |
| DE | 102020118242 | 7/2021 |
| EP | 0907238 | 4/1999 |
| EP | 2290799 | 3/2011 |
| EP | 2658071 | 10/2013 |
| EP | 2693598 | 2/2014 |
| WO | WO 2010/086929 | 8/2010 |
| WO | WO 2011/009689 | 1/2011 |
| WO | WO 2011/082855 | 7/2011 |
| WO | WO 2011/082856 | 7/2011 |
| WO | WO 2011/128133 | 10/2011 |
| WO | WO 2012/016735 | 2/2012 |
| WO | WO 2012/038162 | 3/2012 |
| WO | WO 2013/056900 | 4/2013 |
| WO | WO 2014/151178 | 9/2014 |
| WO | WO 2014/193254 | 12/2014 |
| WO | WO 2015/056491 | 4/2015 |
| WO | WO 2016/030144 | 3/2016 |
| WO | WO 2017/223267 | 12/2017 |
| WO | WO 2018/072837 | 4/2018 |
| WO | WO 2018/095552 | 5/2018 |
| WO | WO 2018/108140 | 6/2018 |
| WO | WO 2018/154206 | 8/2018 |
| WO | WO 2018/193173 | 10/2018 |
| WO | WO 2018/210451 | 11/2018 |
| WO | WO 2018/210452 | 11/2018 |
| WO | WO 2018/231810 | 12/2018 |
| WO | WO 2018/232403 | 12/2018 |
| WO | WO 2018/233871 | 12/2018 |
| WO | WO 2019/020215 | 1/2019 |
| WO | WO 2019/161875 | 8/2019 |
| WO | WO 2019/166733 | 9/2019 |
| WO | WO 2019/180699 | 9/2019 |
| WO | WO 2019/183553 | 9/2019 |
| WO | WO 2020/078580 | 4/2020 |
| WO | WO 2020/205511 | 10/2020 |
| WO | WO 2020/205574 | 10/2020 |
| WO | WO 2020/243655 | 12/2020 |

OTHER PUBLICATIONS

Search Report and Written Opinion in Singapore Appln. No. 11202110832U, dated Oct. 20, 2023, 9 pages.

"Capacitor Voltage Control Technique for a Modular Converter", An IP.com Prior Art Database Technical Disclosure, Jun. 10, 2015, pp. 1-7.

Bode, G.H., et al., "Hysteresis Current Regulation for Single-Phase Multilevel Inverters Using Asynchronous State Machines", 29th Annual Conference of the IEEE Industrial Electronics Society, Piscataway, NJ, 2003, pp. 1203-4208.

Chang, F., et al., "Improving the Overall Efficiency of Automotive Inverters Using a Multilevel Converter Composed of Low Voltage Si MOSFETs", IEEE Transactions on Power Electronics, 2019, vol. 34, No. 4, pp. 3586-3602.

Debnath, S., et al., "Operation, Control, and Applications of the Modular Multilevel Converter: A Review", IEEE Transactions on Power Electronics, 2015, vol. 30, No. 1, pp. 37-53.

EP 18816636.7 Extended Search Report, Feb. 19, 2021.

EP 18817541.8 Supplementary Search Report, Jan. 20, 2021.

EP 18817541.8 Written Opinion, Feb. 2, 2021.

Extended Search Report in European Appln. No. 20782259.4, dated Dec. 13, 2022, 9 pages.

Farr, E., et al., "A Sub-module Capacitor Voltage Balancing Scheme for the Alternate Arm Converter (AAC)", 15th European Conference on IEEE Power Electronics and Applications, 2013, pp. 1-10.

(56) References Cited

OTHER PUBLICATIONS

Gelman, V., "Energy Storage That May Be Too Good to Be True", IEEE Vehicular Technology Magazine, 2013, pp. 70-80. 2013.

Gupta, R., et al., "Cascaded Multilevel Control of DSTATCOM Using Multiband Hysteresis Modulation", IEEE Power Engineering Society General Meeting, Piscataway, NJ, 2006, pp. 1-7.

Hassanpoor, A., et al., "Tolerance Band Modulation Methods for Modular Multilevel Converters", IEEE Transactions on Power Electronics, 2015, vol. 30, No. 1, pp. 311-326.

Herrera, V. I., et al., "Optimal Energy Management and Sizing of a Battery—Supercapacitor-Based Light Rail Vehicle With a Multiobjective Approach", IEEE Transactions on Industry Applications, 2016, vol. 52, No. 4, pp. 3367-3377.

Kersten, A., "Battery Loss and Stress Mitigation in a Cascaded H-Bridge Multilevel Inverter for Vehicle Traction Applications by Filter Capacitors", IEEE Transactions on Transportation Electrification, 2019, pp. 1-13.

Khoshkbar-Sadigh, A., et al., "Thermal and Performance Comparison of Active Neutral-Point-Clamped (ANPC) and Dual Flying-Capacitor ANPC (DFC-ANPC) Inverters", IEEE Energy Conversion Congress and Exposition (ECCE), 2019, pp. 5522-5528.

Konstantinou, G., et al., "A Hybrid Modular Multilevel Converter with Partial Embedded Energy Storage", Energies, 2016, vol. 9, No. 12, pp. 1-18.

Li, N., et al., "SOH Balancing Control Method for the MMC Battery Energy Storage System", IEEE Transactions on Industrial Electronics, 2018, vol. 65, No. 8, pp. 6581-6591.

Loh, P. C., et al., "A Reduced Common Mode Hysteresis Current Regulation Strategy for Multilevel Inverters", 18th Annual IEEE Applied Power Electronics Conference and Exposition, Miami Beach, FL, 2003, vol. 1, pp. 576-582.

Loh, P. C., et al., "A Time-Based Double-Band Hysteresis Current Regulation Strategy for Single-Phase Multilevel Inverters", IEEE Transactions on Industry Applications, 2003, vol. 39, No. 3, pp. 883-892.

Maharjan, L., et al., "Fault-Tolerant Operation of a Battery-Energy-Storage System Based on a Multilevel Cascade PWM Converter With Star Configuration", IEEE Transactions on Power Electronics, 2010, vol. 25, No. 9, pp. 2386-2396.

Maharjan, L., et al., "State-of-Charge (SOC)-Balancing Control of a Battery Energy Storage System Based on a Cascade PWM Converter", IEEE Transactions on Power Electronics, 2009, vol. 24, No. 6, pp. 1628-1636.

Méllo, J.P.R., et al., "Multilevel Reduced Controlled Switches AC-DC Power Conversion Cells", IEEE Energy Conversion Congress and Exposition (ECCE), 2015, pp. 3815-3822.

Naderi, R., "Battery Management Converter System and Multilevel Converter Topology and Control", 2016, Dissertation at the University of California, Irvine, pp. 1-211.

Naderi, R., et al., "A Correction to the State-Machine-Decoder for Stacked Multicell Converters", IEEE Applied Power Electronics Conference and Exposition (APEC), 2014, pp. 1545-1549.

Naderi, R., et al., "A New Hybrid Active Neutral Point Clamped Flying Capacitor Multilevel Inverter", IEEE Applied Power Electronics Conference and Exposition (APEC), 2015, pp. 794-798.

Naderi, R., et al., "Dual Flying Capacitor Active-Neutral-Point-Clamped Multilevel Converter", IEEE Transactions on Power Electronics, 2016, vol. 31, No. 9, pp. 6476-6484.

Naderi, R., et al., "Phase-Shifted Carrier PWM Technique for General Cascaded Inverters", IEEE Transactions on Power Electronics, 2008, vol. 23, No. 3, pp. 1257-1269.

P., S., et al., "Seven Level Inverter Topologies: A Comparative Study", International Journal of Innovative Research in Electrical, Electronics, Instrumentation and Control Engineering, 2016, vol. 3, No. 1, pp. 148-162.

PCT International Search Report and Written Opinion in International Appln. No. PCT/US2020/025366, dated Jun. 25, 2020, 33 pages.

Sangiri, J. B., et al., "Modular Multilevel Converter for Multifunctional Battery Management System of Electric Vehicle", 44th Annual Conference of the IEEE Industrial Electronics Society, 2018, pp. 1333-1338.

SG 11201912049P Written Opinion, Mar. 10, 2021.

Shimada, M., et al., "Energy-saving Technology for Railway Traction Systems Using Onboard Storage Batteries", Hitachi Review, 2012, vol. 61, No. 7, pp. 312-318.

Tajeddine, K., et al., "A Cascaded H-Bridge Multilevel Inverter with SOC Battery Balancing", International Journal of Advanced Computer Science and Applications, 2017, vol. 8, No. 12, pp. 345-350.

Tolbert et al., "Charge Balance Control Schemes for Cascade Multi-level Converter in Hybrid Electric Vehicles," IEEE Trans. Indus. Electronics, Oct. 2002, 49(5):1058-1064.

Townsend et al., "One dimensional cell inversion: A modulation strategy for hybrid cascaded converters," Presented at Proceedings of the 2014 IEEE Energy Conversion Congress and Exposition, Pittsburgh, PA, USA, Sep. 14-18, 2014, 4653-4660.

Varghese, K., "Implementation of Single Phase Seven Level Cascaded Multilevel Inverter With Reduced No of Switches", Project Report'15, retrieved from https://www.academia.edu/12826368/single_phase_seven_level_cascaded_multilevel_inverter, pp. 1-45, 2023.

Venu, K., et al., "A Seven Level Single-Phase Cascaded Inverter with Improved Efficiency", International Journal & Magazine of Engineering, Technology, Management and Research, 2016, vol. 3, No. 10, pp. 243-249.

WO PCT/US18/37081 ISR and Written Opinion, Oct. 17, 2018.
WO PCT/US18/38089 ISR and Written Opinion, Oct. 29, 2018.
WO PCT/US19/23695 ISR and Written Opinion, Aug. 12, 2019.
WO PCT/US21/27154 ISR and Written Opinion, Oct. 14, 2021.
WO PCT/US21/27159 ISR and Written Opinion, Sep. 1, 2021.
WO PCT/US21/32295 ISR and Written Opinion, Sep. 14, 2021.

Wu, B., et al., "Analysis of a distributed maximum power point tracking tracker with low input voltage ripple and flexible gain range", IET Power Electron., 2016, vol. 9, No. 6, pp. 1220-1227.

Zhang, L., et al., "Design and Performance Evaluation of the Modular Multilevel Converter (MMC)-based Grid-tied PV-Battery Conversion System", IEEE Energy Conversion Congress and Exposition (ECCE), 2018, pp. 2649-2654.

European Office Action Mailed on Jun. 11, 2025 for European Application No. 2078229.4, 9 page(s).

Rahman, Syed, et al., "Novel voltage balancing algorithm for single-phase cascaded multilevel inverter for post-module failure operation in solar photovoltaic applications", IET Renewable Power Generation, Feb. 25, 2019, pp. 427-437, vol. 13, No. 3, The Institution of Engineering and Technology, UK.

Zou, Zhi-Xiang, et al., "Interleaved Operation of Parallel Neutral-Point Clamped Inverters with Reduced Circulating Current", Proceedings of the 9th Annual IEEE Energy Conversion Congress and Exposition (ECCE), Oct. 1-5, 2017, pp. 5254-5261, IEEE, Cincinnati, OH.

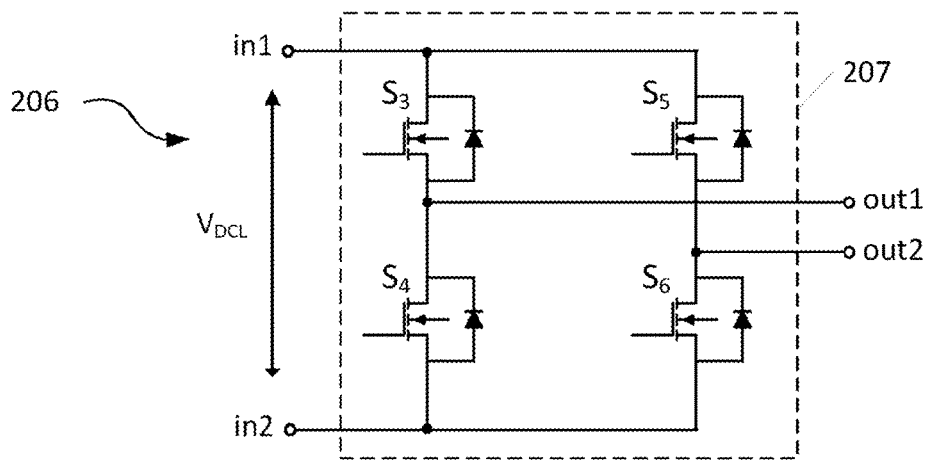
FIG. 5A
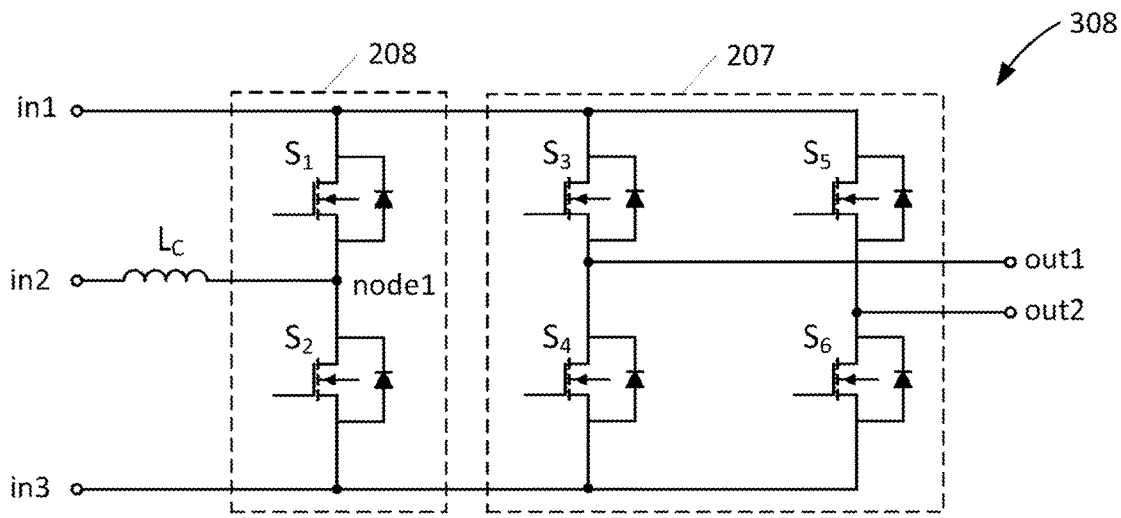
FIG. 5B
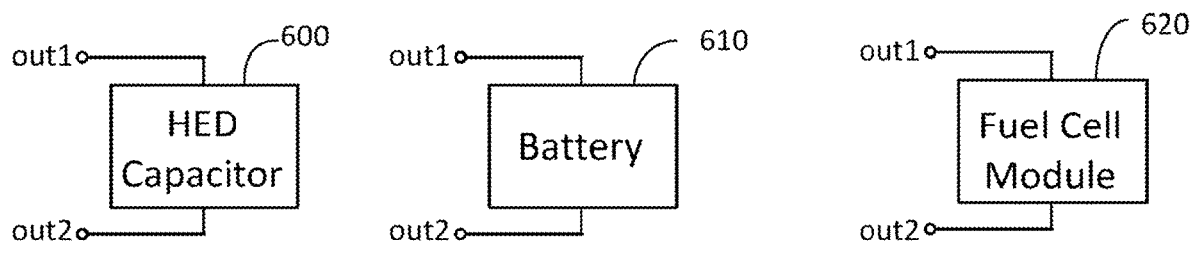
FIG. 6A
FIG. 6B
FIG. 6C

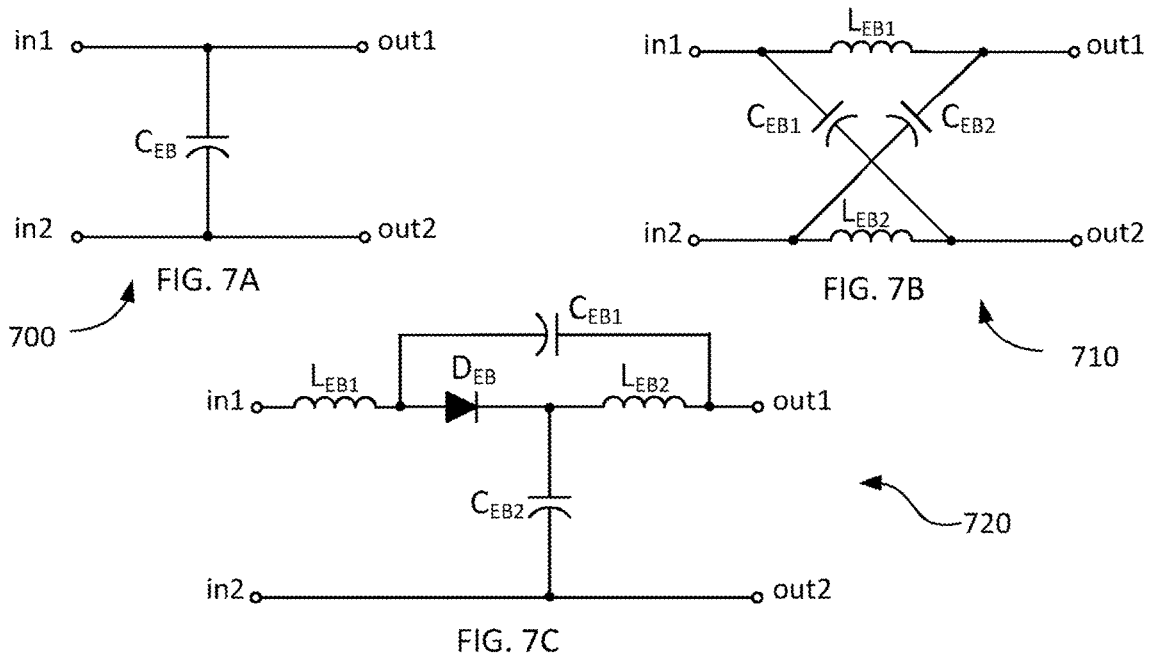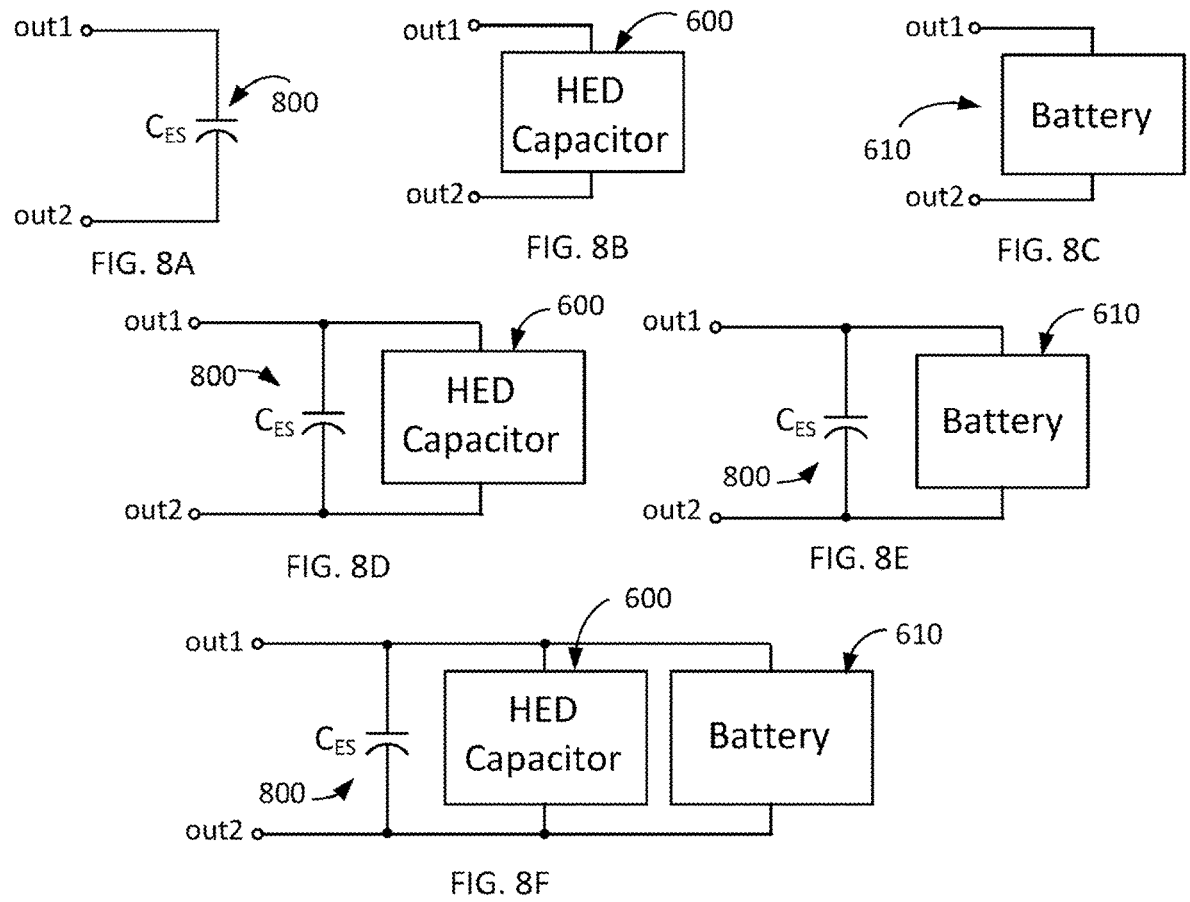

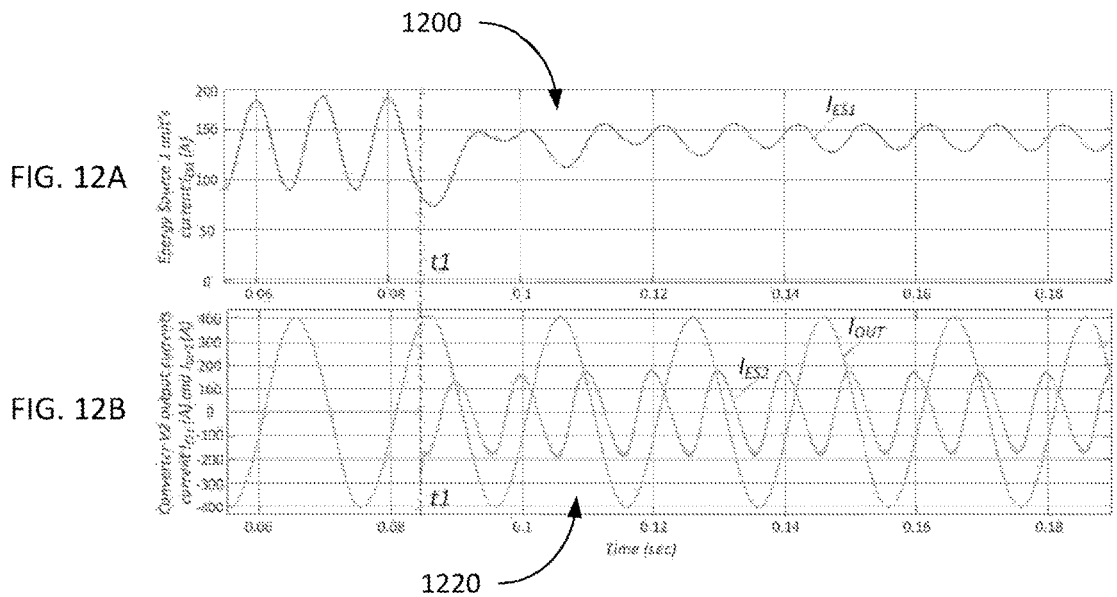
FIG. 12A
FIG. 12B
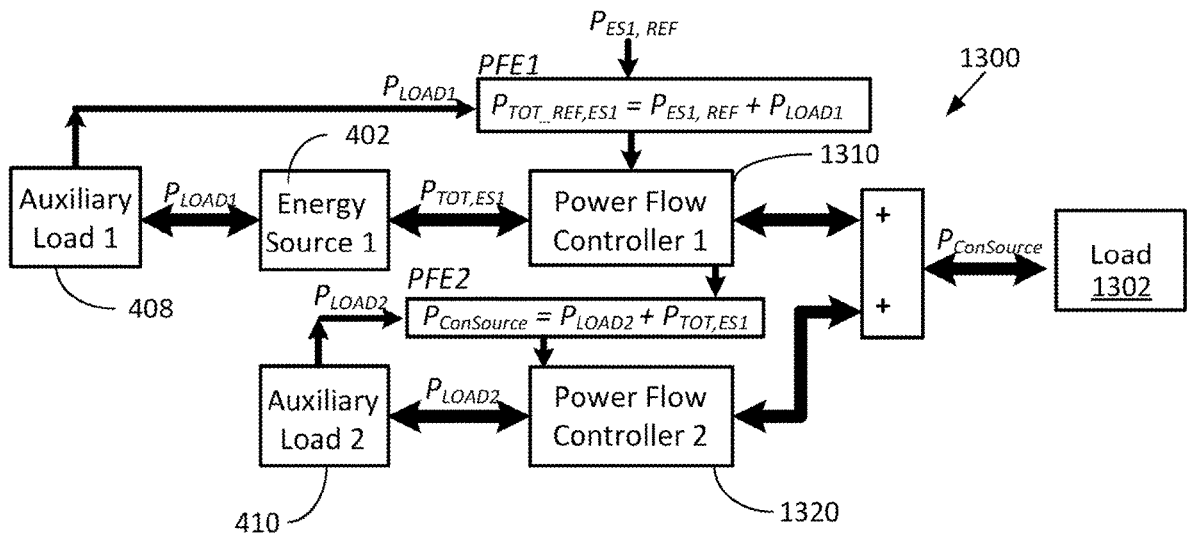
FIG. 13

Energy contribution of modules within phase A

MODULE-BASED ENERGY SYSTEMS CAPABLE OF CASCADED AND INTERCONNECTED CONFIGURATIONS, AND METHODS RELATED THERETO

CROSS-REFERENCE TO RELATED APPLICATIONS

This application is a continuation of U.S. application Ser. No. 17/463,793, filed Sep. 1, 2021, which is a continuation of U.S. application Ser. No. 16/832,812, filed Mar. 27, 2020, now U.S. Pat. No. 11,135,923, which claims the benefit of and priority to U.S. Provisional Application Ser. No. 62/826,158, filed Mar. 29, 2019, U.S. Provisional Application Ser. No. 62/826,238, filed Mar. 29, 2019, and U.S. Provisional Application Ser. No. 62/906,007, filed Sep. 25, 2019, all of which are incorporated by reference herein for all purposes.

FIELD

The subject matter described herein relates generally to module-based energy systems and modules for use therein, and systems, devices, and methods that facilitate the connection and control of modules in module-based energy systems.

BACKGROUND

Energy systems having multiple energy sources or sinks are commonplace in many industries. One example is the automobile industry. Today's automotive technology, as evolved over the past century, is characterized, amongst many things, by an interplay of motors, mechanical elements, and electronics. These are the key components that impact vehicle performance and driver experience. Motors are of the combustion or electric type and one usually finds one motor per car, exceptions being cars with hybrid drivetrains, featuring a combination of a combustion engine with one or two electric motors, or performance oriented electric vehicles that are outfitted with two motors. In almost all cases the rotational energy from the motor(s) is delivered via a set of highly sophisticated mechanical elements, such as clutches, transmissions, differentials, drive shafts, torque tubes, couplers, etc. These parts control to a large degree torque conversion and power distribution to the wheels and are key elements to define the performance of the car. They also impact road handling. Over the years individual car manufacturers have highly optimized these mechanical parts to provide better performance, higher fuel efficiency and ultimately differentiation in the market place. On the control side, apart from driver comforts such as entertainment, navigation and human machine interface elements, there are typically only a few clusters of specialty electronics hardware and embedded software that control/optimize motors, clutch/transmission operation and road holding/handling.

An EV includes various electrical systems that are related to the drivetrain including, among others, the battery, the charger and motor control. A short inventory of the present capabilities and shortcomings of these electrical systems are described below.

Conventional Battery Design

High voltage battery packs are typically organized in a serial chain of lower voltage battery modules. Each such module further includes a serially connected set of individual cells and a simple embedded battery management system to regulate basic cell related characteristics, such as state of charge and voltage. Electronics with more sophisticated capabilities or some form of smart interconnectedness are absent. As a consequence, any monitoring or control function is handled by a separate system, which, if at all present elsewhere in the car, lacks the ability to monitor individual cell health, state of charge, temperature and other performance impacting metrics. There is also no ability to adjust power draw per individual cell in any form. Some of the major consequences are: (1) the weakest cell constrains the overall performance of the entire battery pack, (2) failure of any cell or module leads to a need for replacement of the entire pack, (3) battery reliability and safety are considerably reduced, (4) battery life is limited, (5) thermal management is difficult, (6) battery packs always operate below maximum capabilities, (7) sudden inrush into the battery packs of regenerative braking derived electric power cannot be readily stored in the batteries and will require dissipation via a dump resistor.

Conventional Charger Design

Charging circuits are typically realized in separate onboard systems. They stage power coming from outside the EV in the form of an AC signal or a DC signal, convert it to DC and feed it to the battery pack(s). Charging systems monitor voltage and current and typically supply a steady constant feed. Given the design of the battery packs and typical charging circuits, there is little ability to tailor charging flows to individual battery modules based on cell health, performance characteristics, temperature, etc. Charging cycles are also typically long as the charging systems and battery packs lack the circuitry to allow for pulsed charging or other techniques that would optimize the charge transfer or total charge achievable.

Conventional Motor Control Design

Conventional controls contain DC to DC conversion stages to adjust battery pack voltage levels to the bus voltage of the EV's electrical system. Motors, in turn, are then driven by simple two-level multiphase converters that provide the required AC signal(s) to the electric motor. Each motor is traditionally controlled by a separate controller, which drives the motor in a 3-phase design. Dual motor EVs would require two controllers, while EVs using four in-wheel motors would require 4 individual controllers. The conventional controller design also lacks the ability to drive next generation motors, such as switch reluctance motors (SRM), characterized by higher numbers of pole pieces. Adaptation would require higher phase designs, making the systems more complex and ultimately fail to address electric noise and driving performance, such as high torque ripple and acoustical noise.

Many of these deficiencies apply not only to automobiles but other motor driven vehicles, and also to stationary applications to a certain extent. For these and other reasons, needs exist for improved systems, devices, and methods for energy systems for mobile and stationary applications.

SUMMARY

Example embodiments of systems, devices, and methods are provided herein for module-based energy systems widely relevant to many applications. In many of these embodiments, a module-based energy system includes multiple modules, where each module includes at least an energy source and a converter. More complex configurations of each module are also disclosed. The modules of the system can be connected together in different arrangements of varying complexities to perform functions specific to the particular technological application to which the system is applied. The system can be configured to monitor status information, at least one operating characteristic, or other parameter of each module repeatedly during use of the system, assess the state of each module based on that monitored status information, operating characteristic, or other parameter, and control each module independently in an effort to achieve and/or maintain one or more desired targets, such as electrical performance, thermal performance, lifespan, and others. This control can occur to facilitate energy provision from the system (e.g., discharging) and/or energy consumption (e.g., charging). Numerous example applications of these systems, devices, and methods are described.

In many example embodiments, the at least one energy source of the module can include a capacitor (such as an ultra-capacitor or super-capacitor), a battery, or a fuel-cell.

In many example embodiments, the system can include at least two converter-source modules connected in a one-dimensional array or in a multi-dimensional array. At least two one-dimensional arrays can be connected together, for example, at different rows and columns directly or by one or more additional converter-source modules. In such configurations, an output voltage of any shape and frequency can be generated at the outputs of the module-based energy system as a superposition of output voltages of individual converter-source modules.

In many example embodiments, the system includes one or more interconnection modules capable of selectively supplying power to one of two or more arrays of modules. The interconnection module permits the efficient exchange of energy between arrays and also can be used to compensate for imbalances of operating parameters, such as state of charge or temperature, occurring between different arrays. Interconnection module thus can be used for inter-array balancing. If those arrays are dedicated to producing output waveforms of different phase angles, then the interconnection module can be used for inter-phase balancing.

The various interconnected architectures of the example embodiments enable inter-array or inter-phase power management within a single module-based energy system (e.g., a battery pack) and inter-system power management between multiple module-based energy systems (e.g., battery packs), as well as connection of auxiliary loads to the system(s), and maintenance of uniform distribution of energy provided to those loads from all converter-source modules of such systems.

The various connected architectures of the example embodiments also enable the control of power sharing among converter-source modules. Such control enables, for example, regulation of parameters like State of Charge of the energy sources of the converter-source modules to be balanced, in real time and continually during cycling, as well as at rest, which fosters utilization of the full capacity of each energy source regardless of possible differences in their capacities. In addition, such control can be used to balance the temperature of the energy sources of the converter-source modules. Temperature balancing, for example, can increase the power capability of the system (e.g., a battery pack) and provide more uniform aging of the energy sources regardless of their physical location within the system and differences in their thermal resistivity.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 5A is a schematic depicting an example embodiment of a converter (Converter V1) shown in FIG. 2, according to embodiments of the present disclosure.

FIG. 5B is a schematic depicting an example embodiment of a converter (Converter V2) shown in FIGS. 2 and 3, according to embodiments of the present disclosure.

FIGS. 6A, 6B and 6C are diagrams depicting example embodiments of energy storage elements for use as an energy source shown in FIGS. 1, 2 and 3, according to embodiments of the present disclosure.

FIGS. 7A, 7B and 7C are schematics depicting of example embodiments for use as the energy buffer shown in FIGS. 1, 2 and 3, according to embodiments of the present disclosure.

FIGS. 8A, 8B, 8C, 8D, 8E, and 8F are diagrams depicting example embodiments for use as energy source 2 shown in FIG. 3, according to embodiments of the present disclosure.

FIGS. 12A and 12B are graphs depicting example waveforms of a converter-source (ConSource V2) module shown in FIG. 3, in which the converter V2 provides a secondary function of reduction of a second order current harmonic.

FIG. 13 is a block diagram depicting an example embodiment of power flow management for the converter-source (ConSource V3) module shown in FIG. 4, according to embodiments of the present disclosure.

DETAILED DESCRIPTION

Figure 1A:
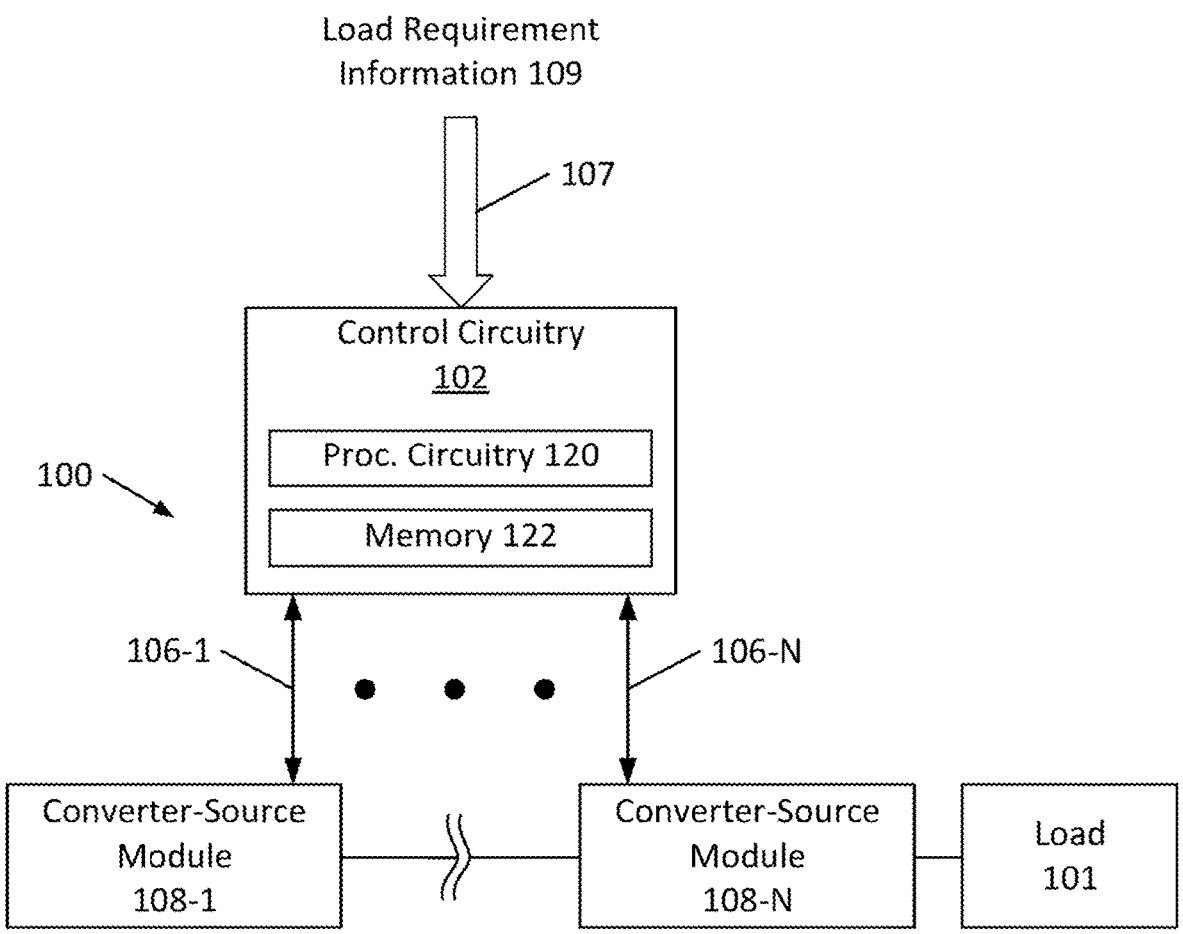
FIGS. 1A, 1B and 1C are block diagrams depicting example embodiments of a module-based energy system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Example embodiments of module-based energy systems are described herein, as are: example embodiments of devices, circuitry, software, and components within such systems; example embodiments of methods of operating and using such systems; and example embodiments of applications (e.g., apparatuses, machines, grids, locales, structures, environments, etc.) in which such systems can be implemented or incorporated or with which such systems can be utilized. In many cases, these applications can be classified as a mobile application or a stationary application.

Examples of Applications

Mobile applications are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, etc.), a military vehicle, a spacecraft, and a satellite.

Stationary applications are generally applications other than mobile applications. Generally, in stationary applications the module-based energy system resides in a static location while providing electrical energy for consumption by one or more other entities. Examples of stationary applications in or with which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), and systems that convert solar power, wind, geothermal energy, fossil fuels, or nuclear reactions into electricity for storage. Examples of stationary applications in or with which the embodiments disclosed herein can be used include, but are not limited to: energy systems for charging the mobile applications described above (e.g., a charging station). Other examples of stationary applications in or with which the embodiments disclosed herein can be used include, but are not limited to: a data center storage system, a power grid, or a micro-grid. A stationary energy system can be used in either a storage or non-storage role.

In describing embodiments herein, reference may be made to a particular mobile application (e.g., an electric vehicle (EV)) or stationary application (e.g., grid). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Example Embodiments of Module-Based Energy Systems

FIG. 1A depicts an example embodiment of a module-based energy system 100. Here, system 100 includes control circuitry 102 communicatively coupled with N converter-source modules 108-1 through 108-N, over communication paths or links 106-1 through 106-N, respectively. In these embodiments, any number of two or more converter-source modules 108 can be used (e.g., N is greater than or equal to two). The converter-source modules 108, referred to herein as "ConSource" modules or modules 108, can be connected to each other in a variety of manners as will be described in more detail with respect to FIGS. 15-29. For ease of illustration, in FIGS. 1A-1C, modules 108 are shown connected in series, or as a one dimensional array, where the Nth module 108 is coupled to a load 101. Load 101 is the electrical load to which system 100 outputs power when used to provide power. Load 101 can be any type of load including, but not limited to, a motor or a grid. For charging, modules 108 can be coupled with a charging source (not shown) either in addition to, or instead of, load 101. As will be described in greater detail herein, system 100 can be configured to supply multiple loads 101, including both primary and auxiliary loads.

In the embodiment of FIG. 1A, control circuitry 102 is configured to control one or more modules 108 based on status information received from the same or different one or more of the modules 108. Control can also be based on one or more other factors, such as requirements of load 101. In many embodiments, the aspect that is controlled is the output power of each module 108 over time; however other aspects can be controlled as an alternative to or in addition to output power.

Load requirement information 109 can be received by control circuitry 102 over a communication path or link 107. Load requirement information 109 can inform control circuitry 102 as to the requirements of load 101 at any particular time. In some example embodiments, the load requirement information 109 can take the form of one or more analog or digital control signal waveforms (e.g., a different control signal waveform for each phase), such as can be provided by a controller for a mobile entity (e.g., an Electronic Control Unit (ECU) or Master Control Unit (MCU) having responsibility for one or more other functions (e.g., motor control, driver interface control, traction control, etc.) of an EV) or controller for a grid or other stationary energy storage system. As an alternative to, or in addition to the information supplied by another controller, in some embodiments the load requirement information 109 can include load measurements (e.g., voltage, current) taken by one or more sensors of system 100, where those measurements are supplied back to control circuitry 102 in a feedback loop for maintaining certain power supply conditions.

In many embodiments, status information of every module 108 in system 100 will be communicated to control circuitry 102, from which control circuitry 102 will independently control every module 108-1 . . . 108-N. Other variations are possible. For example, control of a particular module 108 (or subset of modules 108) can be based on status information of that particular module 108 (or subset of ConSource modules 108), based on status information of a different module 108 that is not the particular module 108 (or subset of modules 108), based on status information of all modules 108 other than the particular module 108 (or subset of modules 108), based on status information of that particular module 108 (or subset of modules 108) and status information of at least one other module 108 that is not that particular module 108 (or subset of modules 108), or based on status information of all modules 108 in system 100. This includes a system 100 supplying multiple loads or motors, and having modules 108 arranged in multiple packs.

As will be described herein, the status information can be information about one or more aspects of each module 108. The status information can be an operating characteristic or other parameter. Types of status information include, but are not limited to, the following aspects of a module 108 or components thereof: State of Charge (SOC) (e.g., the level of charge of an energy source relative to its capacity, such as a fraction or percent), State of Health (SOH) (e.g., a figure of merit of the condition of an energy source compared to its ideal conditions), capacity (Q), temperature (T), voltage (V), current (I), or the presence of absence of a fault. Each module 108 includes one or more sensors or other measuring elements for collecting sensed or measured signals or data that constitute status information, or can be converted into status information. A separate sensor is not needed to collect each type of status information, as more than one type of status information can be sensed or measured with a single sensor, or otherwise algorithmically determined without the need for additional sensors.

Figure 1B:
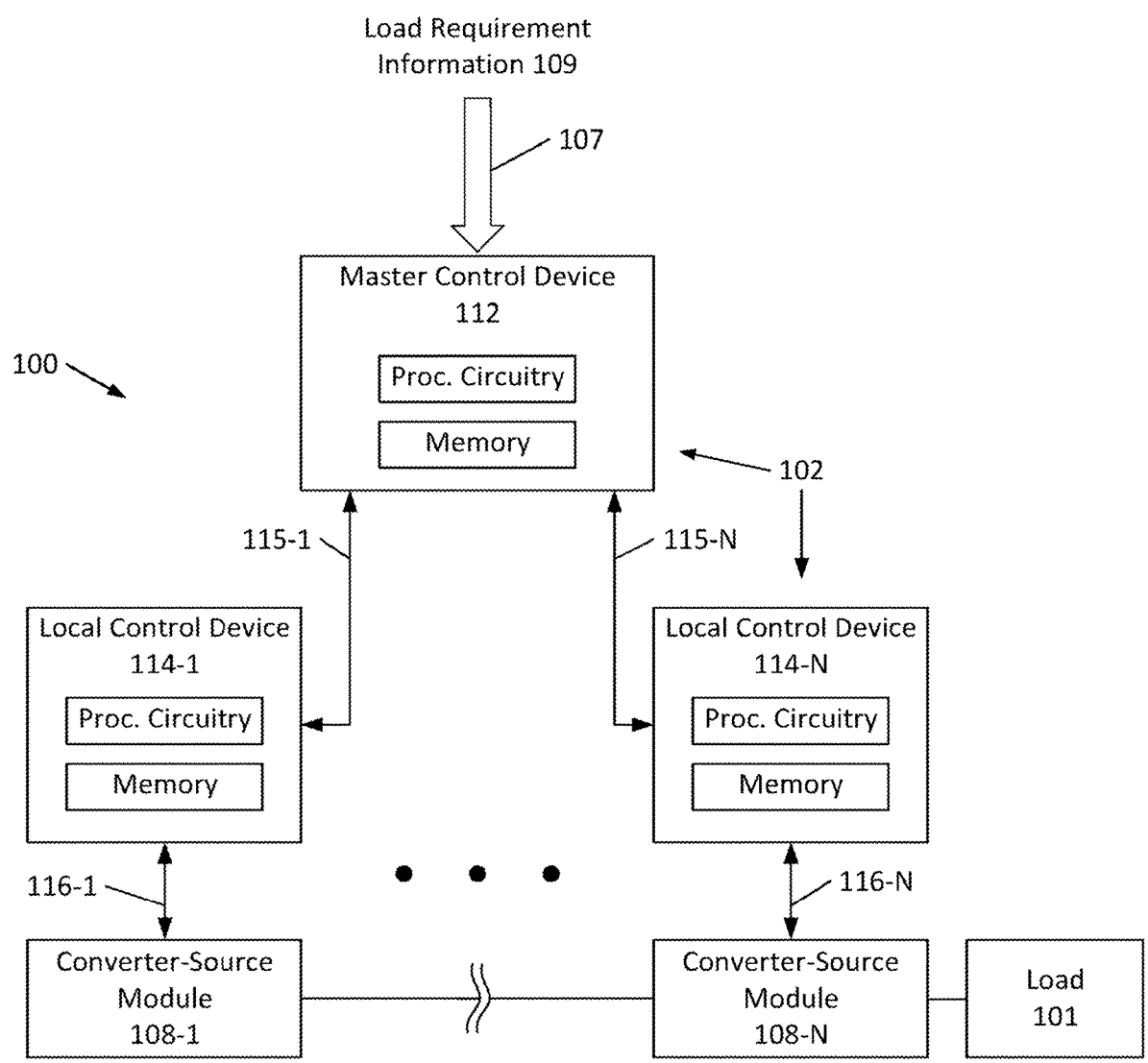

FIG. 1B depicts another example embodiment of system 100. Here, control circuitry 102 is implemented as a master control device 112 communicatively coupled with N different local control devices 114-1 through 114-N over communication paths or links 115-1 through 115-N, respectively. Each local control device 114-1 through 114-N is communicatively coupled with one converter-source module 108-1 through 108-N over communication paths or links 116-1 through 116-N, respectively, such that there is a 1:1 relationship between local control devices 114 and converter-source modules 108. Master control device 112 can be communicatively coupled to all local control devices 114 in the system, regardless of whether those local control device 114 are supplying power to the same load. For example, one master control device 112 can receive and send information to local control devices 114 of multiple different subsystems and packs.

Figure 1C:
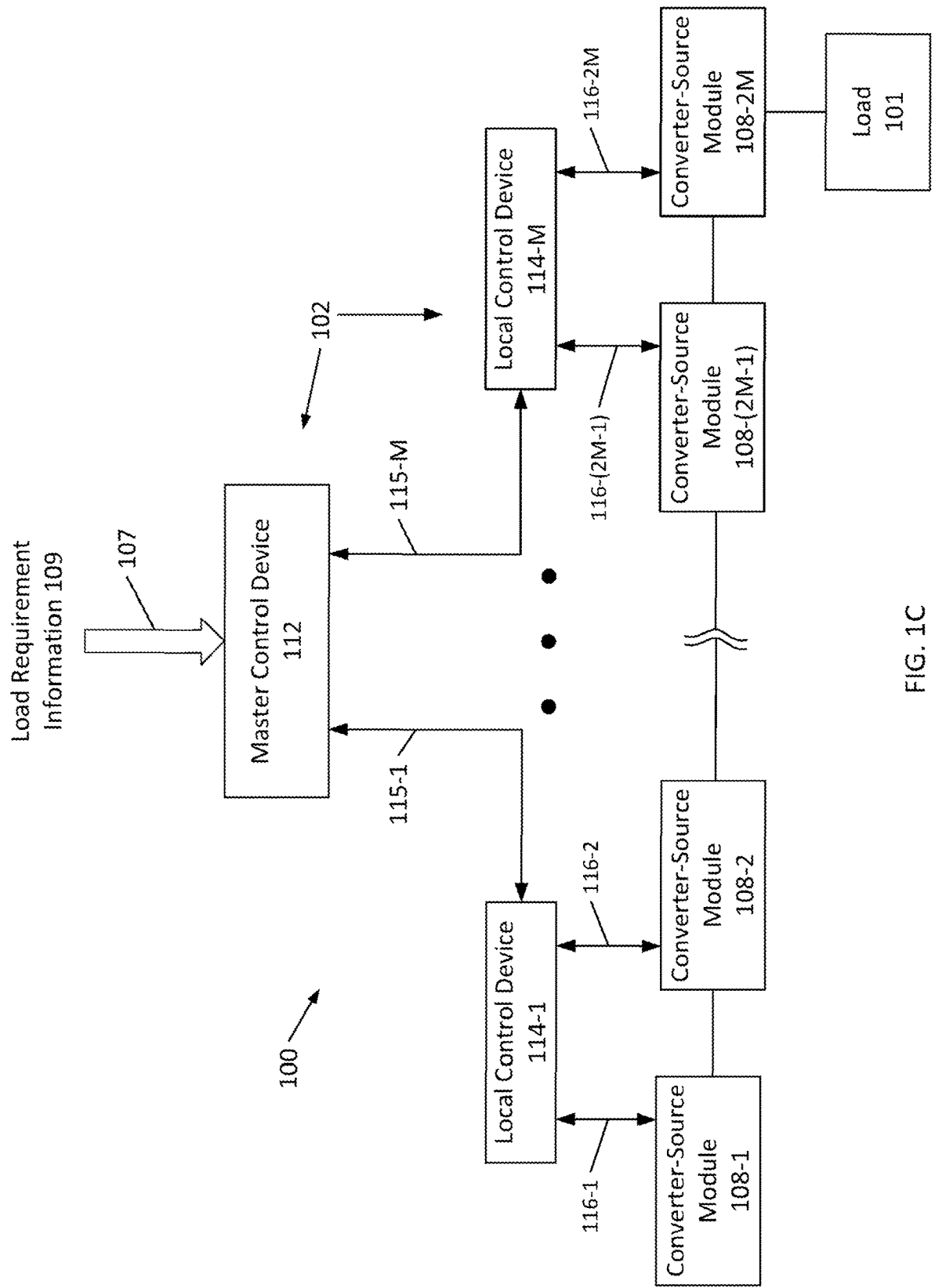

FIG. 1C depicts another example embodiment of system 100. Here, master control device 112 is communicatively coupled with M different local control devices 114-1 through 114-M over communication paths or links 115-1 through 115-M, respectively. Local control devices 114 can be coupled with and control two or more converter-source modules 108. In the example shown here, each local control device 114 is communicatively coupled with two converter-source modules 108, such that M local control devices 114-1 through 114-M are coupled with 2M converter-source modules 108-1 through 108-2M over communication paths or links 116-1 through 116-2M, respectively.

Communication paths or links 106, 107, 115, and 116 can each be wired or wireless communication paths or links that communicate data or information bidirectionally, in parallel or series fashion. Data can be communicated in a standard or custom format. In some (e.g., automotive) applications, communication paths or links 115 can be configured to communicate data according to FlexRay or CAN protocols.

In the embodiments described with respect to FIGS. 1B and 1C, the local control devices 114 receive the status information from each module 108, or determine the status information from sensed or measured signals or data received from each module 108, and communicate that information to master control device 112. In some embodiments local control devices 114 communicate the measured or sensed data to master control device 112, which then algorithmically determines the status information on the basis of that raw data. Master control device 112 can then use the status information about all of the modules 108 to make control determinations accordingly. The control determinations may take the form of instructions, commands, or other information (such as a modulation index described below) that can be interpreted or utilized by local control devices 114 to either maintain or adjust the operation or contribution of the modules 108.

For example, with respect to SOC, if upon reading the SOC measurements for all modules 108, master control device 112 makes an assessment that a first module 108 is operating at a relatively lower SOC than other modules 108 supplying power for a phase of system 100, then master control device 112 can instruct that first module 108 to decrease its power output, and can instruct one or more other modules 108 to increase power output(s) in that phase to compensate. This should cause the SOC of the other modules 108 to decrease faster than that of the first module 108, and thus converge to a balanced condition. With respect to temperature, if upon reading temperature measurements for all modules 108, master control device 112 makes an assessment that a first module 108 is operating at a relatively higher temperature than other modules 108 supplying power for a phase in system 100, then master control device 112 can instruct that first module 108 to decrease its power output, and can instruct one or more other modules 108 to increase power output(s) in that phase to compensate. This should cause the temperature of the first module 108 to approach that of the other modules 108 (by cooling of the first module 108 and/or heating of the other modules 108), and thus converge to a balanced condition.

Master control device 112 may receive status information indicating one or more of the following conditions that a particular module 108 (or component thereof) is operating in with respect to one or more other modules 108 in system 100: with a relatively lower SOC, with a relatively lower SOH, with a relatively lower capacity, with a relatively lower voltage, with a relatively lower current, with a relatively higher temperature, or with a fault. In such an example, master control device 112 can output control information that causes the power output of that particular module 108 to be reduced (or in some cases, raised depending on the condition). In this manner, the power output of a module 108 that is operating with, e.g., a higher temperature, can be reduced so as to cause the temperature of that module 108 to converge towards the temperature of one or more other modules 108.

In other embodiments, the determination of whether to adjust the operation of a particular module 108 can be made by comparison of the status information to predetermined thresholds, limits, or conditions, and not necessarily by comparison to statuses of other modules 108. The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, master control device 112 can adjust the operation of a module 108 if the status information for that module 108 indicates it to be operating in violation (e.g., above or below) of a predetermined threshold or limit, or outside of a predetermined range of acceptable operating conditions. Similarly, master control device 112 can adjust the operation of a module 108 if the status information for that module 108 indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like.

Local control device 114 can receive, process, and transmit: the signals from various sensors (e.g., temperature, voltage and current sensors) of the module 108; switching (e.g., triggering) and fault signals to and from semiconductor switches; the voltages of elementary cells of energy storage and buffering elements; and other signals. The local control device 114 can perform communication with and transmission of corresponding control signals to and from the master control device 112.

In this manner, master control device 112 can control the modules 108 within system 100 to achieve or converge towards a desired target. The target can be, for example, operation of all modules 108 at the same or similar levels with respect to each other, or within predetermined thresholds limits, or conditions. This process is also referred to as balancing or seeking to achieve balance in the operation or operating characteristics of the modules 108. The term "balance" as used herein does not require absolute equality between modules 108 or components thereof, but rather is used in a broad sense to convey to those of ordinary skill in the art that operation of system 100 can be used to actively reduce disparities in operation between modules 108 that would otherwise exist.

Referring back to FIG. 1A, control circuitry 102 can be configured to operate and execute control using software (instructions stored in memory that are executable by processing circuitry), hardware, or a combination thereof. Control circuitry 102 can include processing circuitry 120 and memory 122 as shown here. Example implementations of processing circuitry 120 and memory 122 are described further below. Communication path or links 106 can also include wireline power so as to directly supply the operating power for control circuitry 102 from one or more converter source modules 108. In certain embodiments power for control circuitry 102 is supplied from only one or more modules 108.

Referring to FIGS. 1B-1C, master control device 112 and local control devices 114 can similarly be configured to operate and execute control using software (instructions stored in memory that are executable by processing circuitry), hardware, or a combination thereof, and each can include processing circuitry 120 and memory 122 as shown here. Example implementations of processing circuitry 120 and memory 122 are described further below. Communication path or links 116 can also include wireline power so as to directly supply the operating power for local control devices 114 from one or more modules 108. In certain embodiments, the operating power for each local control device 114 is supplied only by the one or more modules 108 to which that local control device 114 is connected by path 116. The operating power for the master control device 112 can be supplied indirectly from one or more of the modules 108 (e.g., such as through a car's power network).

In some embodiments, control circuitry 102 can include a single control device for the entire system 100. In other embodiments, control circuitry can be distributed between local control devices 114 associated with the modules 108, such that a separate master control device 112 is not necessary and can be omitted from system 100.

In some embodiments, control of system 100 can be distributed between control circuitry 102 dedicated to or local to system 100, and control circuitry that is shared with other parts of the application. For example, master control device 112 can be implemented as part of a mobile or stationary controller providing load requirement information 109 to system 100 (e.g., ECU or MCU). Control circuitry 102 can have a communicative interface for communicating with another control device of the overall mobile or stationary application. For example, in an automotive application, control circuitry 102 (e.g., master control device 112) can output data or information about system 100 to the ECU or MCU of the vehicle.

Example Embodiments of Converter-Source Modules within Module-Based Systems

Figure 2:
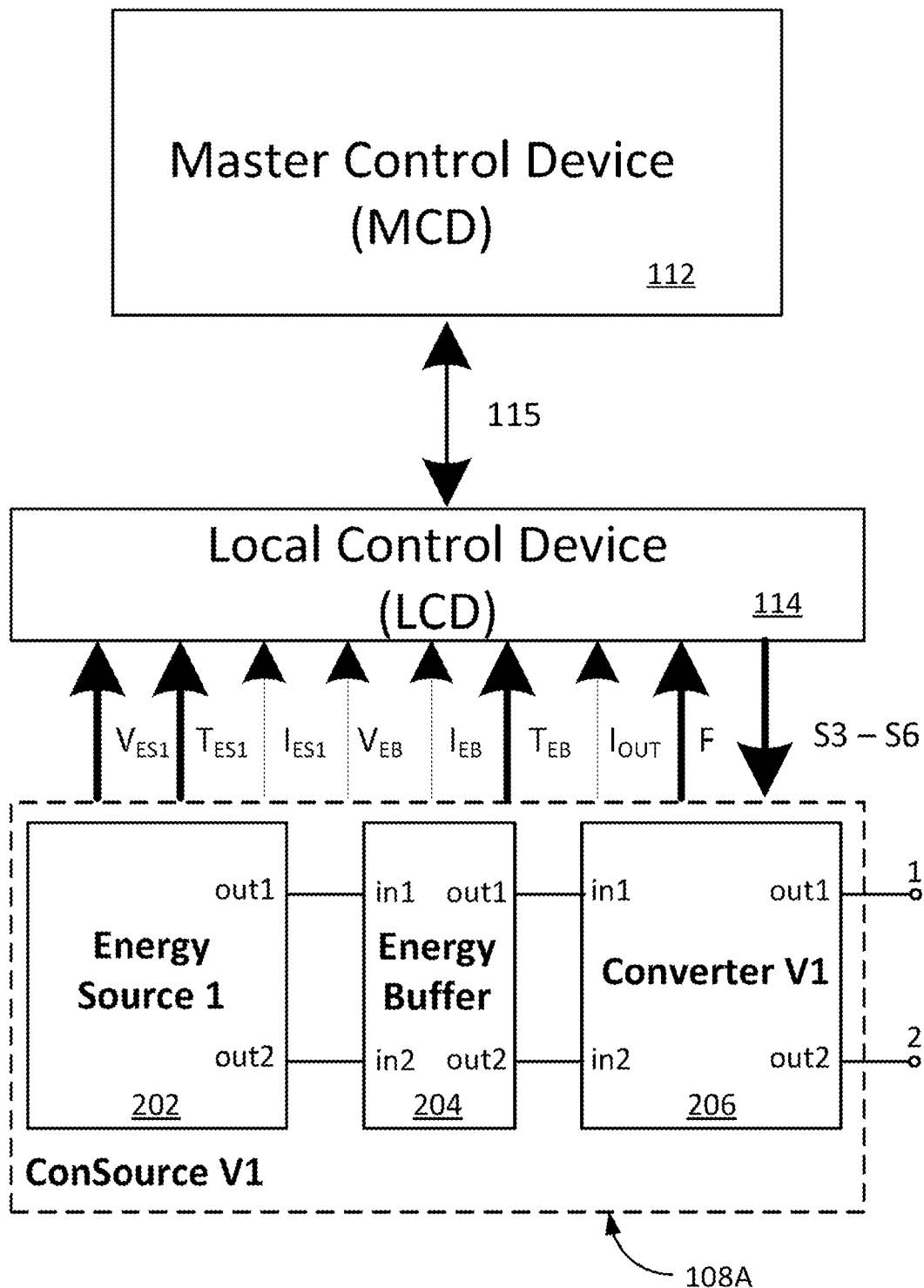
FIG. 2 is a block diagram depicting an example embodiment of a converter-source module (ConSource V1) with a local control device (LCD) connected to a master control device (MCD), according to embodiments of the present disclosure.
Figure 3:
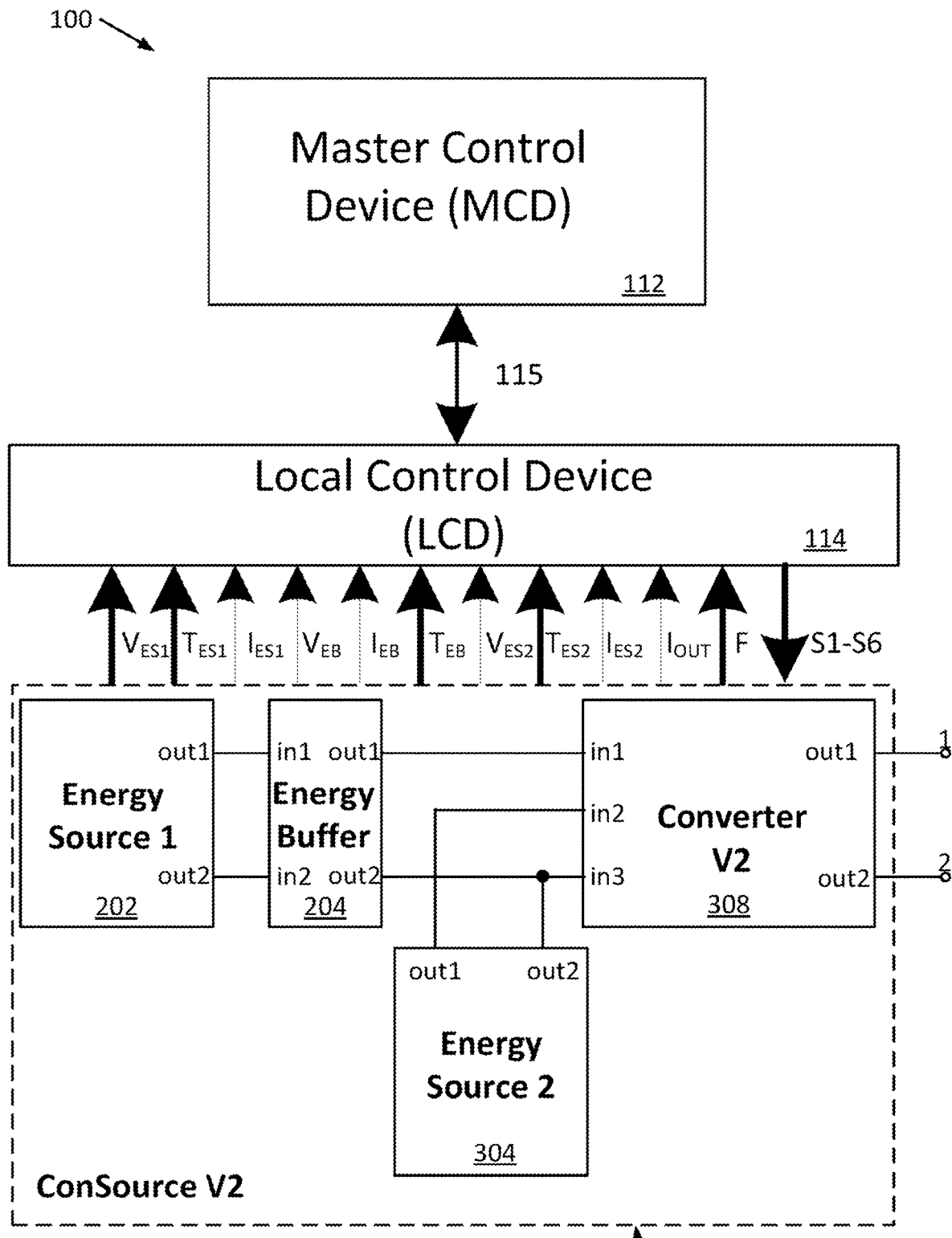
FIG. 3 is a block diagram depicting another example embodiment of a converter-source module (ConSource V2) with an LCD connected to an MCD, according to embodiments of the present disclosure.
Figure 4:
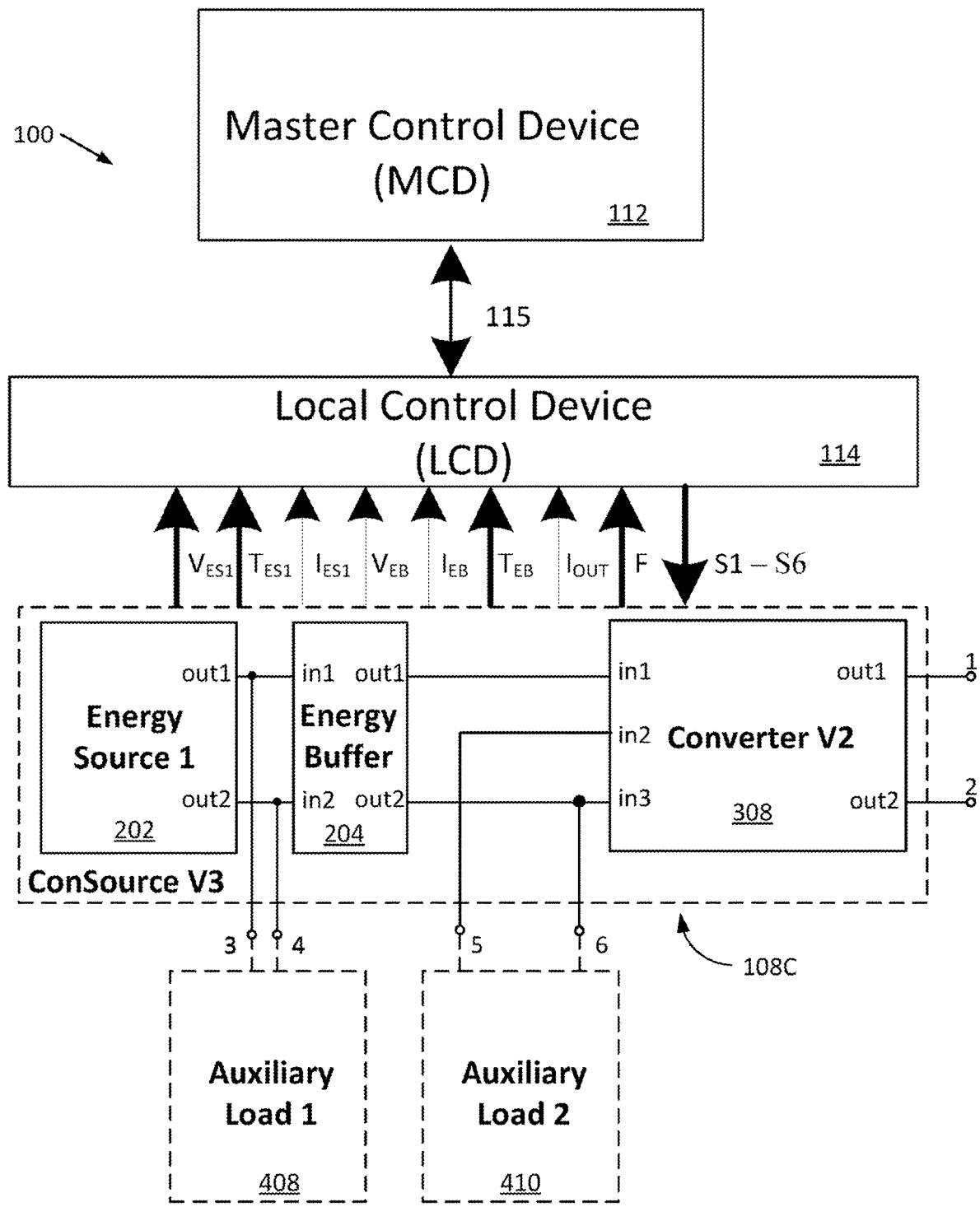
FIG. 4 is a block diagram depicting another example embodiment of a converter-source module (ConSource V3) with an LCD connected to an MCD and optional auxiliary loads, according to embodiments of the present disclosure.

FIGS. 2-4 depict example embodiments of converter-source modules 108 within system 100 as depicted in FIG. 1B, with one local control device 114 per module 108. The embodiments of FIGS. 2-4 and any and all other embodiments described herein can be implemented in accordance with the configurations of FIGS. 1A-1C unless otherwise noted.

ConSource modules 108 can be implemented as voltage converters or current converters. For ease of description, the embodiments described herein are done so with reference to voltage converters, although the embodiments can alternatively be configured as current converters.

FIG. 2 is a block diagram depicting an example embodiment of a ConSource module 108A within system 100. This embodiment of ConSource module 108A may be referred to herein as version 1 of an example ConSource module (ConSource V1) and is an example of a type of converter-source module 108. Also shown is a local control device 114 (LCD) and a master control device 112 (MCD). ConSource V1 108A is communicatively coupled with the LCD 114, which in turn is communicatively coupled with the MCD 112.

The ConSource V1 108A includes an energy source 202 (Energy Source 1), which can include one or more energy storage elements. Energy Source 1 can be, for example, one of the following, but not limited to, a high energy density (HED) capacitor such as an ultra-capacitor or a supercapacitor 600 (FIG. 6A), a battery module 610 including at least one cell or multiple battery cells connected in series and/or in parallel (FIG. 6B), or fuel, a fuel-cell, or fuel cell module 620 (FIG. 6C). HED capacitor 600 can utilize a double layer capacitance as opposed to a solid dielectric, and can have an energy density of 10 to 100 times (or higher) that of an ordinary electrolytic capacitor, in addition to a higher capacity. Battery energy sources Energy can be input and output through a first node (e.g., a positive node) out1 and a second node (e.g., a negative node) out2. The outputs out1 and out2 of Energy Source 1 can be connected to input terminals in1 and in2 of an Energy Buffer 204, respectively, which can include, for example, one of the following, but not limited to, elements and topologies based on: an electrolytic and/or film capacitor CEB 700 (FIG. 7A), a Z-source network 710, formed by two inductors LEB1 and LEB2 and two electrolytic and/or film capacitors CEB1 and CEB2 (FIG. 7B), a Quasi Z-source network 720, formed by two inductors LEB1 and LEB2, two electrolytic and/or film capacitors CEB1 and CEB2 and a diode DEB (FIG. 7C). A choice of specific topology and components of Energy Buffer depends on a maximum permissible amplitude of high frequency voltage pulsations on output terminals out1 and out 2 of the Energy Buffer. These pulsations can degrade the performance of the ConSource module 108, thus they can be efficiently buffered by designing suitable elements and topologies as a basis thereof.

The outputs out1 and out2 of Energy Buffer 204 are connected respectively to the inputs in1 and in2 of a Converter V1. A schematic representation of an example embodiment of a converter V1 206 is shown in FIG. 5A. The Converter V1 206 can include switch circuitry 207 configured to place at least three different voltages (based on line voltage $V_{DCL}$) across out1 and out2: $+V_{DCL}$, $-V_{DCL}$, and zero (e.g., a short condition). Switch circuitry 207 can also be configured to block current flow across out1 and out2 (e.g., an open condition). Switch circuitry 207 can be configured in numerous different ways within numerous different switch types. Example switch types include, but are not limited to semiconductor switches, such as metal-oxide-semiconductor field-effect transistors or MOSFETs (as shown in FIG. 5A), insulated-gate bipolar transistors (IGBTs) or Gallium Nitride (GaN) transistors. Semiconductor switches can be operated at relatively high switching frequencies, thereby permitting the Converter V1 to be operated in pulse-width modulated mode if desired, and to respond to control commands within a relatively short interval of time. This can provide a high tolerance of output voltage regulation and fast dynamic behavior in transient modes. The switch circuitry 207 can be controlled by one or more control or switch signals (not shown) produced by control circuitry 102 (e.g., MCD 112 or LCD 114).

In many embodiments, the switch circuitry 207 can include at least four independently controllable switches S3, S4, S5, S6, which can be configured as an H-bridge. In this embodiment, Converter V1 206 generates three different voltage outputs, $+V_{DCL}$, 0, and $-V_{DCL}$ by connecting the DC line voltage $V_{DCL}$, between its terminals in1 and in2, to its output terminals out1 and out2 by different combinations of switches S3, S4, S5, S6. To obtain $+V_{DCL}$, switches S3 and S6 are turned on, whereas $-V_{DCL}$ can be obtained by turning on the switches S4 and S5. By turning on S3 and S5 or S4 and S6, the output voltage is set to zero (e.g., short) or a reference voltage.

Figure 9:
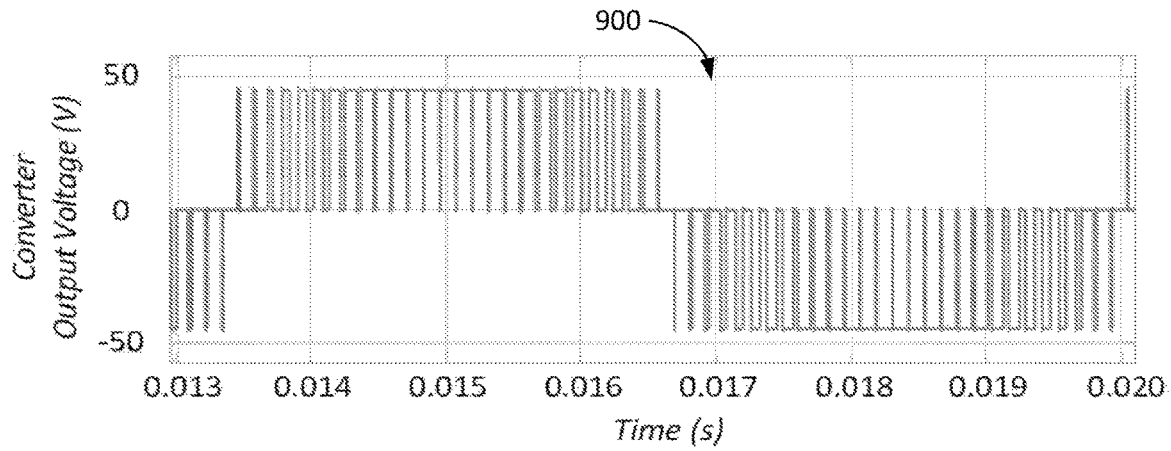
FIG. 9 is a graph depicting the output voltage from an example converter according to embodiments of the present disclosure.

The control or switch signals (input paths not shown) for semiconductor switches S3, S4, S5, S6 may be generated in different ways depending on the flexibility and requirements of the adopted control technique in the LCD and MCD (shown in FIG. 2). One approach is to use pulse width modulation (PWM) techniques, such as space vector pulse-width modulation SVPWM or sinusoidal pulse-width modulation SPWM, or variations thereof, to generate the output voltage of Converter V1. An example of an output voltage waveform 900 of a Converter V1 is shown in FIG. 9. The modulation method also depends on which version of system 100 to which it is applied and one possible solution of modulation will be presented herein further as an example.

In some embodiments using PWM, the LCD (and not the MCD) generates the switching signals for the switches in the ConSource module, although the PWM embodiments are not limited to such. In some embodiments, such as those using hysteresis, generation of the switching signals can be performed by the MCD. The LCD 114 shown in FIG. 2 can be connected to ConSource V1 108A via a set of diagnostics, measurement, protection and control signal lines, and can perform one or more of three primary functions. The first function is management of Energy Source 1. The second function is protection of the Energy Buffer and more specifically its components from over-current, over-voltage and high temperature conditions. The third function is control and protection of Converter V1 206.

In one example embodiment, the function of management, by the LCD 114, of Energy Source 1 for ConSource V1 module 108A is as follows. The LCD 114 accepts the measurement signals VES1, TES1, IES1, which are: VES1—the voltages of at least one of the, preferably all, elementary components of Energy Source 1 or the voltages of groups of elementary components, such as, for example and not limited to, battery cells (individual or connected in series and/or in parallel), ultra-capacitor cells (individual, or connected in series and/or in parallel); TES1—the temperatures of at least one of, preferably all, elementary components of Energy Source 1 or the temperatures of groups of elementary components; IES1—the output current of Energy Source 1. Based on these measurement signals the LCD 114 can perform one or more of the following: calculation or determination of a real capacity, actual State of Charge (SOC) and State of Health (SOH) of the elementary components or groups of elementary components; set a warning or alarm signal, based on measured and/or calculated data; and/or transmission of corresponding signals to the MCD 112.

In one example embodiment, the function of protection, by the LCD, of the Energy Buffer 204 for ConSource V1 module 108A is as follows. The LCD 114 accepts the measurement signals VEB, TEB, IEB, which are: VEB—the voltages of at least one major component of the Energy Buffer 204, for example and not limited to, capacitor CEB, or capacitors CEB1, CEB2 (see FIGS. 7A-7C); TEB—the temperature of at least one component of the Energy Buffer 204; and/or IEB—the current through at least one component of the Energy Buffer 204. Based on these measurement signals, the LCD 114 can perform the following: setting of a warning or alarm signal based on measured data; and/or transmission of corresponding warning or alarm signals to the MCD 112.

In one example embodiment, the function of control and protection, by the LCD 114, of the Converter V1 206 for ConSource V1 module 108A is as follows. The LCD can receive the command signals from the MCD over path 115 (e.g., over FlexRay or CAN), which in some embodiments can be a modulation reference signal and an enable signal, or a reference signal and a modulation index, which can be used with a pulse width modulation technique in the LCD to generate the control signals for semiconductor switches S3, S4, S5, S6. The current feedback signal TOUT (not shown in FIG. 2) coming from an integrated current sensor of Converter V1 206 can be used for overcurrent protection together with one or more signals F, coming from driver circuits (not shown in FIG. 2) of the switches of Converter V1 206, which can carry information about failure statuses (e.g., short circuit or open circuit failure modes) of all switches in Converter V1. Based on this data, the LCD can make a decision on which combination of switching signals to be applied to corresponding semiconductor switches S3, S4, S5, S6 to bypass or to disconnect the Converter V1 and the entire ConSource V1 module 108A from system 100. (A switching signals for a particular switch can turn that switch on or off.)

FIG. 3 is a block diagram depicting another example embodiment of a ConSource module 108B that may be referred to herein as version 2 of the ConSource module (ConSource V2) and is an example of a type of converter-source module 108. ConSource V2 108B is communicatively coupled with the LCD 114, which in turn is communicatively coupled with the MCD 112.

In this embodiment, the ConSource V2 108B is in a dual energy source configuration with a primary Energy Source 1 202 and secondary Energy Source 2 304. As with the ConSource V1 108A, Energy Source 1 can be or include any of the examples described with respect to FIGS. 6A-6C, or others.

The outputs out1 and out2 of Energy Source 1 202 can be connected to input terminals in1 and in2 of Energy Buffer 204. As with the ConSource V1 108A, Energy Buffer 204 can be or include any of the examples described with respect to FIGS. 7A-7C, or others. The outputs out1 and out2 of Energy Buffer 204 are connected respectively to the inputs in1 and in3 of Converter V2 308.

The output out2 of the Energy Buffer 204 can be connected also to the output out2 of Energy Source 2 304. Another output of Energy Source 2, out1, can be connected to input in2 of Converter V2 308. The Energy Source 2 can include, for example, one of the following, but not limited to, storage elements such as: an electrolytic and/or a film capacitor CEB 800 (FIG. 8A); a high energy density (HED) capacitor 600 (FIG. 8B); a battery or battery module 610 including at least one battery cell or plurality of battery cells connected in series and/or in parallel (FIG. 8C); an electrolytic and/or a film capacitor CEB 800 connected in parallel with a high energy density capacitor 600 (FIG. 8D); an electrolytic and/or a film capacitor CEB 800 connected in parallel with battery module 610 (FIG. 8E); an electrolytic and/or a film capacitor CEB 800 connected in parallel with a high energy density capacitor 600 and a battery module 610 (FIG. 8F).

A simplified schematic representation of example embodiment of a Converter V2 308 is shown in FIG. 5B. Here, the Converter V2 308 includes switch circuitry 207 (as described with respect to FIG. 5A) and switch circuitry 208. Switch circuitry 208 can be configured in any arrangement and with any switch type that selectively couple in2 (through $L_C$) to either in1 or in3. Switch circuitry 208 can also be configured to block current flow through in2 (i.e., isolate in2) from in1 and in3. Switch circuitry 208 can be configured in any of the switch types described herein (e.g., semiconductor MOSFETs, IGBTs, GaN transistors, or others). Semiconductor switches can be operated at high switching frequency, thereby permitting the Converter V2 308 to be operated in pulse-width modulated mode if required, and to respond to the control commands within a short interval of time, providing a high tolerance of output voltages regulation and fast dynamic behavior in transient modes.

In this embodiment, switch circuitry 208 includes two independently controllable switches S1 and S2, and can generate two different voltages at Node 1, which are +VDCL and 0, referenced to input In3, which can be at virtual zero potential. The coupling inductor $L_C$ is connected between input In2 and Node 1. The output out1 of Energy Source 2 is connected to coupling inductor $L_C$ at the input In 3 of Converter V2 308. The current consumed from or generated to Energy Source 2 304 can be controlled by regulating the voltage on coupling inductor $L_C$, using, for example, a pulse-width modulation technique or a hysteresis control method for commutating switches S1 and S2. Other techniques can be used as well. Control signal input paths for switches S1 and S2 are not shown.

In this embodiment, switch circuitry 207 is configured in a similar manner as shown in FIG. 5A, and includes four switches S3, S4, S5, S6 capable of generating three different voltage outputs, $+V_{DCL}$, 0 (or a short condition), and $-V_{DCL}$ by connecting the DC line voltage $V_{DCL}$ between terminals in1 and in2 to the output terminals out1 and out2 by different combinations of switches S3, S4, S5, S6. To obtain $+V_{DCL}$ voltage between out1 and out2, switches S3 and S6 are turned on, whereas $-V_{DCL}$ voltage between out1 and out2 can be obtained by turning on switches S4 and S5. By turning on S3 and S5 or S4 and S6, the output voltage is set to zero or a reference potential. As with semiconductor switches S1 and S2, the control of semiconductor switches S3, S4, S5, S6 may be performed using the various PWM or hysteresis techniques described herein, or others. Control signal input paths for switches S3, S4, S5, S6 are not shown.

In this example ConSource V2 module 108B, Energy Source 1 202 acts as a primary energy source and therefore supplies the average power needed by the load. Energy Source 2 304 can be a secondary energy source with the function of assisting Energy Source 1 by providing additional power at load power peaks, or absorbing excess power.

Figure 10:
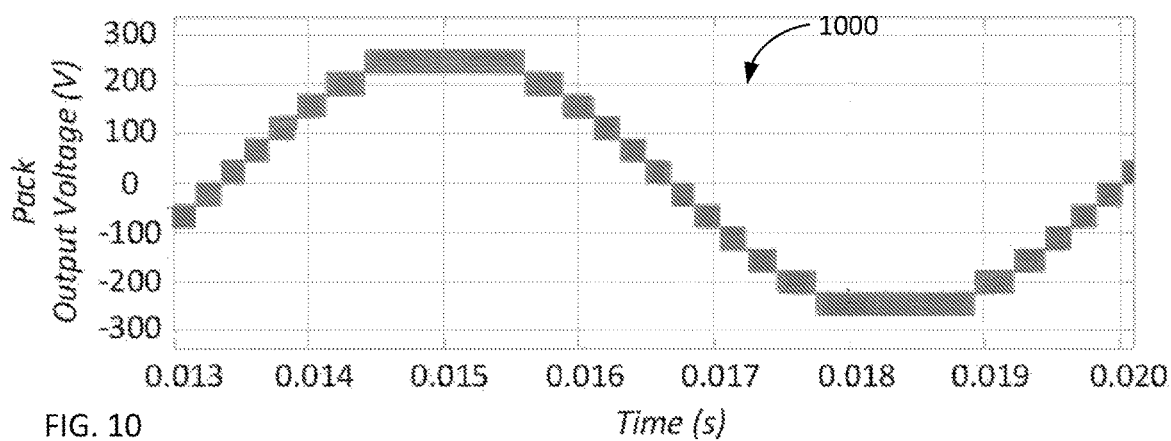
FIG. 10 is a graph depicting the output voltage from an example module-based energy storage system having six example converter-source modules, according to embodiments of the present disclosure.

FIG. 10 shows the output voltage waveform 1000 from an example module-based energy storage system having six example converter-source modules 108.

Figure 11:
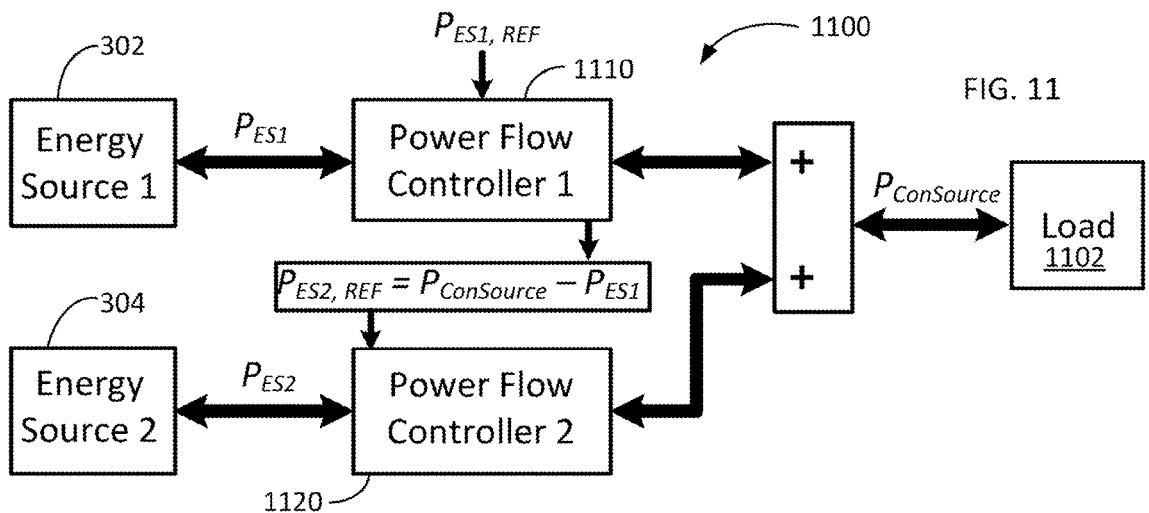
FIG. 11 is a block diagram depicting an example embodiment of power flow management for the example converter-source module (ConSource V2) shown in FIG. 3, according to embodiments of the present disclosure.

FIG. 11 is a block diagram depicting an example embodiment of power flow management 1100 between two Energy Sources (Energy Source 1 202 and Energy Source 2 304) and a load for an example embodiment of a ConSource V2 module 108B. The load can be, for example, but not limited to, a single phase of an electric vehicle motor or an electrical grid. This embodiment allows a complete decoupling between the electrical characteristics (terminal voltage and current) of each energy source and those of the load 1102.

In these embodiments, Power Flow Controller 1 1110 and Power Flow Controller 2 1120 can be discrete control devices, separate from the LCD 114 and MCD 112, can be implemented as software within the LCD, can be implemented as hardware within the LCD, or can be implemented as a combination of hardware and software within the LCD. In some embodiments, the functions of Power Flow Controller 1 1110 and Power Flow Controller 2 1120 can be shared or distributed between the LCD 114 and MCD 112.

Power Flow Controller 1 1110 can receive a signal of reference power flow of Energy Source 1 ($P_{ES1, REF}$) from the LCD 114. This signal can be determined by a main Power Management Controller located in the MCD 112 based on motor power or electrical grid power requirements and a status of Energy Source 1 202 of the ConSource V2 module 108B. Power Flow Controller 1 1110 can estimate a maximum allowable charge and/or discharge current of Energy Source 1 202 and calculate a real permissible power flow (P E si) of Energy Source 1. This value can be compared with $P_{CONSOURCE}$ and the difference can be applied to Power Flow Controller 2 1120 as a signal ($P_{ES2, REF}$). Power Flow Controller 2 1120 can calculate the reference current in coupling inductor $L_C$ based on the voltage between output terminals out1 and out2 of Energy Source 2 304 and determines the switching signals for switches S1 and S2 of Converter V2 308, using, for example, but not limited to pulse-width modulation or hysteresis control algorithms. Thus, the total power flow ($P_{CONSOURCE}$) can be provided by the switching portion of Converter V2 that includes switches S3, S4, S5, S6. The power flow of Energy Source 1 202 (P E si) can be estimated based on a maximum permissible current of Energy Source 1 and actual conditions of Energy Source 1, such as, but not limited to, State of Charge (SOC), State of Health (SOH), temperature of elementary cells or a group of parallel and/or series connected cells, equivalent series resistance, and the like. The power flow ($P_{ES1}$) can be maintained as a difference between current values of the load ($P_{LOAD}$) and energy source 2 ($P_{ES2}$), where $P_{ES2}$ is managed by the switching portion of Converter V2 308 that includes switches S1, S2 and the coupling inductor $L_C$.

In many embodiments, Energy Source 2 304 can be a secondary energy source and its function is to assist Energy Source 1 202 by providing power at load power peaks and/or absorbing excess power. A secondary function of Energy Source 2 304 can be active filtering, such as to reduce (attenuate) or eliminate any second-order current harmonic that appears in the current IDC_CONV flowing at the inputs in1 and in3 of the Converter V2 as a result of, e.g., the intrinsic pulsating power nature of a single-phase system. This harmonic can have a considerable peak-to-peak value, which can reach up to two times the load current amplitude. The second-order current component exhibits some disadvantages, e.g., increase of the inner losses in the Energy Source 1 202 related to the resulting current RMS value. To perform this secondary function, Energy Source 2 304 can include an electrolytic capacitor or an ultra-capacitor (or super-capacitor) as standalone components, or connected in parallel with other energy storage elements as shown in FIGS. 8A, 8B, and 8D-8F.

FIGS. 12A and 12B show examples of waveforms 1200, 1220 occurring before and during performance this active filtering secondary function. Before the compensations starts (before time moment $t_1$), the current of Energy Source 1 202 (FIG. 12A) includes a DC-component (IDC=130 A) and a second order harmonic component with an amplitude I2 AC=60 A. The high frequency harmonics (not shown) that are determined by the switching behavior of Converter V2 308 are efficiently buffered by the Energy Buffer 204. Starting from the time moment $t_1$, the Converter V2 starts generating current $I_{ES2}$, redirecting the second order harmonic of current $I_{ES1}$ to Energy Source 2. This current $I_{ES2}$ has an amplitude of main harmonic equal to that of the second order harmonic of $I_{ES1}$ current, but with nearly opposite phase angle, in such a way that the resulting current in Energy Source 1 $I_{ES1}$ includes either DC-component only or mostly DC-component with some significantly reduced AC-ripples, as shown in FIG. 12A. In a case where only the secondary function is performed by Converter V2, and if the Energy Source 2 includes only a capacitor and/or a super-capacitor 810, the current $I_{ES2}$ (FIG. 12B) may include a DC component which is needed to be supplied from the load or from Energy Source 1 202 to maintain the voltage on the capacitor and/or the super-capacitor 810 of Energy Source 2 304 at set value, which is required for correct operation of Converter V2 308.

Both primary and secondary functions performed by Converter V2 and described above can be performed either separately or at the same time. If at the same time, the Energy Source 2 304 preferably includes an electrolytic capacitor or ultra-capacitor 810 connected in parallel with other energy storage elements as shown in FIGS. 8A, 8B, and 8D-8F.

The LCD 114 for ConSource V2 module is shown in FIG. 3 connected to ConSource V2 module 108B via a set of diagnostics, measurement, protection and control signal lines, and can perform at least one of, preferably all of, four major functions. The first function is management of Energy Source 1 202. The second function is management of Energy Source 2 304. The third function is protection of the Energy Buffer 204 and more specifically its components from over-current, over-voltage and high temperature. The fourth function is control and protection of Converter V2 308.

The function of management of Energy Source 1 for ConSource V2 module 108B can be as follows. The LCD 114 accepts the measurement signals VES1, TES1, IES1, which are: VES1—the voltages of all elementary components/cells of Energy Source 1 or the voltages of groups of elementary components/cells, such as, for example, but not limited to, battery cells, individual or connected in series and/or in parallel, ultra-capacitor cells, individual, or connected in series and/or in parallel; TES1—the temperatures of all elementary components of Energy Source 1 or the temperatures of groups of elementary components; IES1—the output current of Energy Source 1. Based on these measurement signals LCD can perform the following: calculates a real capacity, actual State of Charge (SOC) and State of Health (SOH) of the elementary components or groups of elementary components; set a warning or alarm signal based on measured and calculated data; transmission of corresponding signals to the MCD 112.

The function of management of Energy Source 2 304 for ConSource V2 module 108B can be as follows. The LCD 114 can receive the measurement signals VES2, TES2, IES2, which are: VES2—the voltages of all elementary components or cells of Energy Source 2 or the voltages of groups of elementary components or cells, such as, for example and not limited to, battery cells, individually or connected in series and/or in parallel, ultra-capacitor cells, individually or connected in series and/or in parallel; TES2—the temperatures of all elementary components of Energy Source 2 or the temperatures of groups of elementary components; IES2—the output current of Energy Source 2. Based on these measurement signals, the LCD can perform the following: calculates a real capacity, actual State of Charge (SOC) and State of Health (SOH) of the elementary components or groups of elementary components; set a warning or alarm signal, based on measured and calculated data; and/or communicated corresponding signals to the MCD.

The function of protection of Energy Buffer 204 for ConSource V2 module 108B can be as follows. The LCD 114 receives the measurement signals VEB, TEB, IEB, which are: VEB—the voltages of at least one major component of Energy Buffer, for example and not limited to, capacitor CEB, or capacitors CEB1, CEB2 (see FIGS. 7A-7C); TEB—the temperature of at least one major components of Energy Buffer; and/or IEB—the current through at least one major components of Energy Buffer. Based on these measurement signals LCD can perform the following:

set a fault (e.g., warning or alarm) signal based on measured data; and/or transmit corresponding fault signals to the MCD 112.

The function of control and protection of Converter V2 308 for ConSource V2 module 108B can be as follows. The LCD 114 receives the command signals from the MCD 112, which can be a modulation reference signal and enable signal, or a reference signal and a modulation index, which can be used in a PWM and/or a Hysteresis function in the LCD to generate the control signals for semiconductor switches S1, S2, S3, S4, S5, S6 in accordance to power management and/or second order harmonic reduction techniques described above. The current feedback signals IES2, TOUT coming from the integrated current sensors (not shown in FIG. 3) of Converter V2 can be used for overcurrent protection together with signals F, for example, coming from driver circuits (not shown in FIG. 3), of semiconductor devices of Converter V2 308, which carry the information about failure statuses (e.g., short circuit or open circuit failure mode) of one or more, preferably all, of the semiconductor switches. Based on this specific data, the LCD 114 can make a decision on which combination of switching signals S1, S2, S3, S4, S5, S6 to be applied to the corresponding semiconductor switches to bypass or disconnect the Converter V2 and the entire ConSource V2 module from system 100 (e.g., the battery pack, etc.).

FIG. 4 is a block diagram depicting an example embodiment of a ConSource module 108C, referred to as version 3 of the ConSource module (ConSource V3) and is an example of a type of converter-source module 108. ConSource V3 108C is communicatively coupled with the LCD 114, which in turn is communicatively coupled with the MCD 114.

The ConSource V3 module 108C can include an energy source Energy Source 1 202 and Converter V2 308 with an additional input for connection of an Auxiliary Load 2 410, if desired. The ConSource V3 module has output ports 1 and 2 for connection with other ConSource (e.g., V1/V2/V3) modules within an example system 100. The illustrated output ports 3 and 4 of ConSource V3 are used for connection of the example ConSource V3 module to the same output ports of other ConSource V3 modules of an example system 100, if needed, and/or for connection to an Auxiliary Load 1 408, if desired. The illustrated output ports 5 and 6 of ConSource V3 108C are used for connection of the example ConSource V3 module to the same output ports of other ConSource V3 modules of an example system 100, if needed, and/or for connection to an Auxiliary Load 2 410, if desired.

As with the ConSource V1 108A, Energy Source 1 202 of ConSource V3 module 108C can be or include any of the examples described with respect to FIGS. 6A-6C, or others.

The outputs out1 and out2 of Energy Source 1 202 are connected to input terminals in1 and in2 of the Energy Buffer 204. As with the ConSource V1 108A, Energy Buffer 204 of ConSource V3 module 108C can be or include any of the examples described with respect to FIGS. 7A-7C, or others.

The outputs out1 and out2 of Energy Buffer 204 are connected respectively to the inputs in1 and in3 of Converter V2 308. Converter V2 308 can be configured as discussed with respect to ConSource V2 module 108B (e.g., with respect to FIG. 5B). In this embodiment, the output of coupling inductor $L_C$ is connected through input In2 of Converter V2 308 to port 5 of ConSource V3 module 108C and to optional Auxiliary Load 2 410 as shown in FIG. 4. It is assumed that Auxiliary Load 2 has an input capacitor, so the Converter V2 308 can regulate, step down, and stabilize the required constant voltage on the load regulating the voltage on and current through coupling inductor $L_C$. If no input capacitor is present, then an optional capacitor (not shown) can be placed between In2 and In3 (or node 1 and in3) to form an $L_C$ circuit with coupling inductor $L_C$. For example, if Energy Source 1 is a battery module with a 48V standard operating voltage (e.g., twelve 4V cells in series), and Auxiliary Load 2 requires 24V, then S1 and S2 can be controlled to operate with a 50% duty cycle (with S1 closed and S2 open, then with S1 open and S2 closed) and, based on feedback from a current and/or voltage sensor, adjusted accordingly to maintain the voltage at the lower stepped down level of 24V. Auxiliary Load 1 is coupled in parallel with Energy Source 1, and thus operates at the same voltage as Energy Source 1 without regulation by Converter V2 308.

Additional auxiliary loads (e.g., Auxiliary Load 1) can be supplied by coupling outputs 3 and 4 to other loads operating at the same voltage as Energy Source 1, or alternatively by providing additional instances of outputs 3 and 4 for those additional loads. Additional auxiliary loads operating at stepped down voltages from Energy Source 1 (e.g., Auxiliary Load 2) can be supplied by adding additional instances of switch circuitry 208 and coupling inductor $L_C$, with additional output ports 5 and 6. Thus, the modules 108 described herein can be configured to supply any number of one or more auxiliary loads operating at the same or lower voltage levels than Energy Source 1.

The control switching signals for semiconductor switches S3, S4, S5, S6 may be generated in different ways depending on the flexibility and requirements of the adopted control technique in the LCD 114 and the MCD 112.

Energy Source 1 202 can supply the corresponding part of power needed by the load of system 100, Auxiliary Load 1 408 and/or Auxiliary Load 2 410, if connected. FIG. 13 shows an example of power flow management for a ConSource V3 module, where power flow between Energy Source 1, Auxiliary Load 1, and Auxiliary Load 2 can be adjusted. Examples of auxiliary loads can be, for example, an on-board electrical network of an electric vehicle, an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

In these embodiments, referring to FIG. 13, Power Flow Controller 1 1310 (PFC 1), Power Flow Controller 2 1320 (PFC 2), Power Flow Estimator 1 (PFE 1), and Power Flow Estimator 2 (PFE 2) can be discrete control devices, separate from the LCD 114 and MCD 112, can be implemented as software within the LCD, can be implemented as hardware within the LCD, or can be implemented as a combination of hardware and software within the LCD. In some embodiments, the functions of PFC 1, PFC 2, PFE 1, and PFE 2 can be shared or distributed between the LCD and MCD. For ease of explanation, in the following embodiment PFC1, PFC2, PFE1, and PFE2 are implemented as software instructions executed by the LCD.

PFE 1 can receive a signal of reference power flow of Energy Source 1 202 $P_{ES1, REF}$ from a main Power Management Controller (not shown) located in the MCD 112 based on the load power requirements and status of Energy Source 1 of this specific ConSource V3 module 108C. PFE1 can also receive the signal $P_{LOAD1}$, determined by power consumption and/or generation of Auxiliary Load 1 408 and obtained in power calculation block (not shown in FIG. 13), based on the current in Auxiliary Load 1 (e.g., measured by a current sensor which can be integrated in ConSource V3 module or received by the LCD directly from Auxiliary Load 1). The total reference power flow for Energy Source 1 202 $P_{TOT\_REF\_ES1}$ can be a sum of $P_{ES1,REF}$ and $P_{LOAD1}$. PFC 1 1310 can estimate a maximum allowable charge and/or discharge current of Energy Source 1 and calculate a real permissible power flow $P_{TOT,ES1}$ of Energy Source 1.

PFE 2 1320 can receive a signal of total power flow of Energy Source 1 $P_{TOT,ES1}$ from PFC 1. PFE2 can receive also the signal $P_{LOAD2}$, determined by power consumption and/or generation of Auxiliary Load 2 and obtained in a power calculation block (not shown in FIG. 13), based on the current in Auxiliary Load 2 (e.g., measured by a current sensor, which can be integrated in ConSource V3 module or received by the LCD directly from Auxiliary Load 2). The total reference power flow for ConSource V3 module with two Auxiliary loads $P_{CONSOURCE}$ can be the sum of $P_{LOAD2}$ and $P_{TOT,ES1}$. The total $P_{CONSOURCE}$ power flow is provided by the switching portions of the various Converters V2, each of which includes switches S3, S4, S5, S6. The power flow $P_{LOAD2}$ can be managed by the switching portion of Converter V2 that includes switches S1, S2 and coupling inductor $L_C$.

The LCD 114 for ConSource V3 module 180C is shown in FIG. 4. It can be connected to ConSource V2 module 108B via a set of diagnostics, measurement, protection and control signal lines, and can perform at least one of, preferably all of, four major functions. The first function can be management of Energy Source 1 202. The second function can be management of Auxiliary Load 2 410. The third function can be protection of the Energy Buffer 204 and more specifically its components from over-current, over-voltage and high temperature. The fourth function can be control and protection of Converter V1.

In some example embodiments, the function of management of Energy Source 1 202 for ConSource V3 module 108C can be as follows. The LCD 114 accepts the measurement signals VES1, TES1, IES1, which are: VES1—the voltages of all elementary components/cells of Energy Source 1 202 or the voltages of groups of elementary components/cells, such as, for example, but not limited to, battery cells, individual or connected in series and/or in parallel, ultra-capacitor cells, individual, or connected in series and/or in parallel; TES1—the temperatures of all elementary components of Energy Source 1 or the temperatures of groups of elementary components; IES1—the output current of Energy Source 1. Based on these measurement signals LCD can perform the following: calculates a real capacity, actual State of Charge (SOC) and State of Health (SOH) of the elementary components or groups of elementary components; set a warning or alarm signal based on measured and calculated data; transmission of corresponding signals to the MCD.

The function of management of Auxiliary Load 2 410 for ConSource V3 module 108C can be as follows. The LCD receives the measurement signals VAL2, IAL2, which are: VAL2—the voltage between ports 5 and 6 of ConSource V3 module, and IAL2—the current in coupling inductor LC of Converter V2, which is a current of Auxiliary Load 2. In some embodiments, the LCD reports these signals (or representations thereof) to the MCD, which performs correction by adjusting the modulation index of the module 108C. In other embodiments, based on these signals the LCD performs a correction of the reference signal for pulse width modulation in the LCD to stabilize and/or to control the voltage on Auxiliary Load 2.

The function of protection of Energy Buffer 204 for ConSource V3 module 108C can be as follows. The LCD can receive the measurement signals VEB, TEB, IEB, which are: VEB—the voltages of at least one major component of Energy Buffer, for example and not limited to, capacitor CEB, or capacitors CEB1, CEB2 (see FIGS. 7A-7C); TEB—the temperature of at least one major components of Energy Buffer 204; IEB—the current through at least one major components of Energy Buffer 204. Based on these measurement signals LCD can perform the following: set a fault (e.g., warning or alarm) signal based on measured data; and/or transmit corresponding fault signals to the MCD.

The function of control and protection of Converter V2 308 for ConSource V3 module 108C can be as follows. The LCD 114 receives the command signals from the MCD 112, which can be a modulation reference signal and enable signal, or a reference signal and a modulation index, which can be used in a PWM and/or a Hysteresis function in the LCD to generate the control signals for semiconductor switches S1, S2, S3, S4, S5, S6 in accordance to power management and/or second order harmonic reduction techniques described above. The current feedback signals IES2, TOUT coming from integrated current sensors of Converter V2 (not shown in FIG. 4) can be used for overcurrent protection together with one or more signals F, coming from driver circuits (not shown in FIG. 4), of semiconductor devices of Converter V2, which carry the information about failure statuses (e.g., short circuit or open circuit failure mode) of one or more, preferably all, of the semiconductor switches. Based on this specific data, the LCD can make a decision on which combination of switching signals S1, S2, S3, S4, S5, S6 to be applied to the corresponding semiconductor switches to bypass or disconnect the Converter V2 308 and the entire ConSource V3 module from system 100 (e.g., the battery pack, etc.).

One example of a ConSource module is a converter-battery module having a battery as the first energy source. A converter-battery module can be referred to as a ConBatt module. A ConBatt module can be used in, e.g., a battery pack of a mobile application such as an electric vehicle (EV). System 100, configured for use as a battery pack with a plurality of ConBatt modules, can be referred to as a ConBatt pack.

In other example embodiments, the ConSource modules can connect with additional sources of electrical power, such as photovoltaic panels and/or a wireless charging receiver. In other example embodiments, system 100 can connect to another system 100 (e.g., another ConBatt pack) coupled with other auxiliary loads of different voltage levels, such as, e.g., an EV's on-board electrical network system and air-conditioner.

The features of one example embodiment of ConSource modules V1, V2, or V3 can be combined with the features of another example embodiment of ConSource modules V1, V2, or V3 as desired. For example, ConSource modules V1 and V2 can each be configured to supply Auxiliary Loads 1 and/or 2 as described with respect to ConSource module V3. By way of another example, ConSource modules V1 and V3 can each be configured with a second energy source (Energy Source 2) as described with respect to ConSource module V2.

Example Embodiments of Module Arrangements for Module-Based Systems

FIGS. 15-29 depict example embodiments of system 100 arranged according to various architectures or configurations. In these embodiments system 100 can be configured as one or more module packs, although the embodiments are not limited to packs. For ease of illustration, the MCD and the LCDs in each embodiment are not shown. As can be seen, the modules can be arranged in numerous ways such that the power contributed by each module can be summed to form one or more of, e.g., a single phase AC output, multiple phases of AC outputs, and a DC output.

Figure 15:
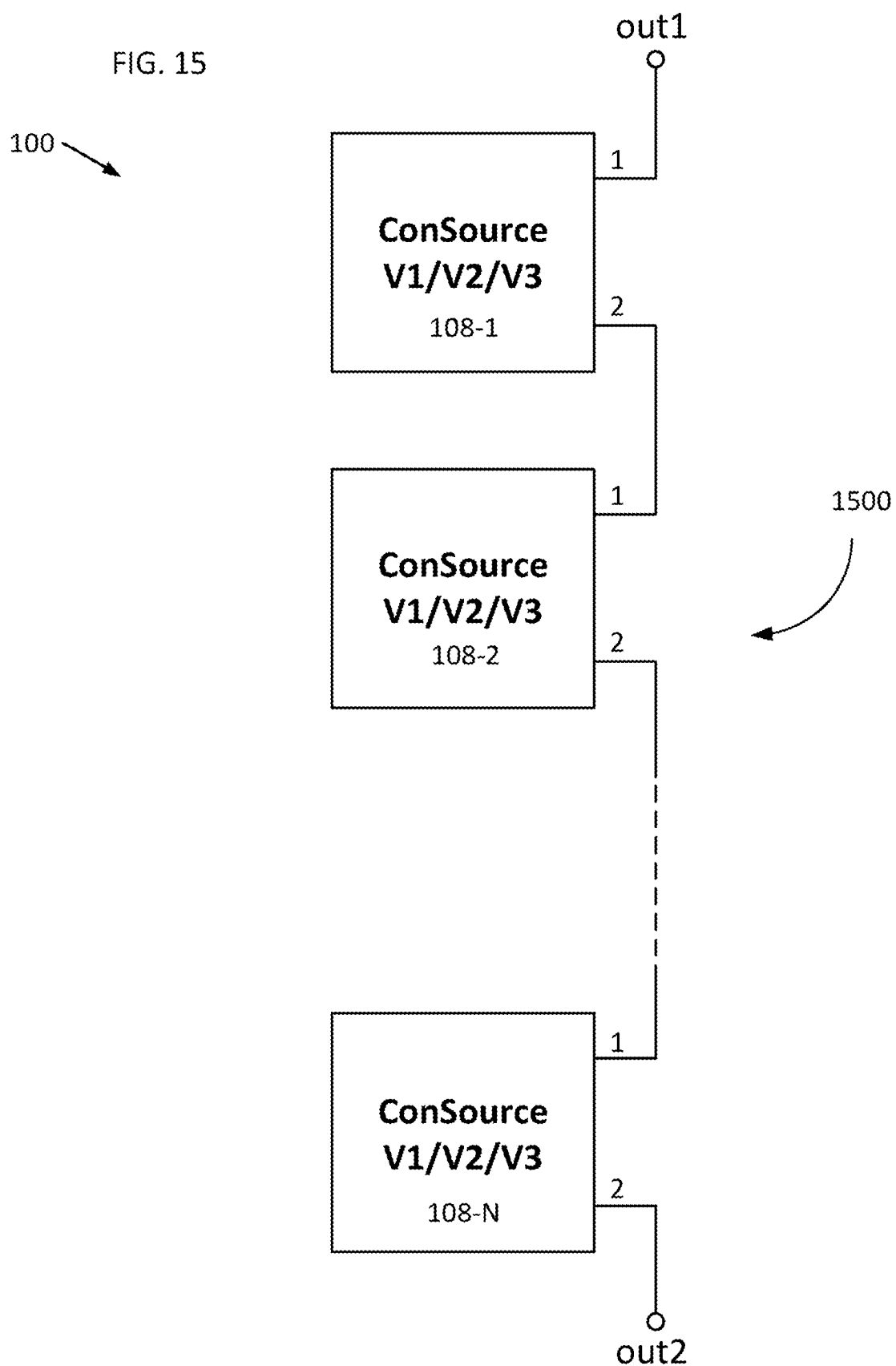
FIG. 15 is a schematic depicting an example one-dimensional array of connected example converter-source modules, according to example embodiments of the present disclosure.

FIG. 15 shows an example embodiment of a ConSource pack 1500 including a one-dimensional array of N number of connected ConSource modules 108-1, 108-2 . . . 108-N according to the present disclosure. The one dimensional array can also be referred to as a cascade of N stages, where each stage corresponds to one module 108. All of the modules 108 shown here can, if desired, be combined in a single energy pack, where the modules 108 are co-located in a single common enclosure or housing. Each of the Con-Source modules in the array may be configured according to any one of the three module versions (V1, V2 and V3) discussed above with regard to FIGS. 2, 3 and 4. The plurality of ConSource modules may include modules configured according to the same module version (V1, V2 or V3) or a mixture of modules configured according to two or more of the three module versions (V1, V2 and V3). A first port 1 of an ConSource V1/V2/V3 module of a first row of the one-dimensional array ("first ConSource V1/V2/V3 module") is connected to a first output terminal out1 of the one-dimensional array of ConSource modules. A second port 2 of the first ConSource V1/V2/V3 module is connected to a first port 1 of a ConSource V1/V2/V3 module in a second row ("second ConSource V1/V2/V3 module"). A second port 2 of the second ConSource V1/V2/V3 module is connected to a first port of ConSource V1/V2/V3 module in a third row ("third ConSource V1/V2/V3 module") and so on in the same order further down to a Nth ConSource V1/V2/V3 module in an Nth or last row. A second port 2 of the Nth ConSource V1/V2/V3 module is connected to a second output terminal out 2 of the one-dimensional array 1500. This one-dimensional array of N number of connected ConSource modules can be used as a DC or single phase AC energy source, such as, e.g., a battery pack, for stationary energy storage applications for DC or AC single-phase loads. A DC or AC single-phase load can be connected between the first and second output terminals out1 and out2.

The output voltage of the one-dimensional array of N number of connected ConSource modules can be generated using, for example, but not limited to, space vector modulation or sine pulse width modulation ("PWM") with a Phase Shifted Carrier technique. The switching signals for each of the ConSource modules' Converter may then be generated using Phase Shifted Carrier technique. This technique ensures that the ConSource modules are continuously rotated and the power is almost equally distributed among them.

Figures 14A, 14B, 14C, 14D:
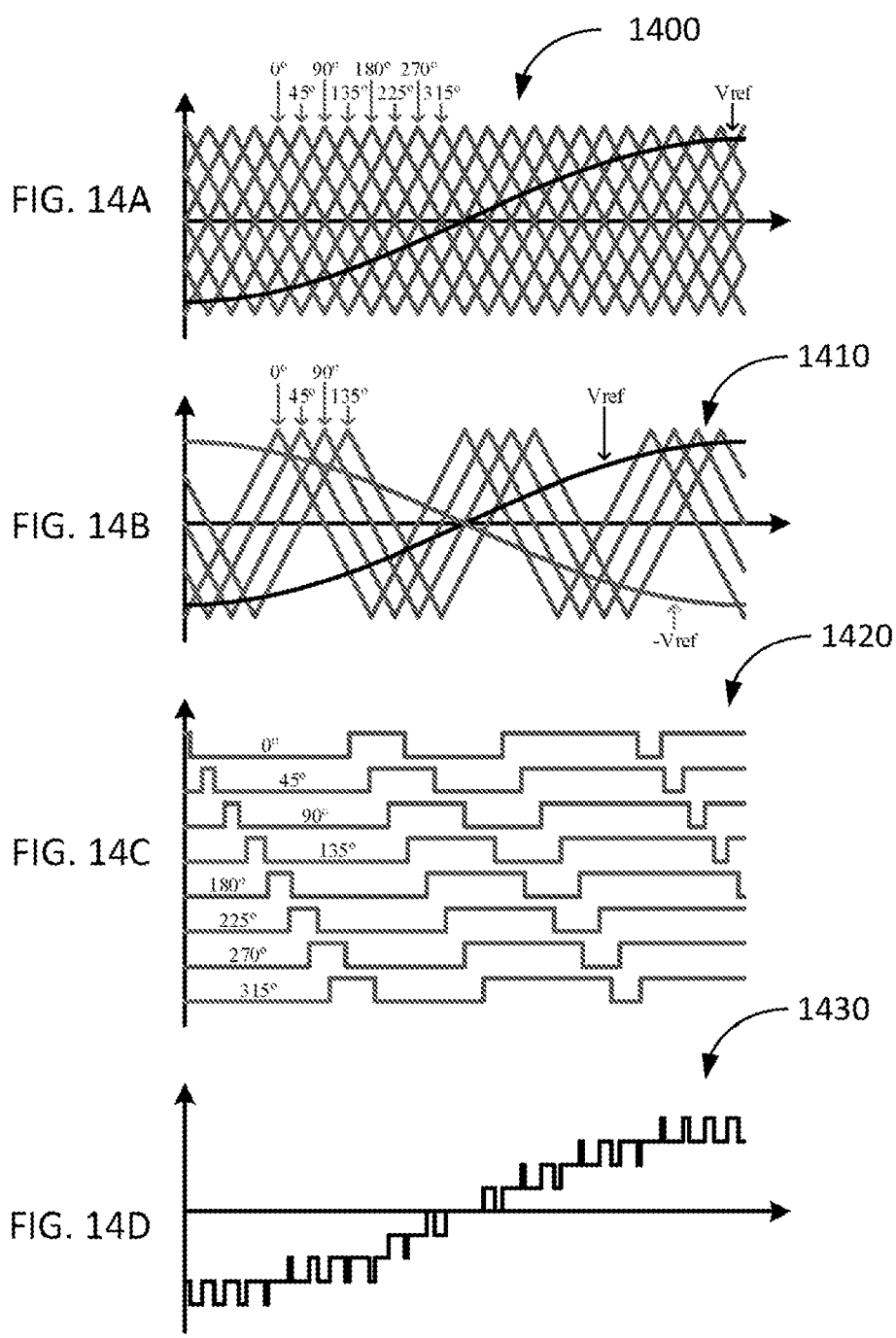
FIGS. 14A, 14B, 14C, and 14D are graphs depicting an example embodiment of pulse width modulation applicable to example embodiments of module-based energy systems.

The example purpose of a phase shifted technique is to generate a multilevel output PWM waveform using incrementally shifted two-level waveforms. Therefore an X-level PWM waveform is created by the summation of (X−1)/2 two-level PWM waveforms. These two-level waveforms are generated by comparing the reference waveform Vref to triangular carriers 1400, 1410 (FIGS. 14A, 14B) that are incrementally shifted by 360°/(X−1). A 9-level example 1400 is shown in FIG. 14A (using four modules 108). The carriers are incrementally shifted by 360°/(9-1)=45° and compared to the reference waveform. The resulted two-level PWM waveforms 1420 are shown in FIG. 14C. These two-level waveforms may be used as the switching signals for semiconductor switches of the Converters in each Con-Source module 108. As an example, for a one-dimensional array including four cascaded ConSource modules, each having a Converter V1 (with S3, S4, S5, S6 arranged in an H-bridge), the 0° signal is used for S3 and 180° signal for S6 of the first ConSource module, the 45° signal is used for S3 and 225° signal for S6 of the second ConSource module, and so on. Note that in all of Converters V1/V2/V3, the signal for S3 is complementary to S4 and the signal for S5 is complementary to S6 along with certain dead-time to avoid shoot through of each leg. FIG. 14D depicts an example AC waveform produced by superposition of output voltages from the four modules.

Depending on the resources and limitations of the hardware that is used to implement the modulation, an alternative is to generate the negative reference signal along with the first (N−1)/2 carriers. The 9-level example is shown in FIG. 14B. In this case, the 0° to 135° PWM signals are generated by comparing Vref to the corresponding carriers and the 180° to 315° PWM signals are generated by comparing −Vref to carriers of 0° to 135°. However, the logic of the comparison in the latter case must be reversed. Other techniques such as a state machine decoder may also be used to generate the gate signals for the H-bridges.

In multi-phase system embodiments, the same carriers can be used for each phase, or the set of carriers can be shifted as a whole for each phase. For example, in a three phase system each phase array can use the same number of carriers with the same relative offsets as shown in FIGS. 14A and 14B, but the carriers of the second phase are shift by 120 degrees as compared to the carriers of the first phase, and the carriers of the third phase are shifted by 240 degrees as compared to the carriers of the first phase. In many cases the carrier frequencies will be fixed, but in some example embodiments, the carrier frequencies can be adjusted. Adjustment of the carrier frequencies can help to reduce losses in an EV motor under high current conditions.

This one-dimensional array 1500 embodiment of system 100 shown in FIG. 15 enables obtaining a high voltage of any shape with very low total harmonic distortion between first and second terminals out 1 and out 2 using low and/or medium voltage rated energy source elements and switching components (MOSFETs, JFETs, IGBTS, etc.) with significantly reduced switching and conduction losses in the Con-Source modules.

Figure 16:
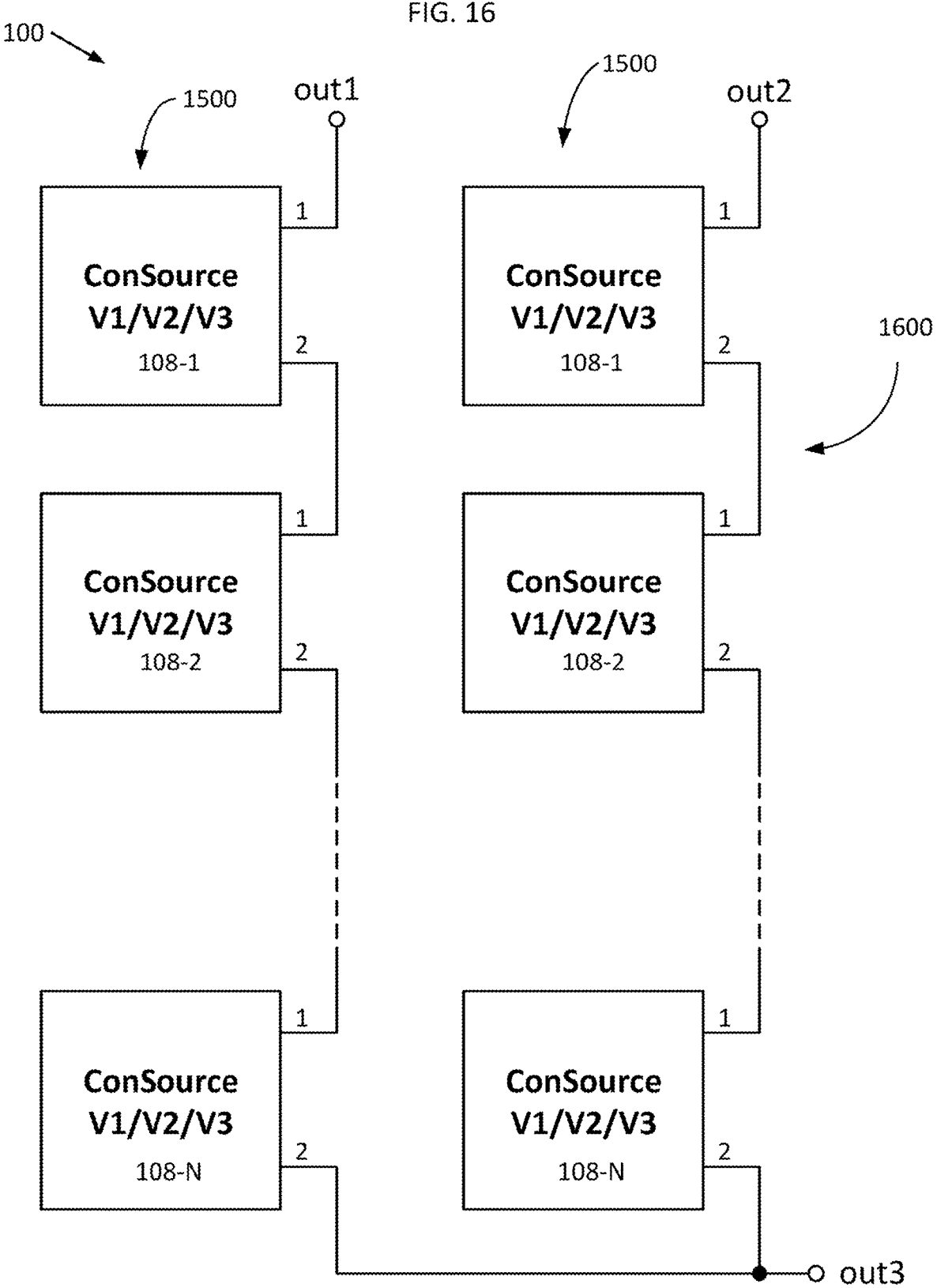
FIG. 16 is a schematic depicting an example two-dimensional array of connected example converter-source modules, according to example embodiments of the present disclosure.

FIG. 16 shows an example embodiment of a first version of a ConSource pack including a two-dimensional array 1600 or two one-dimensional arrays 1500 of N number of connected ConSource V1/V2/V3 modules 108-1, 108-2 . . . 108-N according to the present disclosure. Output of DC or AC voltage generation of each of the two one-dimensional arrays 1500, which form this two-dimensional array 1600, is described above with regard to FIG. 15. All of the modules 108 shown here can, if desired, be combined in a single energy pack, where the modules 108 are co-located in a single common enclosure or housing. A second port 2 of each of an Nth ConSource V1/V2/V3 module in Nth or last rows of both of the one-dimensional arrays are connected together and to a common output terminal Out3 of the two-dimensional array. Output voltages are provided between first and second output terminals Out1 and Out2 and the common output terminal Out3.

This two-dimensional array of 2N number of connected ConSource V1/V2/V3 modules can be used as a two-phase AC energy source for stationary energy storage applications for DC or AC single-phase loads. The load can be connected between first and second output terminals Out1 and Out2, while the common terminal Out3 can be connected to a neutral of the load, if required.

The first and second output terminals out1 and out2 of the example two-dimensional array based ConSource pack can be connected together via coupling inductors and connected to the same first terminal of an AC or DC load, when the common output terminal out3 is connected to the second terminal of the AC or DC load. In this case the output power capability of such two-dimensional array based ConSource pack with N rows is two times higher than one of the single-dimensional array based ConSource pack with the same number N of rows.

This two-dimensional array embodiment of system 100 shown in FIG. 16, enables obtaining a two phase system of high voltages with 90 degree phase displacement. For example, such systems can be used in electrical furnaces. In general, the high voltages of any shape with very low total harmonic distortion can be obtained between terminals out1, out2 and common terminal out3, which can serve as a Neutral, using low and/or medium voltage rated energy source elements and switching components (MOSFETs, JFETs, IGBTS, etc.) with significantly reduced switching and conduction losses in the ConSource modules.

Figure 17:
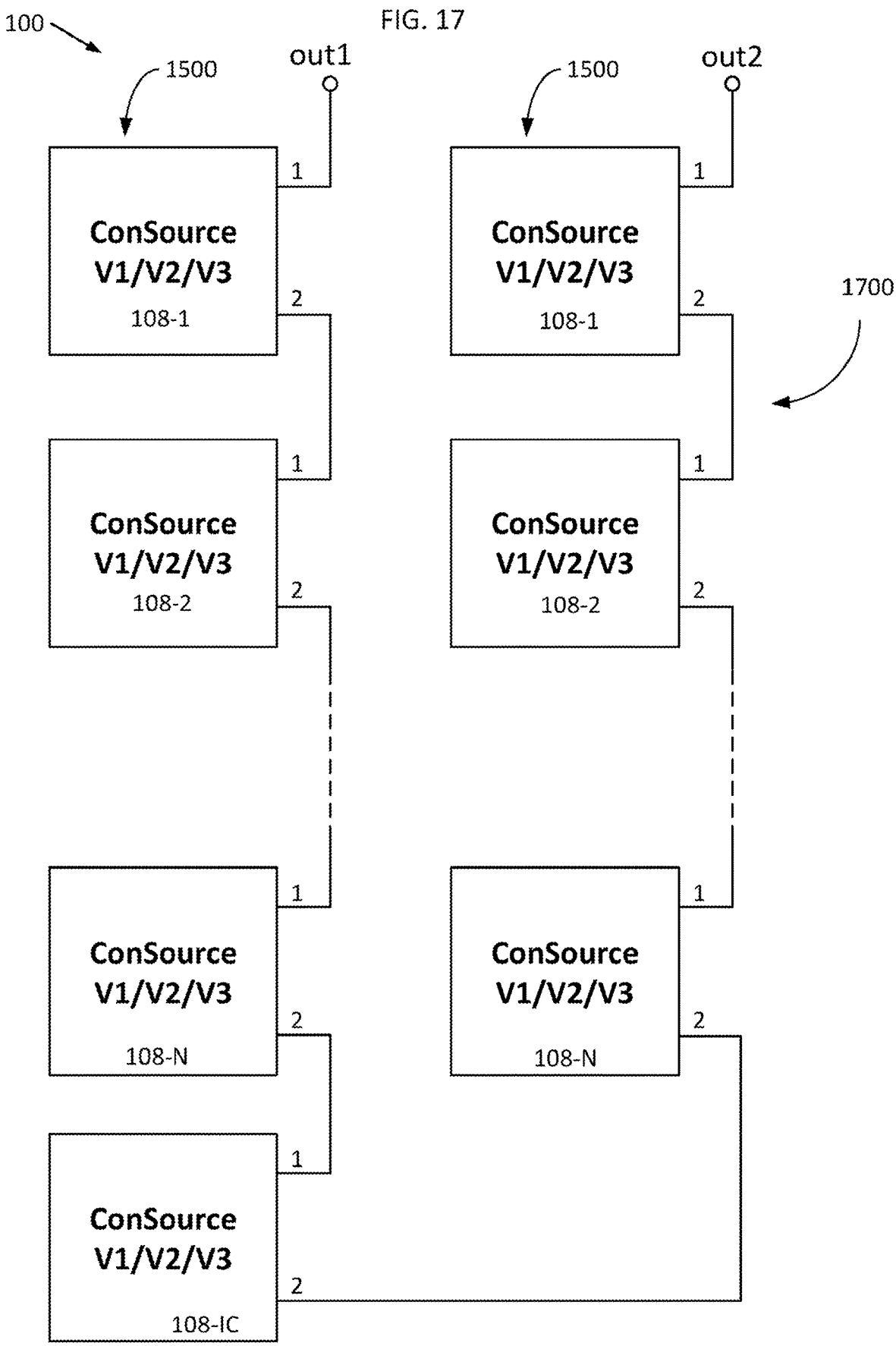
FIG. 17 is a schematic depicting another example two-dimensional array of connected example converter-source modules, according to example embodiments of the present disclosure.

FIG. 17 shows an example embodiment of a second version of a ConSource pack including a two-dimensional array 1700 or two one-dimensional arrays of N and N+1 numbers of connected ConSource modules 108-1, 108-2 . . . 108-N according to the present disclosure. Output of DC or AC voltage generation of each of the two one-dimensional arrays 1500 with N and N+1 numbers of interconnected ConSource modules, which form this two-dimensional array, is described above with regard to FIG. 15. All of the modules 108 shown here can, if desired, be combined in a single energy pack, where the modules 108 are co-located in a single common enclosure or housing. A second port 2 of each of an Nth ConSource V1/V2/V3 module in Nth or last rows of both of the one-dimensional arrays are connected to first and second ports 1 and 2 of an additional or N+1th ConSource V1/V2/V3 module.

This two-dimensional array of 2N+1 number of connected ConSource V1/V2/V3 modules can be used as a single-phase AC energy source for stationary energy storage applications for DC or AC single-phase loads. The load can be connected between first and second output terminals Out1 and Out2 of a first ConSource V1/V2/V3 module in a first row of each of the one-dimensional arrays.

Figure 18:
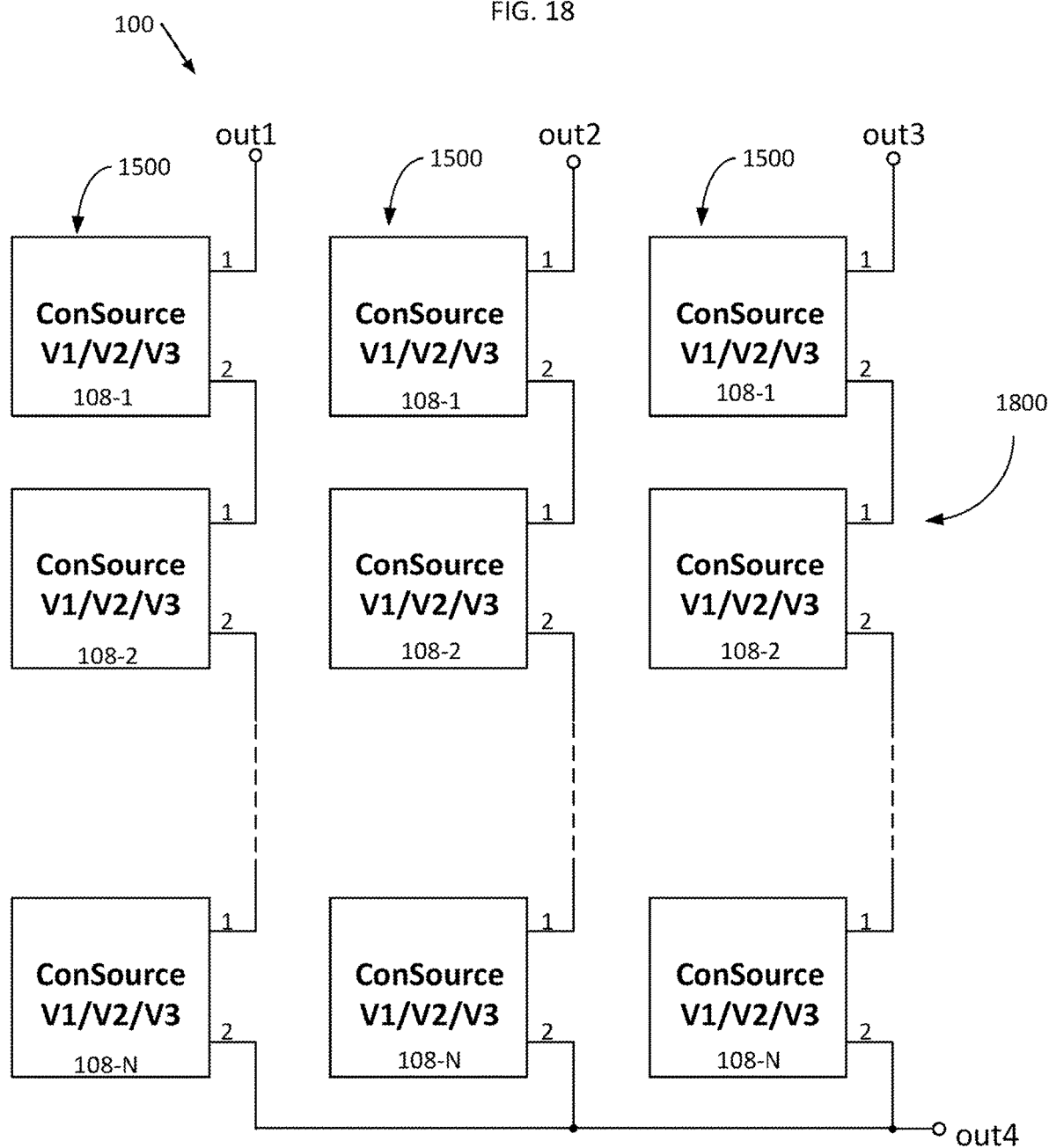
FIG. 18 is a schematic depicting an example system having multiple example converter-source modules connected in a three-dimensional array, according to example embodiments of the present disclosure.

FIG. 18 shows an example embodiment of a first version of a ConSource pack including a plurality of ConSource V1/V2/V3 modules 108-1, 108-2 . . . 108-N, connected in a three-dimensional array 1800, according to the present disclosure. All of the modules 108 shown here can, if desired, be combined in a single energy pack, where the modules 108 are co-located in a single common enclosure or housing. First, second and third output terminals out1, out2 and out3 of the ConSource pack are connected to a first port 1 of a first ConSource V1/V2/V3 module of a first row of each of the three one-dimensional arrays 1500, which form this three-dimensional array 1800 based ConSource pack. Output of DC or AC voltage generation of each of the three one-dimensional arrays 1500, which form this three-dimensional array 1800 based ConSource pack, is described above with regard to FIG. 15. A second port 2 of an Nth ConSource V1/V2/V3 module in an Nth or last row of each of the three one-dimensional arrays are connected together and to a common output terminal out4 of the three-dimensional array. The output voltages are provided between the first, second and third output terminals out1, out2, out3 and the common output terminal out4.

Figure 22:
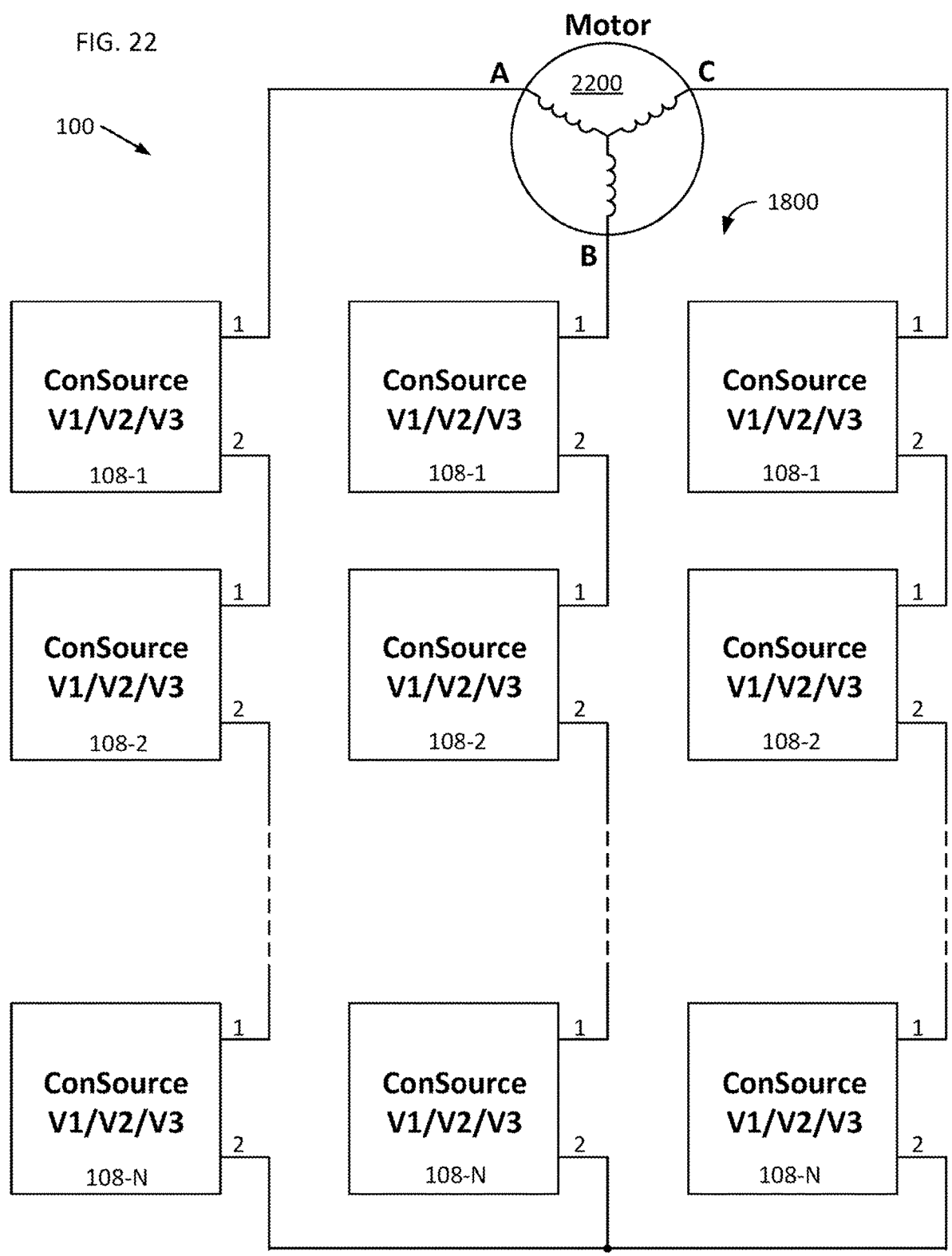
FIG. 22 is a schematic depicting an example system having multiple example converter-source modules connected in a three-dimensional array, and connected to an electrical motor, according to example embodiments of the present disclosure.

This three-dimensional array 1800 of 3N connected ConSource V1/V2/V3 modules 108-1, 108-2 . . . 108-N can be used as a three-phase AC energy source for stationary energy storage or electric vehicle applications for DC or AC single load, three-phase loads, three phase power grids or three-phase electric motors 2200, as shown in FIG. 22. The three-phase load can be connected between the first, second and third output terminals out1, out2, out3, while the common output terminal out4 can be connected to a neutral of the load, if required.

The first, second and third output terminals out1, out2 and out3 of the three-dimensional array based ConSource pack can be connected together via coupling inductors and connected to the same first terminal of a DC or single-phase AC load, when the common output terminal out4 is connected to the second terminal of the DC or single phase AC load. In this case, the output power capability of such three-dimensional array based ConSource pack with N rows is three times higher than the one single-dimensional array based ACi-battery pack with the same number N of rows.

Figure 19:
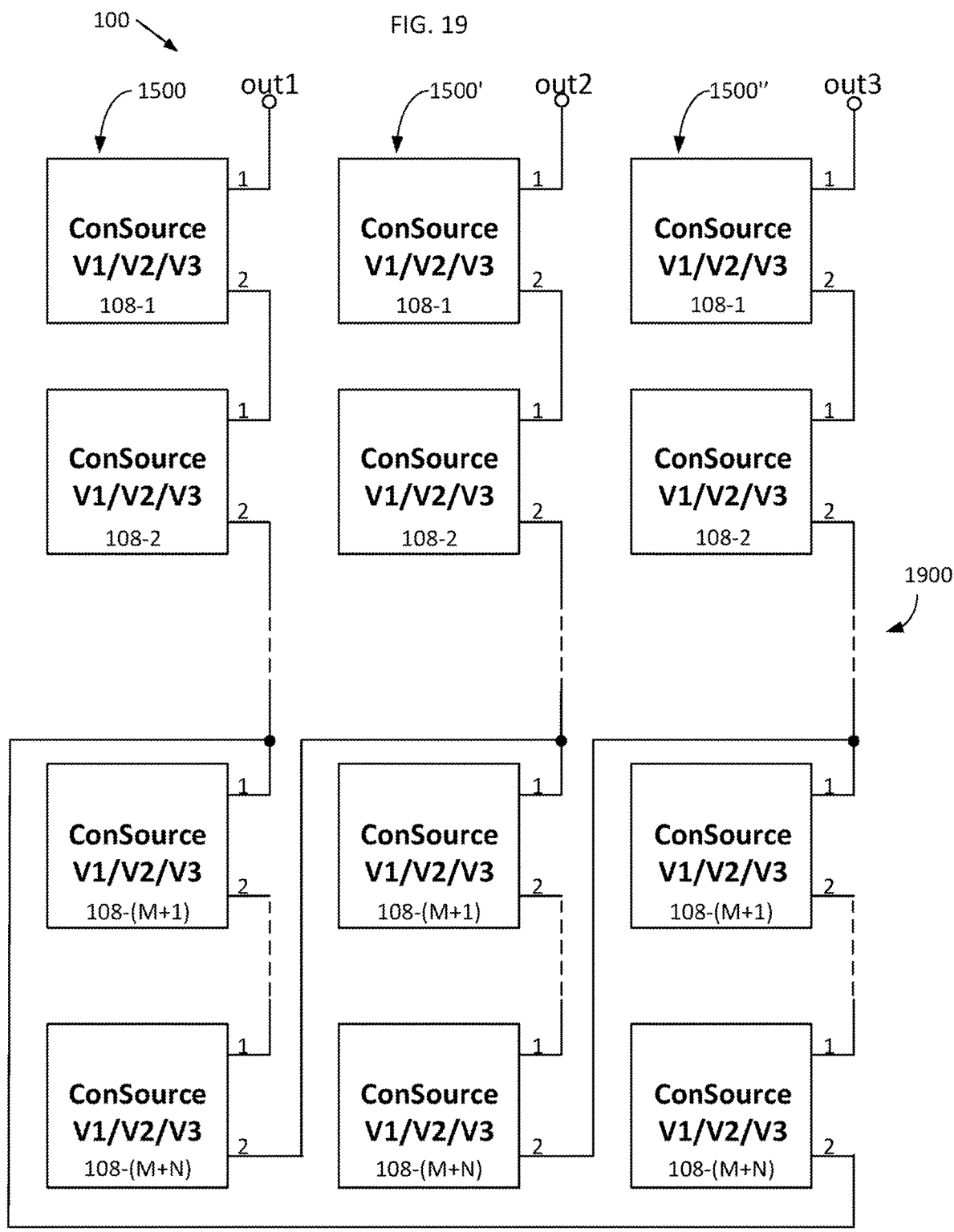
FIG. 19 is a schematic depicting another example system having multiple example converter-source modules connected in a three-dimensional array, according to example embodiments of the present disclosure.

This three-dimensional array 1900 embodiment of system 100 shown in FIG. 19 enables obtaining three-phase system of high voltages of any shape with very low total harmonic distortion between terminals out1, out2, out3 and common terminal out3 which can serve as a Neutral, using low and/or medium voltage rated energy source elements and switching components (MOSFETs, JFETs, IGBTS, etc.) with significantly reduced switching and conduction losses in the ConSource modules. Such a system can be connected to the power distribution grid and can be used as an active power source or buffer, reactive power compensator and power factor corrector, active harmonic filter with very high dynamic response and significantly reduced size of passive filter between out1, out2, out3 and the phases of power grid. This system can also be connected to three-phase load providing the energy from energy source elements such as batteries, supercapacitors, fuel-cells, etc.

FIG. 19 shows an example embodiment of a second version of a ConSource pack including a plurality of ConSource modules 108-1, 108-2 . . . 108-N, connected in a three-dimensional array 1900 according to the present disclosure. All of the modules 108 shown here can, if desired, be combined in a single energy pack, where the modules 108 are co-located in a single common enclosure or housing.

A first port 1 of a ConSource V1/V2/V3 module 108-1 of a first row ("first ConSource V1/V2/V3 module") of each of the three one-dimensional arrays 1500 are connected to first, second and third output terminals out1, out2 and out3 of each of the three one-dimensional arrays, which form this three-dimensional array based ConSource pack. Output DC or AC voltage generation of each of the three one-dimensional arrays with N number of connected ConSource V1/V2/V3 modules, which form this three-dimensional array, is described above with regard to FIG. 15. A second port 2 of the first ConSource V1/V2/V3 modules 108-1 are connected to first ports 1 of ConSource V1/V2/V3 modules 108-2 in second rows of the three one-dimensional arrays ("second ConSource V1/V2/V3 modules"). Second ports 2 of the second ConSource V1/V2/V3 modules are connected to first ports 1 of ConSource V1/V2/V3 modules in third rows (not shown) of the three one-dimensional arrays and so on in the same order further down for M number of rows of ConSource V1/V2/V3 modules, wherein M is 2 or greater.

First ports 1 of ConSource V1/V2/V3 modules of M+1th rows are connected to second ports 2 of ConSource V1/V2/

V3 modules of Mth rows (not shown). Second ports 2 of ConSource V1/V2/V3 modules in the M+1th rows are connected to first ports 1 of ConSource V1/V2/V3 modules in M+2th rows (not shown). Second output ports 2 of ConSource V1/V2/V3 modules in the M+2th rows are connected to first ports 1 of ConSource V1/V2/V3 modules in M+3th rows (not shown) and so on in the same order further down for M+N number of rows of ConSource V1/V2/V3 modules.

A second port 2 of a ConSource V1/V2/V3 module in a last row or M+Nth row of a first column 1500 of the three-dimensional array is connected to the first port 1 of the ConSource V1/V2/V3 module of the M+1 row of a second column 1500' of the three-dimensional array. A second port 2 of a ConSource V1/V2/V3 module in a last row or M+Nth row of the second column of the three-dimensional array is connected to the first port 1 of the ConSource V1/V2/V3 module of the M+1 row of a third column 1500" of the three-dimensional array. A second port 2 of a ConSource V1/V2/V3 module in a last row or M+Nth row of the third column of three-dimensional array is connected to the first port 1 of a ConSource V1/V2/V3 module of a M+1 row of the first column of the three-dimensional array.

Figure 23:
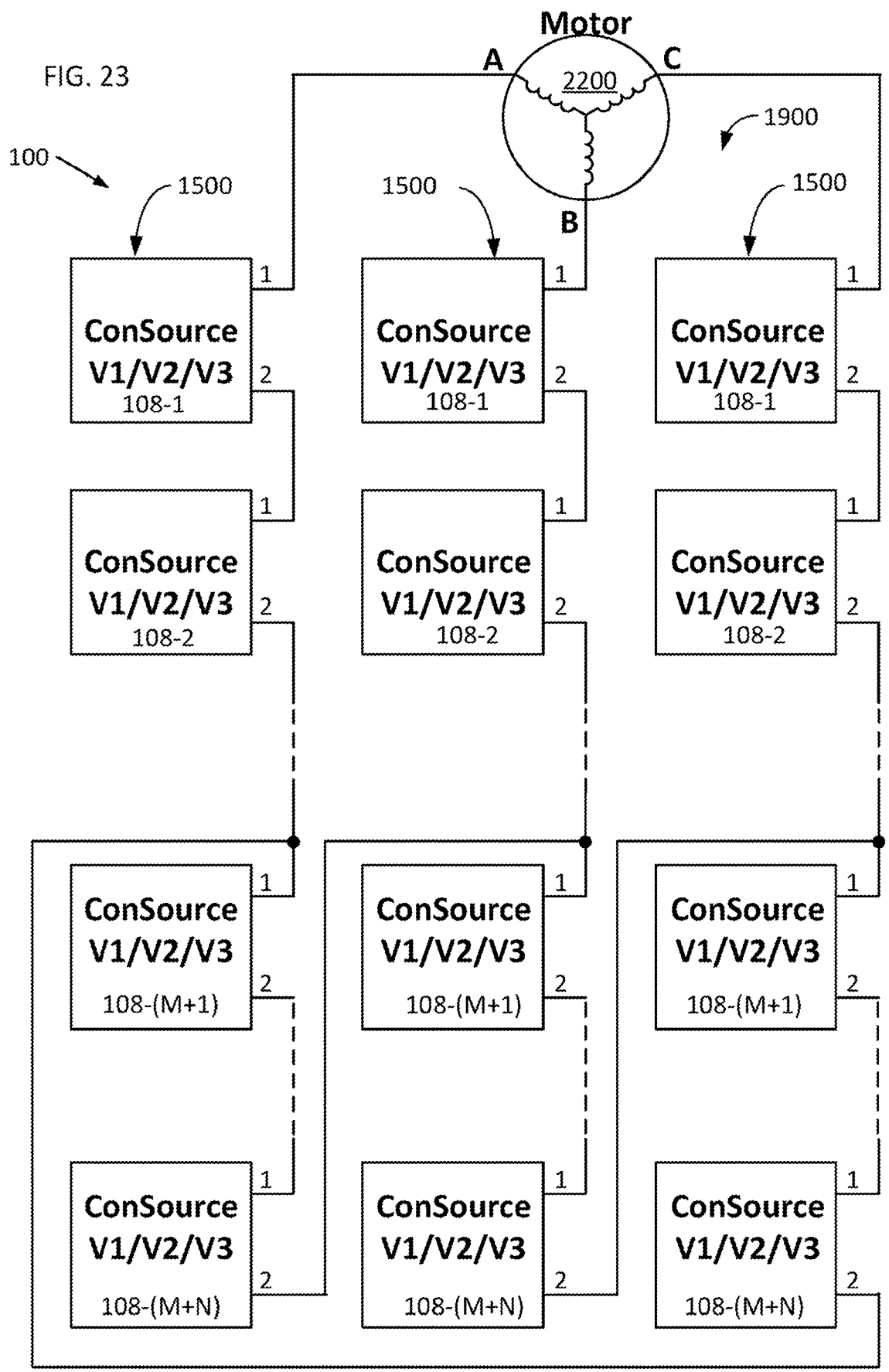
FIG. 23 is a schematic depicting another example system having multiple example converter-source modules connected in a three-dimensional array, and connected to an electrical motor, according to example embodiments of the present disclosure.

This three-dimensional array of connected ConSource V1/V2/V3 modules can be used as a three-phase energy source for stationary energy storage or electric vehicle applications for DC or AC single load, three-phase loads, three phase power grids or three-phase electric motors, as shown in FIG. 23.

In addition to the advantages mentioned with regard to FIG. 18, this three-phase (three-dimensional array) configured embodiment of system 100 shown in FIG. 19, with a combination of series connected and delta connected ConSource modules, enables an effective exchange of energy between all ConSource modules of the system (inter-phase balancing) and phases of power grid or load. A combination of delta and series connected ConSource modules allow reducing the total number of ConSource modules in array to obtain the desired output voltages.

Figure 20:
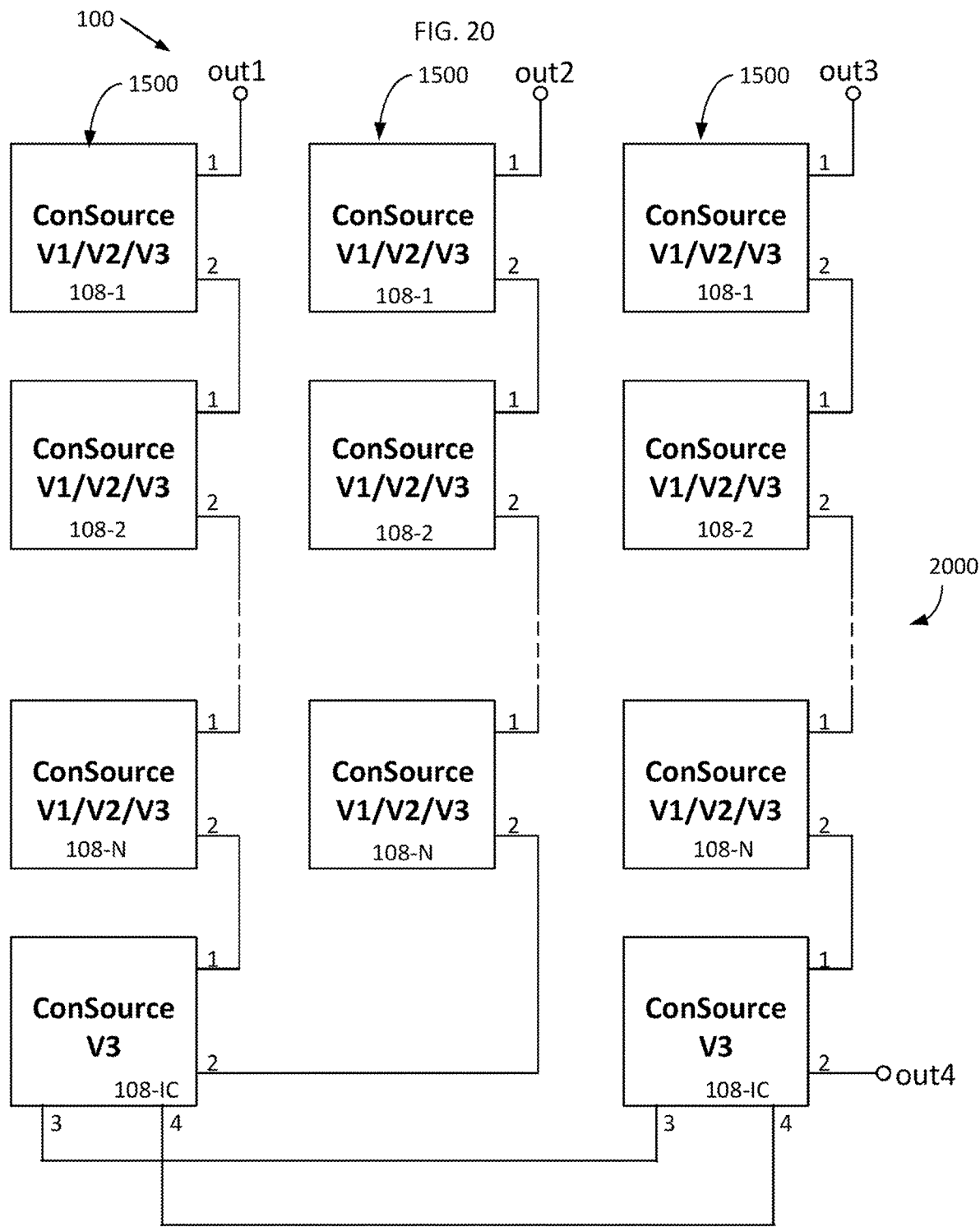
FIG. 20 is a schematic depicting another example system having multiple example converter-source modules connected in a three-dimensional array, according to example embodiments of the present disclosure.

FIG. 20 shows an example embodiment of a third version of a ConSource pack including a plurality of ConSource modules, connected in a three-dimensional array 2000 according to the present disclosure. All of the modules 108 shown here can, if desired, be combined in a single energy pack, where the modules 108 are co-located in a single common enclosure or housing. First, second and third output terminals out1, out2 and out3 of the ConSource pack are connected to first ports 1 of ConSource V1/V2/V3 modules 108-1 of first rows of the three one-dimensional arrays 1500, which form this three-dimensional array 2000 based ConSource pack. Output DC or AC voltage generation of each of the three one-dimensional arrays with N number of connected ConSource V1/V2/V3 modules 108-1, 108-2 ... 108-N, which form this three-dimensional array, is described above with regard to FIG. 15. A second port 2 of a ConSource V1/V2/V3 module of an Nth row of a first column of the three-dimensional array is connected to a first port 1 of a first additional ConSource V3 module, employed as an interconnection (IC) module 108-IC of an N+1th row. A second port 2 of a ConSource V1/V2/V3 module of an Nth row of a second column of the three-dimensional array is connected to a second port 2 of the first additional ConSource V3 module 108-IC of the N+1th row. A second port 2 of a ConSource V1/V2/V3 module of an Nth row of a third column of the three-dimensional array is connected to a first port 1 of a second additional ConSource V3 module 108-IC of an N+1th row. A second port 2 of the second additional ConSource V3 module is connected to a fourth output terminal Out4 of the ConSource pack. Third and fourth ports 3 and 4 of the first and second additional ConSource V3 modules of the N+1th rows are interconnected as shown in FIG. 20.

Figure 24:
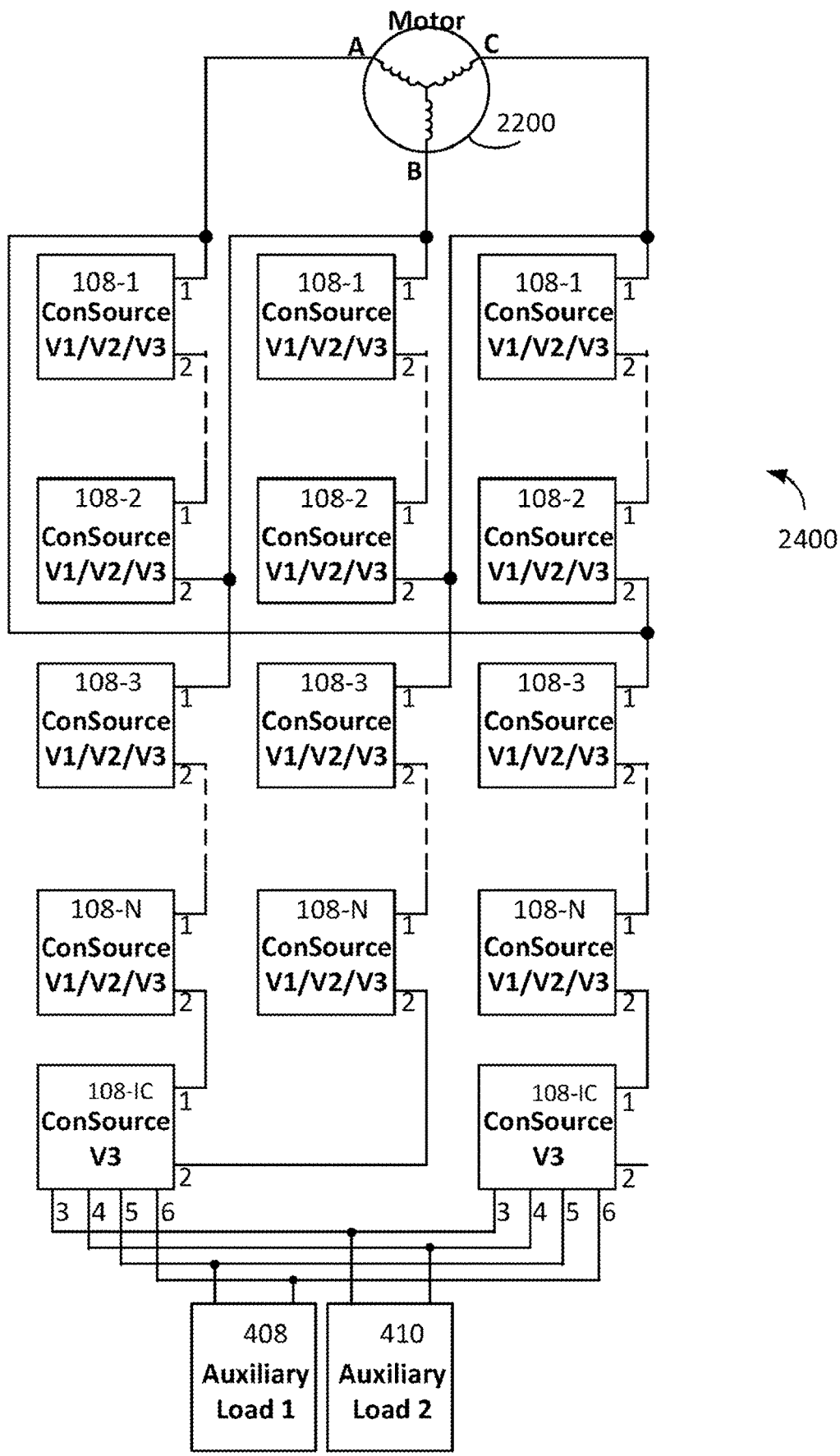
FIG. 24 is a schematic depicting another example system having multiple example converter-source modules connected in a three-dimensional array, and connected to an electrical motor and auxiliary loads, according to example embodiments of the present disclosure.

This three-dimensional array of connected ConSource V1/V2/V3 modules can be used as a three-phase energy source for stationary energy storage or electric vehicle applications for DC or AC single load, three-phase loads, three phase power grids or three-phase electric motors, as shown in FIG. 24. The three-phase load can be connected between the first, second and third output terminals out1, out2 and out3, while the fourth output terminal out4 can serve as one a charging terminal.

In addition to the advantages mentioned with regard to FIG. 18, this three-phase (three-dimensional array) configured embodiment of system 100 shown in FIG. 20, with two additional interconnection ConSource V3 modules 108-IC, enables an effective and fast exchange of energy between all ConSource modules of the system (inter-phase balancing) and phases of power grid or load.

Figure 21:
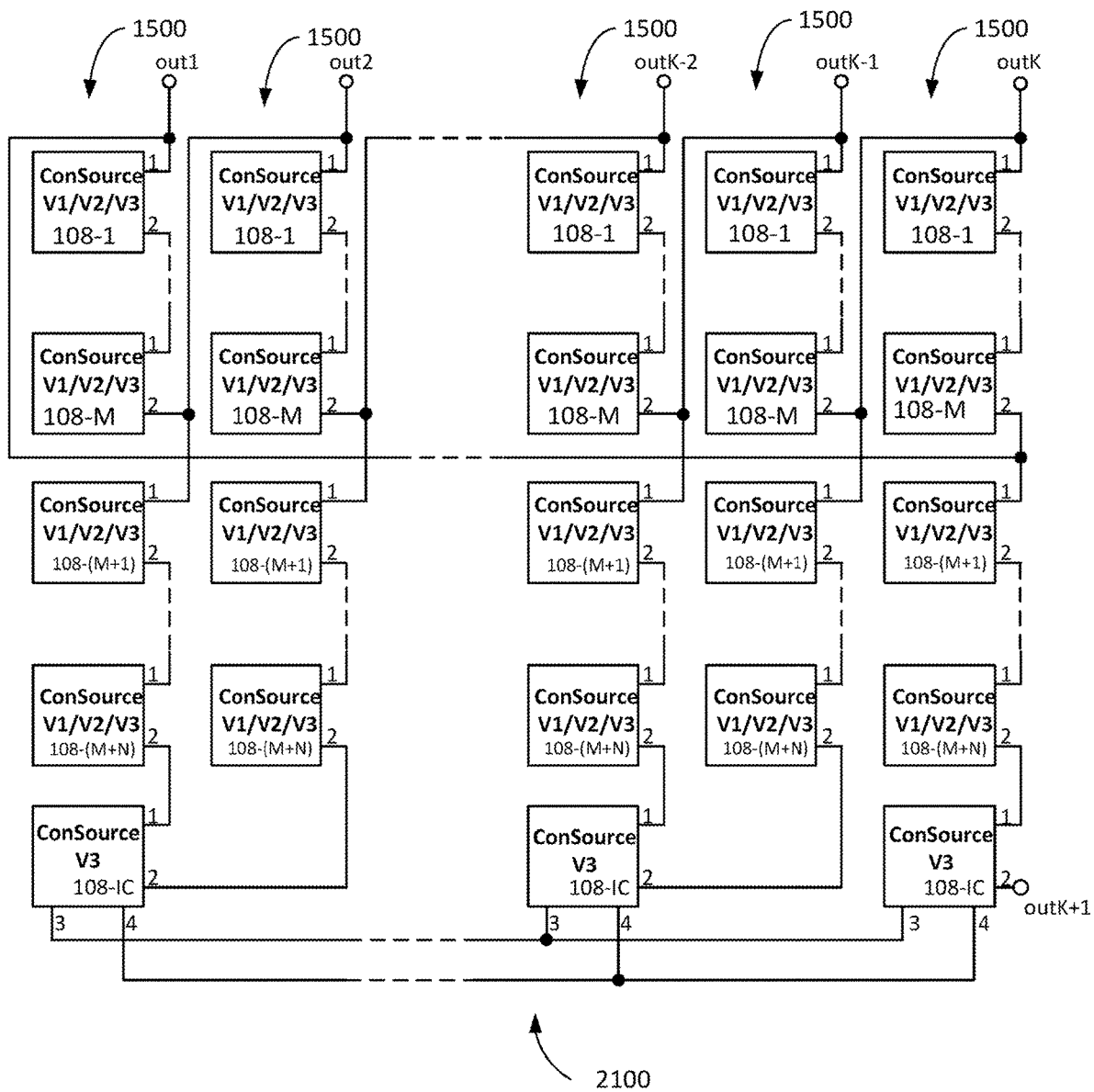
FIG. 21 is a schematic depicting an example system having multiple example converter-source modules connected in a multi-dimensional array, according to example embodiments of the present disclosure.

FIG. 21 shows an example embodiment of a fourth version of a ConSource pack including a plurality of ConSource modules, connected in a multi-dimensional array 2100 including K one-dimensional arrays 1500 according to the present disclosure, where K, as an example, is 3 or greater, and illustrated in an example orientation having a plurality of rows and K columns for presentation and reference purposes only. All of the modules 108 shown here can, if desired, be combined in a single energy pack, where the modules 108 are co-located in a single common enclosure or housing. Each of the K one-dimensional arrays 1500 include M+N ConSource V1/V2/V3 modules 108-1 ... 108-(M+N) having first and second ports. Each of the first, Kth and other odd integer one dimensional arrays include an M+N+1th additional ConSource V3 module 108-IC having first, second, third and fourth ports.

The first ports 1 of ConSource V1/V2/V3 modules of first rows of each of the K number of one-dimensional arrays, respectively, are connected to individual ones of first and second output terminals out1 and out2 and so on out to a Kth output terminal outK of the K number of one-dimensional arrays, which form this multi-dimensional array based ConSource pack. The second ports 2 of the ConSource V1/V2/V3 modules in the first rows are connected to the first ports 1 of ConSource V1/V2/V3 modules in second rows (not shown) of each of the K number of one-dimensional arrays. The second ports 2 of the ConSource V1/V2/V3 modules in the second rows are connected to the first ports 1 of ConSource V1/V2/V3 modules in third rows (not shown) of each of the K number of one-dimensional arrays, and so on in the same order further down for a M number of rows of ConSource V1/V2/V3 modules, where M is 2 or greater.

The second port2 of a ConSource V1/V2/V3 module 108-M of a first array column of an Mth row is connected to the first port 1 of a ConSource V1/V2/V3 module 108-1 of a second array column of the first row. The second port2 of a ConSource V1/V2/V3 module 108-M of the second array column of the Mth row is connected to the first port 1 of a ConSource V1/V2/V3 module 108-1 of a third array column of the first row, and so on in the same order to a Kth array column, where the second port2 of a ConSource V1/V2/V3 module 108-M in the Kth array column of the Mth row is connected to the first port 1 of the ConSource V1/V2/V3 module 108-1 of the first array column of the first row.

The first ports 1 of ConSource V1/V2/V3 modules 108-(M+1) of all of the first through Kth array columns of M+1th rows are connected to the second ports 2 of the ConSource V1/V2/V3 modules 108-M of the Mth rows. The second ports 2 of ConSource V1/V2/V3 modules 108-(M+1) of all of the first through Kth array columns of the M+1th rows are connected to the first ports 1 of ConSource V1/V2/V3 modules of all of the first through Kth columns of M+2th rows, and so on in the same order further down for an N number of rows of ConSource V1/V2/V3 modules, where N is 2 or greater.

The second port 2 of a ConSource V1/V2/V3 module of an M+Nth row of the first array column of the multi-dimensional array is connected to the first port 1 of a first additional ConSource V3 module of an M+N+1th row. The second port 2 of a ConSource V1/V2/V3 module of the M+Nth row of the second array column of the multi-dimensional array is connected to the second port 2 of the first additional ConSource V3 module of the M+N+1th row. The second port 2 of a ConSource V1/V2/V3 module of the M+Nth row of a K−2th array column of the multi-dimensional array is connected to the first port 1 of a ((K−1)/2)th additional ConSource V3 module of the M+N+1th row. The second port 2 of a ConSource V1/V2/V3 module of the M+Nth row of a K−1th column of the multi-dimensional array is connected to the second port 2 of the ((K−1)/2)th additional ConSource V3 module of the M+N+1th row. The second port 2 of a ConSource V1/V2/V3 module of the M+Nth row of the Kth column of the multi-dimensional array is connected to a first port 1 of a (K+1)/2 the additional ConSource V3 module of M+N+1th row. The second port 2 of the (K+1)/2th additional ConSource V3 module is connected to a Kth output terminal outK+1 of the ConSource pack. The output ports 3 and 4 of all (K+1)/2 additional ConSource V3 modules of M+N+1th rows are connected together as shown in FIG. 21.

This multi-dimensional array of connected ConSource V1/V2/V3 modules can be used as a multi-phase energy source for stationary energy storage or electric vehicle applications, for DC load, multi-phase AC loads, multi-phase power grids or multi-phase electric motors.

In addition to the advantages mentioned with regard to FIG. 18, this multi-dimensional array 2100 embodiment of system 100 shown in FIG. 21, with a combination of delta connected and series connected ConSource modules and additional interconnection ConSource V3 modules, enables an effective and fast exchange of energy between all ConSource modules of the system (inter-phase balancing) and phases of power grid or load. A combination of delta and series connected ConSource modules allow reducing the total number of ConSource modules in array to obtain the desired output voltages.

FIG. 22 and FIG. 23 shows example embodiments of first and second versions of ConSource packs 1800, 1900, respectively, as presented in FIG. 18 and FIG. 19, respectively, and further connected to a three-phase electrical motors 2200 of any type. All of the modules 108 shown in FIG. 22 can, if desired, be combined in a single energy pack, where the modules 108 are co-located in a single common enclosure or housing. The same applies for all of the modules 108 shown in FIG. 23.

The three-dimensional array 1800 (three-phase motor drive system) embodiment of system 100 shown in FIG. 22, enables obtaining a three-phase system of high voltages of any shape with very low total harmonic distortion between motor phases A, B and C, using low and/or medium voltage rated energy source elements and switching components (MOSFETs, JFETs, IGBTS, etc.) with significantly reduced switching and conduction losses. Such a system does not require a usage of bulky passive filters as in case of 2-level inverter and has a high dynamic response.

In addition to the advantages mentioned with regard to FIG. 22, the three-phase motor drive embodiment 1900 of system 100 (three-dimensional array) shown in FIG. 23, with a combination of series connected and delta connected ConSource modules 108, enables an effective exchange of energy between all ConSource modules of the system (inter-phase balancing) and all phases of electric motor 2200. A combination of delta and series connected ConSource modules allow reducing the total number of ConSource modules in array to obtain the desired output motor voltages.

FIG. 24 shows an example embodiment of a third version of a ConSource pack connected to a three-phase electrical motor 2200 of any type. All of the modules 108 shown here can, if desired, be combined in a single energy pack, where the modules 108 are co-located in a single common enclosure or housing. The ConSource pack is as presented in FIG. 21, where K equals 3, with the third and fourth output ports 3 and 4 of the two additional ConSource V3 modules 108-IC of the N+1th rows connected together and to a second Auxiliary Load 2. The two additional ConSource V3 modules of the N+1th rows further include fifth and sixth output ports 5 and 6 connected together and to a first Auxiliary Load 1 408. The first Auxiliary Load 1 and the second Auxiliary Load 2 410 have different voltages and represent, for example, but not limited to, electric vehicle's onboard network system and air-conditioner power supply system, respectively.

In addition to the advantages mentioned with regard to FIG. 21, this three-phase motor drive embodiment 2400 of system 100 (three-dimensional array) shown in FIG. 24, with a combination of series connected and delta connected ConSource modules 108 and two additional interconnection ConSource V3 modules 108-IC, enables an effective and fast exchange of energy between all ConSource modules of the system (inter-phase balancing) and phases of electric motor 2200. A combination of delta and series connected ConSource modules allow reducing the total number of ConSource modules in array to obtain the desired output motor voltages. The additional output terminals 3, 4, 5, 6 of interconnection ConSource V3 modules provide low voltages of different levels, which can be used to provide a power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Figure 25:
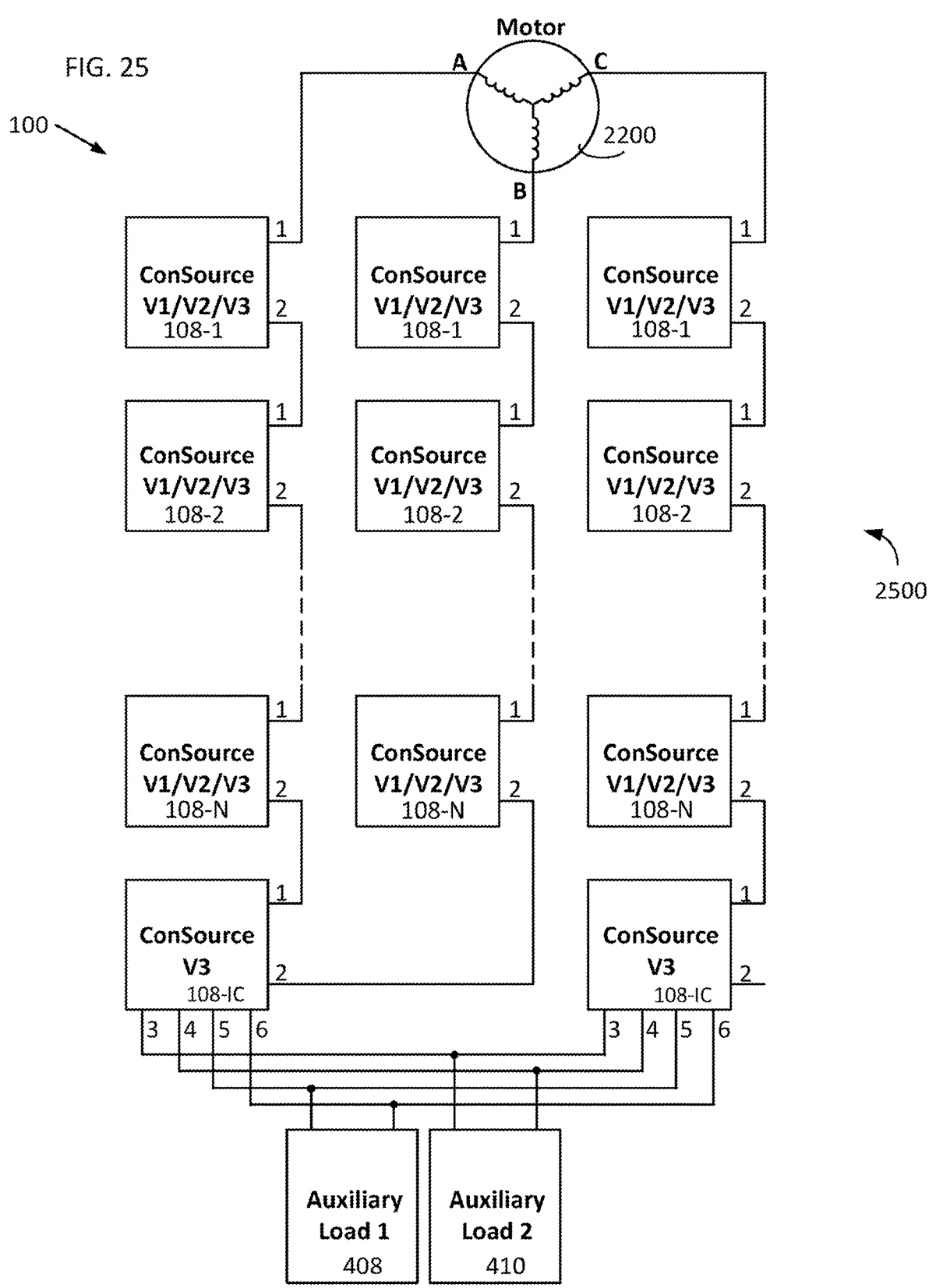
FIG. 25 is a schematic depicting another example system having multiple example converter-source modules connected in a three-dimensional array, and connected to an electrical motor and auxiliary loads, according to example embodiments of the present disclosure.

FIG. 25 shows an example embodiment 2500 of a fourth version of a ConSource pack connected to a three-phase electrical motor 2200 of any type. All of the modules 108 shown here can, if desired, be combined in a single energy pack, where the modules 108 are co-located in a single common enclosure or housing. The ConSource pack is as presented in FIG. 20 with the third and fourth output ports 3 and 4 of the two additional ConSource V3 modules 108 of the N+1th rows connected together and to a second Auxiliary Load 410. The two additional ConSource V3 modules of the N+1th rows further include fifth and sixth output ports 5 and 6 connected together and to a first Auxiliary Load 408. The first Auxiliary Load 408 and second Auxiliary Load 410 have different voltages and represent, for example, but not limited to, electric vehicle's onboard network system and air-conditioner power supply system, respectively.

In addition to the advantages mentioned with regard to FIG. 22, this three-phase motor drive embodiment of system 100 (three-dimensional array) shown in FIG. 25, with two additional interconnection ConSource V3 modules 108-IC, enables an effective and fast exchange of energy between all ConSource modules of the system (inter-phase balancing) and phases electric motor. The additional output terminals 3, 4, 5, 6 of interconnection ConSource V3 modules 108-IC provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Figure 26:
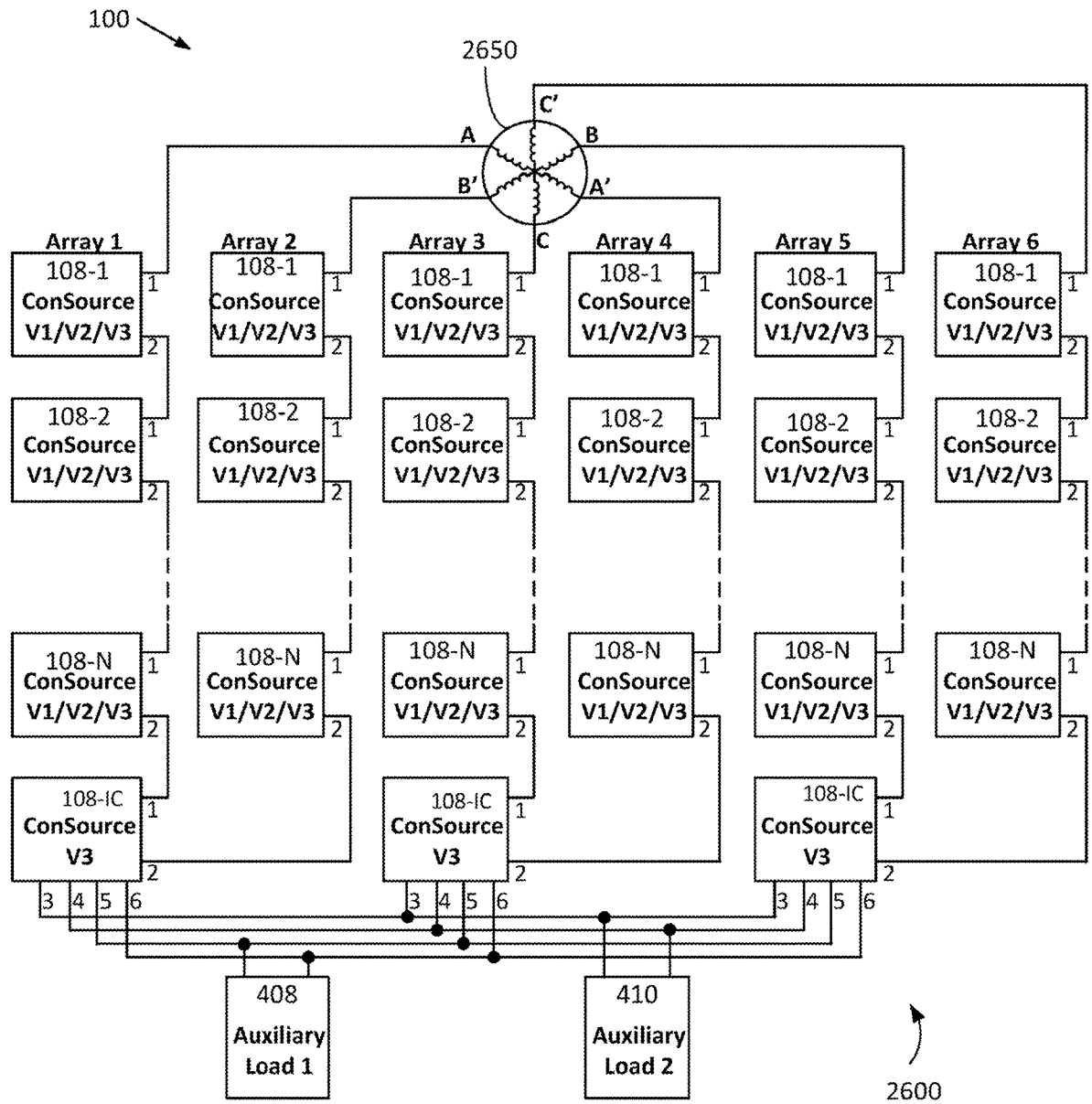
FIG. 26 is a schematic depicting another example system having multiple example converter-source modules connected in a six-dimensional array, and connected to a six-phase electrical motor and auxiliary loads, according to example embodiments of the present disclosure.

FIG. 26 shows an example embodiment 2600 of a fifth version of a ConSource pack connected to six-phase electrical motor 2650 of any type. All of the modules 108 shown here can, if desired, be combined in a single energy pack, where the modules 108 are co-located in a single common enclosure or housing. The ConSource pack is as presented in FIG. 25 with the first and second array columns of the three dimensional array 2500 repeat twice to form six array columns of a six dimensional array including 3 sets of the first and second array columns shown in FIG. 25. The third and fourth ports 3 and 4 of the three additional ConSource V3 modules 108-IC of the N+1 rows are connected together and to the second Auxiliary Load 2 410 and the fifth and sixth ports 5 and 6 of the three additional ConSource V3 modules 108-IC of the N+1th rows are connected together and to the first Auxiliary Load 1 408. The first Auxiliary Load 408 and the second Auxiliary Load 410 have different voltages and represent, for example, but not limited to, electric vehicle's onboard network system and air-conditioner power supply system, respectively.

In addition to the advantages mentioned with regard to FIG. 22, this three-phase motor drive embodiment of system 100 (three-dimensional array) shown in FIG. 26, with three additional interconnection ConSource V3 modules 108-IC, enables an effective and fast exchange of energy between all ConSource modules of the system (inter-phase balancing) and all six phases electric motor. The additional output terminals 3, 4, 5, 6 of interconnection ConSource V3 modules provide low voltages of different levels, which can be used to provide power for auxiliary loads, which in turn represent, for example, the electrical on-board network and HVAC power line an electric vehicle. In this case an extra low-voltage battery is not required; the energy for above mentioned systems is delivered by entire six-dimensional array of ConSource modules.

Figure 27A:
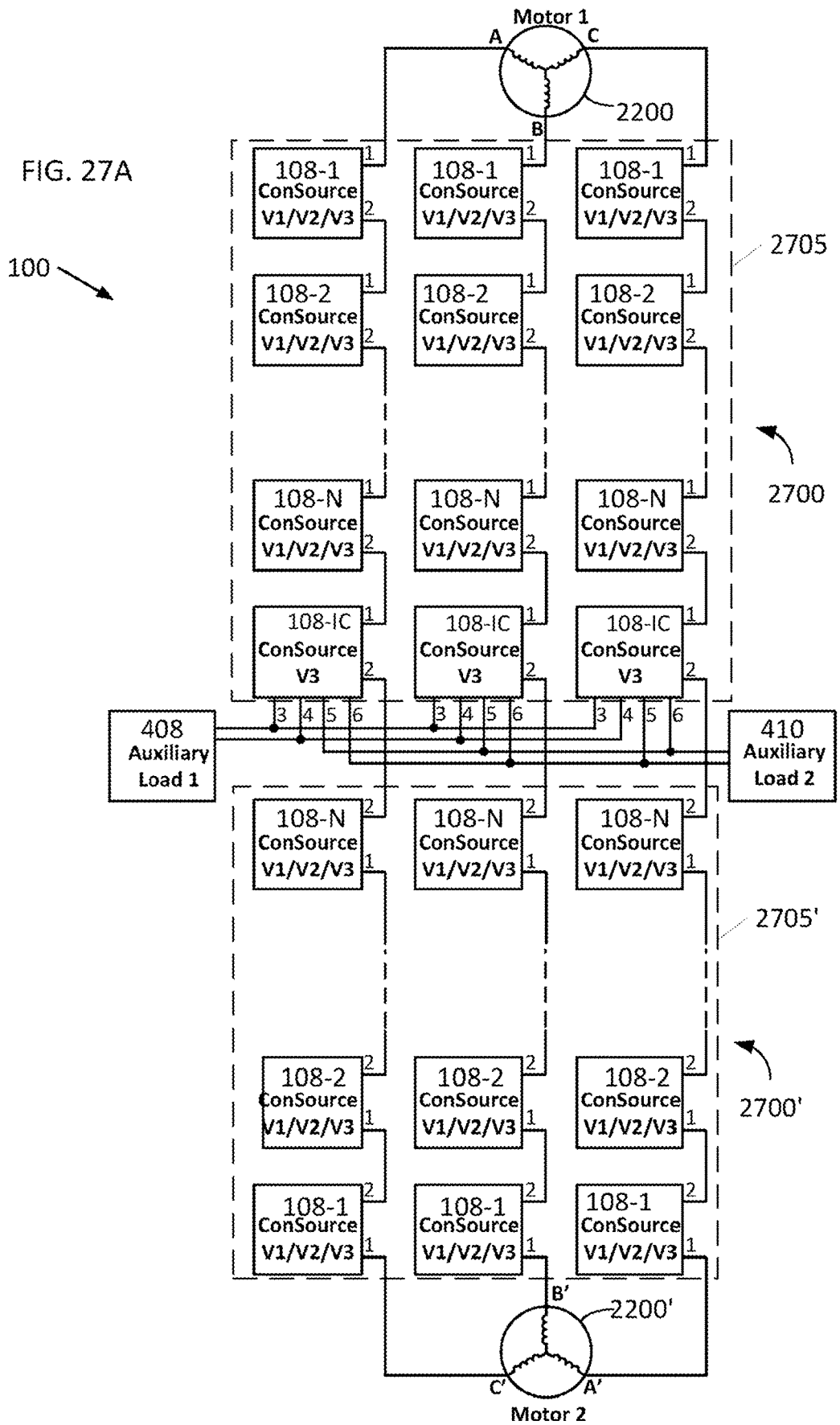
FIGS. 27A and 27B are schematics depicting additional example systems having multiple example converter-source modules connected in three-dimensional arrays, and connected to multiple three-phase electrical motors and auxiliary loads, according to example embodiments of the present disclosure.

FIG. 27A shows an example embodiment of a sixth version of system 100, having two ConSource systems 2700 and 2700' each including N rows of ConSource modules connected in three-dimensional array. System 2700 is configured to be the primary electrical supply for three-phase electrical motor 2200, while system 2700' is configured to be the primary electrical supply for three phase electrical motor 2200'. Both systems 2700 and 2700' can operate with different voltages and frequencies. System 2700 includes an N+1th row of IC modules 108-IC, which are coupled to auxiliary loads and the Nth row of modules 108-N of system 2700'.

Each system 2700, 2700' can be independently configured as a single common electrical and mechanical unit, or pack, with modules 108 placed adjacent or in close proximity with each other, and sharing the same cooling system. Each of packs 2700, 2700' can be located in its own separate and independent enclosure or housing 2705, 2705', respectively. In other embodiments, all of the modules 108 shown in FIG. 27A can be combined as one common pack. In yet another embodiment, any of the aforementioned configurations can be used, but with the IC modules 108-IC in one or more separate packs apart from the pack(s) holding the other cascaded modules 108.

The first, second and third terminals A, B and C of a first Motor 1 2200 are connected to the ConSource pack at the first ports 1 of ConSource V1/V2/V3 modules 108-1 of a first row of pack 2700. The second ports 2 of ConSource V1/V2/V3 modules of the Nth row of all three array columns of pack 2700 are connected to the first ports 1 of three corresponding IC modules 108-IC of the N+1th row, as shown in FIG. 27A. The second ports 2 of all three of the IC modules 108-IC of the N+1th row are connected to the second ports 2 of the ConSource V1/V2/V3 modules 108-N of the Nth row of pack 2700'. The first, second and third output terminals A', B' and C' of Motor 2200' are connected to the first ports 1 of the ConSource V1/V2/V3 modules of the 1st row of the ConSource pack 2700'. The second ports 2 of the ConSource V1/V2/V3 modules 108-1 of the 1st row are connected to the second ports 2 of ConSource V1/V2/V3 modules 108-2 of the second row of pack 2700', and so on in the same order further down to the last row or Nth row of pack 2700', as shown in FIG. 27A.

The third and fourth ports 3 and 4 of the IC modules 108-IC are connected together and to a first Auxiliary Load 408. The fifth and sixth ports 5 and 6 of the three IC modules 108-IC are connected together and to a second Auxiliary Load 410. The first Auxiliary Load and the second Auxiliary Load have different voltages and represent, for example, but not limited to, an electric vehicle's onboard network system and air-conditioner power supply system, respectively.

This three-dimensional array embodiment of system 100 with three additional interconnection ConSource V3 modules 108-IC shown in FIG. 27A, provides the independent voltage and frequency regulation (control) for at least two independent motors (e.g., a dual-motor drive system) and enables an effective and fast exchange of energy (inter-phase balancing) between all ConSource modules of such a dual-motor system and phases of two electric motors. The additional output terminals 3, 4, 5, 6 of interconnection ConSource V3 modules provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules. In this embodiment the IC modules 108-IC are shown as being part of pack 2700, but in other embodiments the IC modules 108-IC can be outside of packs 2700 and 2700', either as independent entities or in a third pack containing the three IC modules 108-IC. The configuration of FIG. 27A can be used in multiple stationary and mobile applications, including EV's having two in-wheel motors 2200 and 2200', which could be motors to the two front wheels (front wheel drive) or two rear wheels (rear wheel drive). Regardless of whether Auxiliary Loads 408 and 410 are supplied, this embodiment permits inter-phase balancing between phases within each individual system and across the two systems (e.g., inter-system or inter-pack balancing).

Figure 27B:
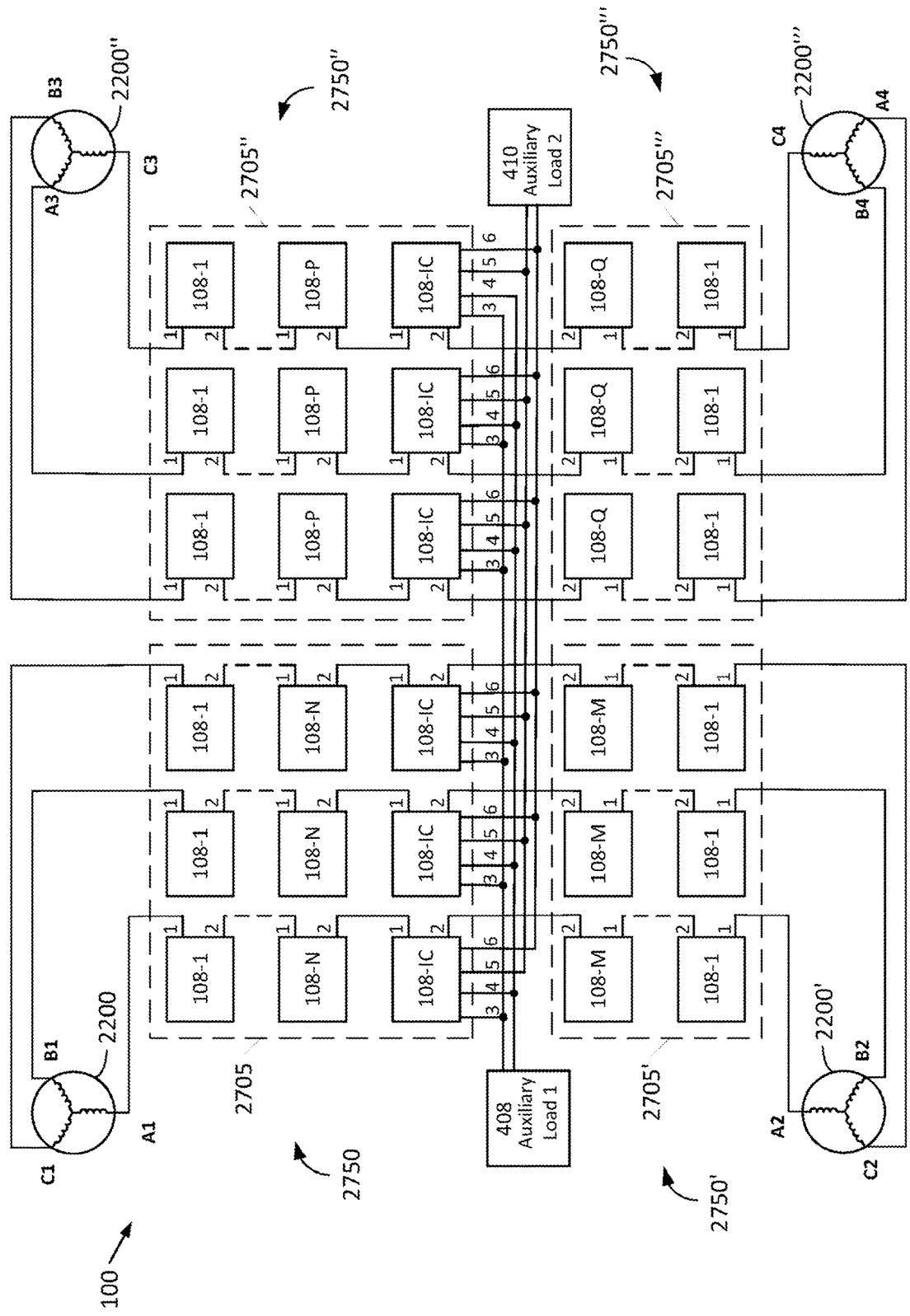

FIG. 27B shows another example embodiment of system 100, where the system described with respect to FIG. 27A has been duplicated to implement four systems 2750, 2750', 2750", 2750''' as primary supplies for four motors 2200, 2200', 2200", 2200''', respectively. Each system 2750, 2750', 2750", 2750''' includes a number of rows of modules 108 connected in three-dimensional array, where system 2750 has N rows, system 2750' has M rows, system 2750" has P rows, and system 2750' has Q rows. The number of rows (and hence cascaded stages) in each system can be different, although in many embodiments the number of rows can be the same (N=M=P=Q). All four systems can operate with different voltages and frequencies. System 2750 includes an N+1th row of modules 108-IC, implemented as IC modules, which are coupled to Auxiliary Loads 1 and 2 and the Mth row of modules 108 of system 2750'. System 2750" includes an P+1th row of modules 108-IC, implemented as IC modules, which are also coupled to Auxiliary Loads 1 and 2 and the Qth row of modules 108 of system 2750".

Each system 2750, 2750', 2750", 2750''' can be independently configured as a single common electrical and mechanical unit, or pack, with modules 108 placed adjacent or in close proximity with each other, and sharing the same cooling system. Each of packs 2750, 2750', 2750", 2750' can be located in its own separate and independent enclosure or housing 2705, 2705', 2705", 2705', respectively. In other embodiments, all of the modules 108 shown in FIG. 27B can be combined as one common pack, or two of the four systems can be implemented as a first pack (e.g., dedicated to front wheels of an EV) and the other two of the four systems can be implemented as a second pack (e.g., dedicated to rear wheels of the EV). In yet another embodiment, any of the aforementioned configurations can be used, but with the IC modules 108-IC in one or more separate packs apart from the pack(s) holding the other cascaded modules 108.

The first, second and third terminals A1, B1 and C1 of motor 2200 are connected to system 2750 at the first ports 1 of ConSource V1/V2/V3 modules 108-1 of a first row of system 2750. The second ports 2 of ConSource V1/V2/V3 modules of the first row can be coupled to any number of intervening rows (not shown) in cascaded fashion as described herein, up to the first ports of the Nth row of all three array columns of system 2750. The second ports of the Nth row of modules 108 are connected to the first ports 1 of three corresponding IC modules 108-IC of the N+1th row, as shown in FIG. 27B. The second ports 2 of all three of the IC modules 108-IC of the N+1th row are connected to the second ports 2 of the ConSource V1/V2/V3 modules 108 of the Mth row of system 2750'. The first, second and third output terminals A2, B2 and C2 of motor 2200' are connected to the first ports 1 of the ConSource V1/V2/V3 modules of the first row of the system 2750'. The second ports 2 of the ConSource V1/V2/V3 modules 108-1 of the first row are connected any number of intervening rows (not shown) in cascaded fashion as described herein, up to the first ports of the Mth row of all three array columns of system 2750.

The first, second and third terminals A3, B3 and C3 of motor 2200" are connected to system 2750" at the first ports 1 of ConSource V1/V2/V3 modules 108-1 of a first row of system 2750". The second ports 2 of ConSource V1/V2/V3 modules of the first row can be coupled to any number of intervening rows (not shown) in cascaded fashion as described herein, up to the first ports of the Pth row of all three array columns of system 2750". The second ports of the Pth row of modules 108 are connected to the first ports 1 of three corresponding IC modules 108-IC of the P+1th row, as shown in FIG. 27B. The second ports 2 of all three of the IC modules 108-IC of the P+1th row are connected to the second ports 2 of the ConSource V1/V2/V3 modules 108 of the Qth row of system 2750" '. The first, second and third output terminals A4, B4 and C4 of motor 2200''' are connected to the first ports 1 of the ConSource V1/V2/V3 modules of the first row of the system 2750'. The second ports 2 of the ConSource V1/V2/V3 modules 108-1 of the first row are connected any number of intervening rows (not shown) in cascaded fashion as described herein, up to the first ports of the Qth row of all three array columns of system 2750'.

The third and fourth ports 3 and 4 of the six IC modules 108-IC of the N+1th row of system 2750 and the P+1th row of system 2750" are connected together and to first Auxiliary Load 408. The fifth and sixth ports 5 and 6 of the six IC modules 108-IC of the N+1th row of system 2750 and the P+1th row of system 2750" are connected together and to second Auxiliary Load 410. Auxiliary Loads 408 and 410 have different voltages and represent, for example, but not limited to, an electric vehicle's onboard network system and air-conditioner power supply system, respectively. The configuration of FIG. 27B can be used in multiple stationary and mobile applications, including four wheel EV's having four in-wheel motors 2200, 2200', 2200", 2200''', to provide all wheel drive. This embodiment can be configured such that motors 2200 and 2200" are the front wheel motors, and motors 2200' and 2200' are the rear wheel motors, or the reverse. Regardless of whether Auxiliary Loads 408 and 410 are supplied, this embodiment permits inter-phase balancing between phases within each individual system and across the four systems (e.g., inter-system or inter-pack balancing).

Figure 28:
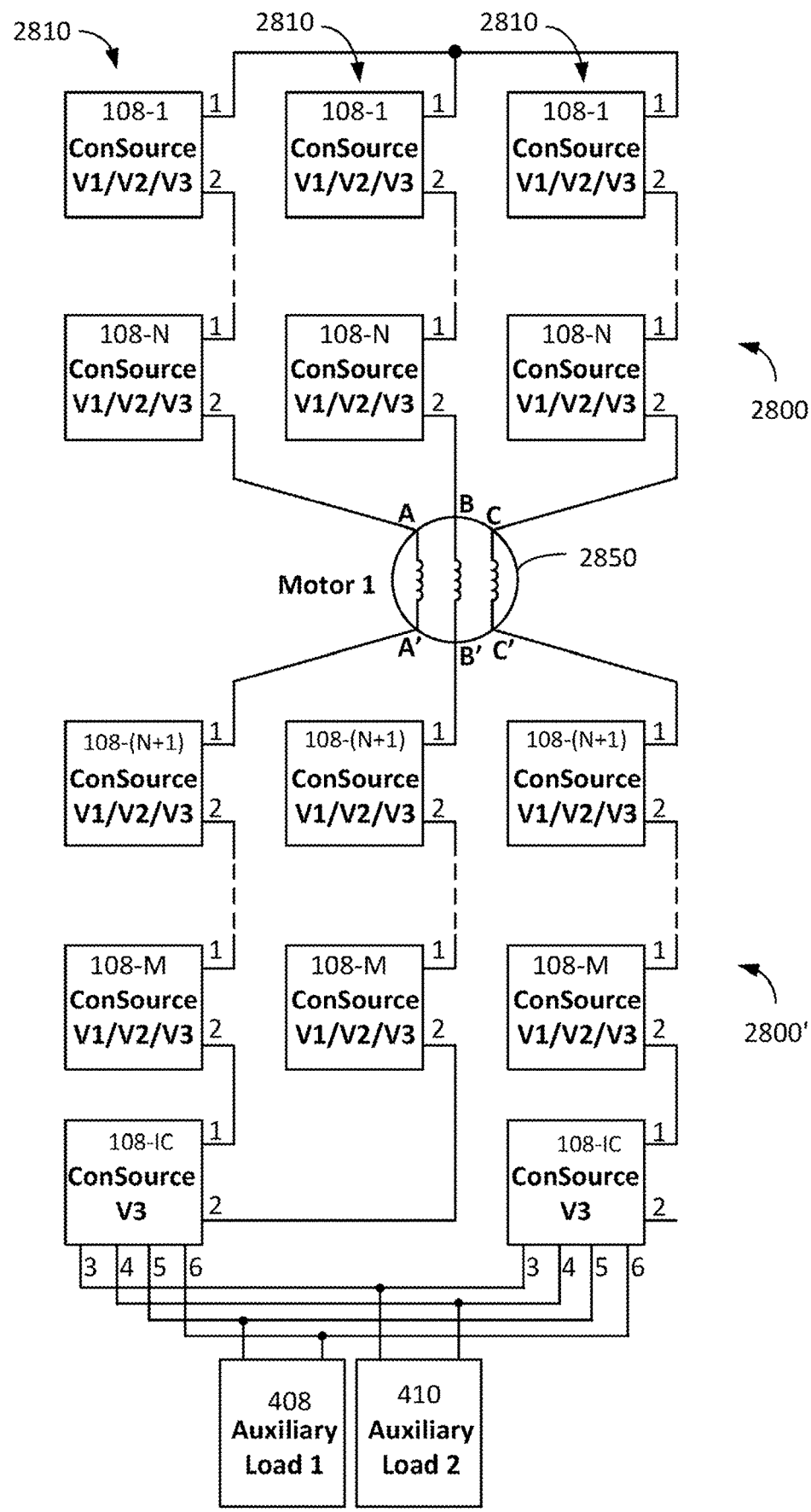
FIG. 28 is a schematic depicting another example system having multiple example converter-source modules connected in a three-dimensional array, and connected to a three-phase open-winding electrical motor and auxiliary loads, according to example embodiments of the present disclosure.

FIG. 28 shows an example embodiment of a seventh version of a ConSource pack including a plurality of ConSource modules 108, connected in three-dimensional array, connected to three-phase open-winding electrical motor 2850 and auxiliary loads 408, 410 according to the present disclosure. In this embodiment, the modules 108 can be segmented into a first system 2800 and a second system 2800'. Both systems 2800 and 2800' can operate with similar frequency but different voltages. All of the modules 108 shown here can, if desired, be combined in a single energy pack, where the modules 108 are co-located in a single common enclosure or housing. Alternatively, the modules 108 of system 2800 can be combined in a first pack, and the modules 108 of system 2800' can be combined in a different, second pack.

The first ports 1 of ConSource V1/V2/V3 modules 108 of the first rows of all three array columns 2810 are connected together. The second ports 2 of the ConSource V1/V2/V3 modules of the first rows of all three array columns are connected to the first ports 1 of ConSource V1/V2/V3 modules (not shown) of the second rows of all three array columns 2810, and so on in the same order further down to the Nth row of each array column. The second ports 2 of ConSource V1/V2/V3 modules 108 of the Nth rows of all three array columns are connected to the first, second and third terminals A, B, C of the open-winding electrical motor 2850, as shown in FIG. 28. The first, second and third terminals A', B', C' of the open-winding electrical motor 2850 are connected to the first ports 1 of ConSource V1/V2/V3 modules of the N+1th rows of all three array columns. The second ports 2 of the ConSource V1/V2/V3 modules of the N+1th rows of all three array columns are connected to the first ports 1 of ConSource V1/V2/V3 modules of the N+2th rows of all three array columns, and so on in the same order further down to Mth row of each of the array columns. The second port 2 of ConSource V1/V2/V3 module of the Mth row of the first column is connected to the first port 1 of a first additional ConSource V3 module 108-IC of the M+1th row. The second port 2 of a ConSource V1/V2/V3 module of the Mth row of the second array column is connected to the second port 2 of the first additional Con- Source V3 module 108-IC of the M+1th row. The second port 2 of a ConSource V1/V2/V3 module of the Mth row of the third column is connected to the first port 1 of a second additional ConSource V3 module 108-IC of the M+1th row.

The third and fourth ports 3 and 4 of the two additional ConSource V3 modules of the M+1th rows are connected together and to a second Auxiliary Load 410. The fifth and sixth ports 5 and 6 of the two additional ConSource V3 modules of the M+1th rows are connected together and to a first Auxiliary Load 408. The first Auxiliary Load and the second Auxiliary Load have different voltages and represent, for example, but not limited to, electric vehicle's onboard network system and air-conditioner power supply system, respectively.

In addition to the advantages mentioned with regard to FIG. 22, this three-phase motor drive embodiment of system 100 (three-dimensional array) shown in FIG. 28, with two additional interconnection ConSource V3 modules, is suitable for open winding motors and enables an effective and fast exchange of energy between all ConSource modules of the system (inter-phase balancing) and phases electric motor. The additional output terminals 3, 4, 5, 6 of interconnection ConSource V3 modules provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules. In the embodiment of FIG. 28, all modules can be implemented in a single pack, or the modules of rows 1 through N can be implemented as a first pack, and the modules of rows N+1 through M (or M+1) can be implemented as a second pack.

Figure 29:
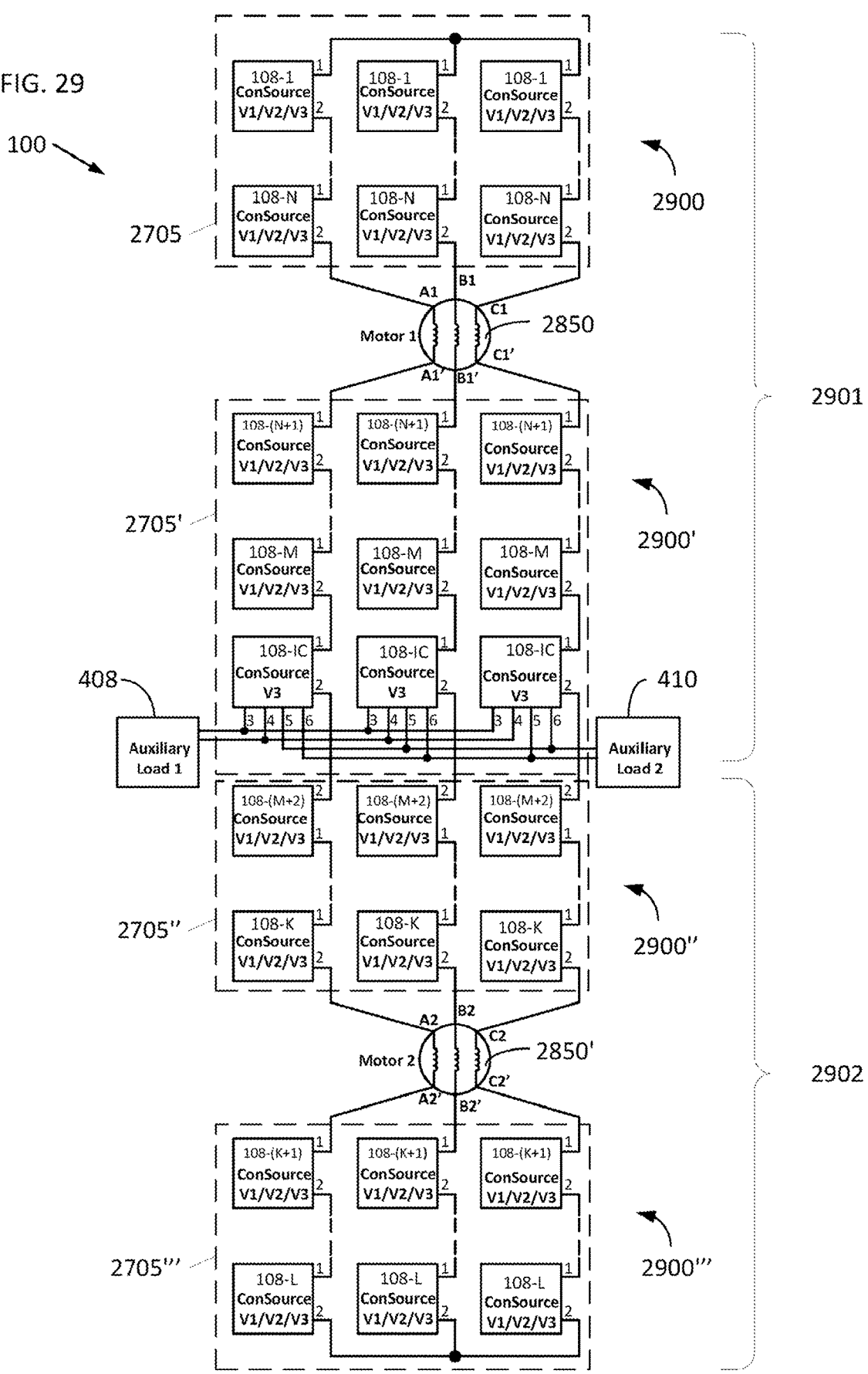
FIG. 29 illustrates a schematic depicting another example system having multiple example converter-source modules connected in a three-dimensional array, and connected to two three-phase open-winding electrical motors and auxiliary loads, according to example embodiments of the present disclosure.

FIG. 29 shows an example embodiment of a eighth version of a ConSource pack including a plurality of ConSource modules 108 connected in a three-dimensional array and forming two systems 2901 and 2901, connected to two three-phase open-winding electrical motors 2850, 2850' and auxiliary loads 408, 410 according to the present disclosure. More particularly, two three-phase sub-systems 2900, 2900' are used to drive motor 2850 and supply auxiliary loads 408 and 410, while two other three-phase sub-systems 2900", 2900''' are used to drive motor and 2850', and both systems 2901 and 2902 are interconnected with modules 108-IC of sub-system 2900'. Therefore system 2901 and system 2902 may operate in different voltages and frequencies while within system 2901, sub-system 2900 and 2900' may operate at similar or equal frequency but may have different voltages, and within system 2902, sub-system 2900" and 2900''' may operate at similar or equal frequency but may have different voltages. All of the modules 108 shown in FIG. 29 can be combined in a single pack. Alternatively, all of the modules 108 of system 2901 can be combined in a single pack, and all of the modules 108 of system 2902 can be combined in a different, second pack. In yet another embodiment, the modules 108 of each of the four sub-systems 2900, 2900', 2900", 2900' are combined in four separate packs 2705, 2705', 2705", 2705' respectively. Combinations of these different pack configurations for systems 2901 and 2902 can also be implemented. In some embodiments the IC modules 108-IC can be individually or together combined in a separate and independent pack.

The first ports 1 of ConSource V1/V2/V3 modules 108-1 of the first rows of all three array columns are connected together. The second ports 2 of the ConSource V1/V2/V3 modules 108 of the first rows of all three array columns are connected to the first ports 1 of ConSource V1/V2/V3 modules 108-1 (not shown) of the second rows of all three array columns, and so on in the same order further down to an Nth row. The second ports 2 of ConSource V1/V2/V3 modules 108-N of the Nth rows of all three array columns are connected to the first, second and third terminals A1, B1, C1 of a first open-winding electrical motor 2850, as shown in FIG. 29. The first, second and third terminals A1', B1', C1' of the first open-winding electrical motor 2850 are connected to the first ports 1 of ConSource V1/V2/V3 modules 108-(N+1) of the N+1th rows of all three array columns. The second ports 2 of the ConSource V1/V2/V3 modules 108-(N+1) of the N+1th rows of all three array columns are connected to the first ports 1 of ConSource V1/V2/V3 modules of the N+2th rows (not shown) of all three array columns, and so on in the same order further down to an Mth row.

The second ports 2 of ConSource V1/V2/V3 modules 108-M of the Mth rows of all three array columns of the ConSource pack are connected to the first ports 1 of three corresponding ConSource V3 modules 108-IC of the M+1th row, as shown in FIG. 29. The second ports 2 of all three ConSource V3 modules 108-IC of the M+1th row are connected to the second ports 2 of ConSource V1/V2/V3 modules 108-(M+2) of the M+2th row. The first ports 1 of ConSource V1/V2/V3 modules of the M+2th row are connected to the second ports 2 of ConSource V1/V2/V3 modules of the M+3th row (not shown), and so on in the same order further down to a Kth row. The first ports 1 of ConSource V1/V2/V3 modules 108-K of the Kth rows of all three array columns are connected to the first, second and third input terminals A2, B2, C2 of a second open-winding electrical motor 2850', as shown in FIG. 29.

The first, second and third output terminals A2', B2', C2' of the second open-winding electrical motor 2850' are connected to the first ports 1 of ConSource V1/V2/V3 modules 108-(K+1) of the K+1th rows of all three array columns. The first ports 1 of ConSource V1/V2/V3 modules of the K+1th rows of all three array columns are connected to the second ports 2 of ConSource V1/V2/V3 modules of the K+2th rows (not shown) of all three array columns, and so on in the same order further down to an Lth row. The first ports 1 of ConSource V1/V2/V3 modules the Lth of rows of all three array columns are connected together.

The third and fourth ports 3 and 4 of the two additional ConSource V3 modules of the M+1th rows are connected together and to a second Auxiliary Load 410. The fifth and sixth ports 5 and 6 of the two additional ConSource V3 modules of the M+1 rows are connected together and to a first Auxiliary Load 408. The first Auxiliary Load and the second Auxiliary Load 410 have different voltages and represent, for example, but not limited to, electric vehicle's onboard network system and air-conditioner power supply system, respectively.

This three-dimensional array embodiment of system 100 with three additional interconnection ConSource V3 modules shown in FIG. 29, provides the independent voltage and frequency regulation (control) for two independent open-winding motors (dual-motor drive system) and allows an effective and fast exchange of energy (inter-phase balancing) between all ConSource modules of such a dual-motor system and phases of two electric motors. The additional output terminals 3, 4, 5, 6 of interconnection ConSource V3 modules provide low voltages of different levels, which can be used to provide power for auxiliary loads, which in turn represent, for example, the electrical on-board network and HVAC power line of an electric vehicle. In this case an extra low-voltage battery is not required; the energy for above mentioned systems is delivered by entire array of ConSource modules.

Example Embodiments of Module Control

Turning to FIGS. 30-40B, example systems and methods that facilitate control of system 100 to provide balancing between ConSource modules in different system configurations are shown. The architecture of the example embodiments shown in FIGS. 1 through 29 enables the control of power sharing among ConSource modules. Such control enables maintaining one or more parameters, such as the SOC of the energy sources of the ConSource modules, balanced during discharging, charging, and at rest which can help the full capacity of each energy source to be utilized regardless of possible differences in the capacities. In addition, balancing can be used to equalize the temperature of the energy sources and/or other components of ConSource modules. Temperature balancing increases the power capability of system 100 and provides more uniform aging of the energy sources regardless of their location within system 100 and differences in thermal resistivity.

System 100 can balance parameters of modules 108 within a particular phase, which can be referred to as intra-phase balancing, and can balance parameters of modules 108 in different phases or a multi-phase (e.g., two or more phase) system, which can be referred to as inter-phase balancing. The control circuitry 102 for system 100 can simultaneously perform any combination of intra-phase balancing, inter-phase balancing, utilization of multiple energy sources within a module (FIG. 11), active filtering (FIGS. 12A-12B), and auxiliary load supply (FIG. 13).

Figure 30:
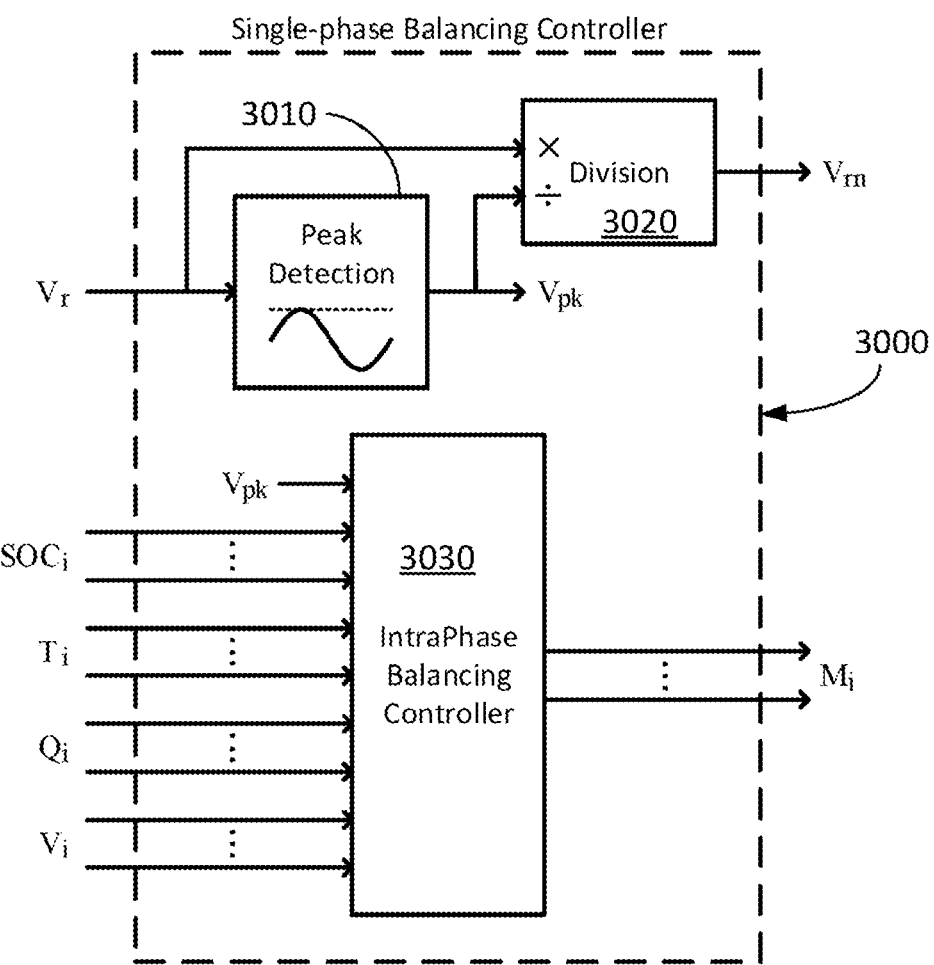
FIG. 30 is a schematic depicting an example embodiment of a single-phase balancing controller, for use with example embodiments of the present disclosure.

FIG. 30 depicts an example embodiment of a single-phase AC or DC balancing controller 3000 that may include a peak detector 3010 ("Peak Detection"), a divider 3020 ("Division"), and an Intra-phase balancing controller 3030 ("Intra-phase Balancing Controller"). The peak detector 3010 detects the peak Vpk of the reference voltage Vr, which can be specific to the phase controller 3000 is operating with and/or balancing. The divider generates normalized reference waveform Vrn by dividing the reference voltage Vr by its detected peak Vpk. Intra-phase balancing controller 3030 uses peak voltage Vpk along with the ConSource status information (e.g., SOCi, Ti, Qi, Vi, etc.) to generate modulation indexes Mi for each module within the phase being controlled. The single-phase balancing controller 3000 can be implemented in hardware, software or a combination thereof, and may be located as a part of the MCD, or may be distributed partially or fully among the LCDs described herein, or may be a separate controller independent of the MCD and LCDs.

In the single-phase AC or DC case, or with respect to a single phase of a multi-phase system, the single-phase balancing controller 3000 (e.g., as a part of the MCD) receives the reference voltage Vr and collects status information such as state of charge SOCi, temperature Ti, capacity Qi, and voltage Vi from all ConSources of system 100 (e.g., from the LCDs of the system). Controller 3000 uses these signals to generate Modulation indexes Mi and a normalized reference waveform Vrn which is then sent to each LCD to generate switching signals. The reference waveform Vrn can be sent continually, and the modulation index can be sent at regular intervals, such as once for every period of the Vrn. The LCD can modulate or scale the normalized reference Vrn by the received modulation index. The modulation index, in some examples, can be a number between zero and one (inclusive of zero and one). This modulated or scaled Vrn can be used as Vref (or −Vref) according to the pulse width modulation technique described with respect to FIGS. 14A-14D, or according to other modulation techniques. In this manner, the modulation index can be used to control the PWM switching signals generated by the LCD and provided to the converter switching circuitry (e.g., S3-S6 or S1-S6), and thus regulate the operation of each ConSource module. For example, a ConSource module being controlled to maintain normal or full operation may receive a modulation index of one, while a ConSource module that is being controlled to less than normal or full operation may receive a modulation index less than one. A ConSource module that is controlled to cease power output may receive a modulation index of zero. Those of ordinary skill in the art will readily recognize, after reading the present description, that other values of the modulation index can be used to achieve similar functionality.

Figure 31:
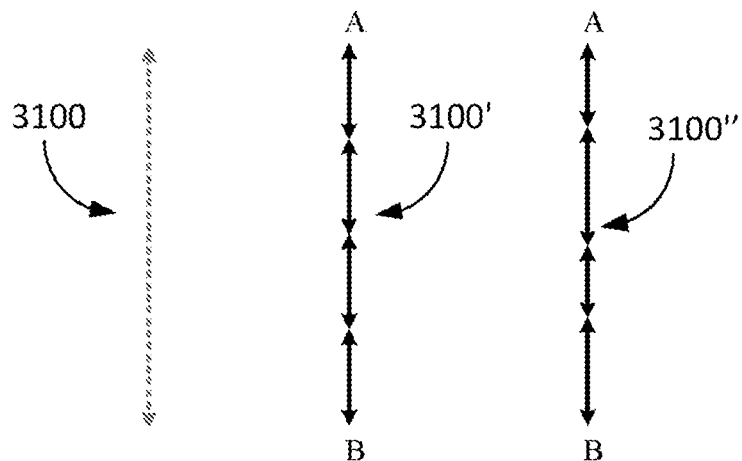
FIG. 31 depicts a phasor diagram of voltage sharing control for an example single-phase system, for use with example embodiments of the present disclosure.

Single-phase balancing controller 3000 can generate a modulation index for each ConSource module according to any number of aspects or operating characteristics described herein, such as its energy source's state of charge (SOC), temperature (T), capacity (Q), state of health (SOH), voltage (V) and/or current (I) in a manner that facilitates the following: the sum of the generated ConSource voltages does not exceed the peak voltage Vpk. For example, Vpk can be the sum of the products of each module's primary energy source voltage and the modulation index for that module (e.g., $Vpk = M_1V_1 + M_2V_2 + M_3V_3 \ldots + M_N V_N$, etc). A different combination of modulation indexes, and thus respective voltage contributions by the modules, may be used but the total generated voltage should remain the same. FIG. 31 is a phasor diagram depicting the peak voltage 3100 required for output by a single phase array, alongside a first example of an output voltage 3100' produced across two opposite terminals A, B of a four module array, where output voltage 3100' is a superposition of four equal voltage contributions from each of the four modules. Also shown is a second example of an output voltage 3100" where the relative contributions of the four modules are adjusted and unequal.

Further, controller 3000 can control operation, to the extent it does not prevent achieving the power output requirements of the system at any one time (e.g., such as during maximum acceleration of an EV), such that SOC of the energy source(s) in each module remains balanced or converges to a balanced condition if they are unbalanced, and/or such that temperature of the energy source(s) or other component (e.g., energy buffer) in each module remains balanced or converges to a balanced condition if they are unbalanced. Power flow in and out of the modules can be regulated such that a capacity difference between sources does not cause an SOC deviation. Balancing of SOC and temperature can indirectly cause some balancing of SOH. Voltage and current can be directly balanced if desired, but in many embodiments the main goal of the system is to balance SOC and temperature, and balancing of SOC can lead to balance of voltage and current in a highly symmetric systems where modules are of similar capacity and impedance.

Since balancing all parameters may not be possible at the same time (e.g., balancing of one parameter may further unbalance another parameter), a combination of balancing any two or more parameters (SOC, T, Q, SOH, V, I) may be applied with priority given to either one depending on the requirements of the application. Priority in balancing can be given to SOC over other parameters (T, Q, SOH, V, I), with exceptions made if one of the other parameters (T, Q, SOH, V, I) reaches a severe unbalanced condition outside a threshold.

Figure 32:
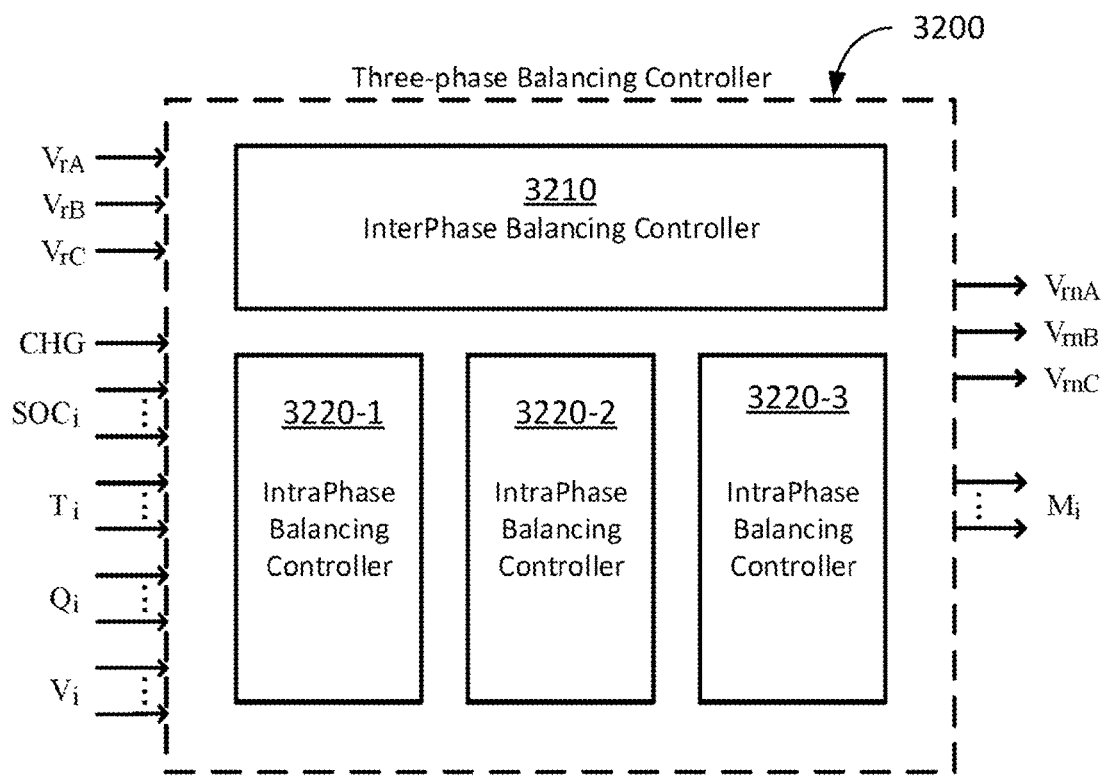
FIG. 32 depicts a schematic depicting an example embodiment of a single-phase balancing controller, for use with example embodiments of the present disclosure.

As mentioned, balancing can also be performed in an inter-array or inter-phase manner. For ease of description the embodiments will be described with respect to inter-phase balancing. In all the embodiments described herein, inter-phase balancing can be performed at the same time as intra-phase balancing is being performed. For example, FIG. 32 depicts an example embodiment of a three-phase balancing controller 3200, which can include one inter-phase controller 3210 and three intra-phase balancing controllers 3220-1, 3220-2, 3220-3 for phases A, B, and C, respectively. The intra-phase balancing controllers 3220 can be configured or programmed to balance aspects of the ConSource modules within each one-dimensional array, in particular and as an example, within one-phase. The inter-phase balancing controller 3210 can be configured or programmed to balance aspects of the ConSource modules among or across the entire multi-dimensional array, in particular and as an example, among or across arrays of different phases. This may be achieved through injecting common mode to the phases (e.g., neutral point shifting) or through interconnection modules (common modules) or through both. Controller 3200 can be implemented in hardware, software or a combination thereof, and may be located as a part of the MCD, or may be distributed partially or fully among the LCDs described herein, or may be a separate controller independent of the MCD and LCDs. The intra-phase balancing controllers 3220-1, 3220-2, 3220-3 and inter-phase balancing controller 3210 can each individually be implemented in hardware, software or a combination thereof, and may be located as a part of the MCD, or may be distributed partially or fully among the LCDs described herein, or may be a separate controller independent of the MCD and LCDs.

The reference signal input to this system may be VrA, VrB, VrC or any combination of two of these signals or any other transformation that can recreate these signals such as Clarke transform (i.e., Vrα, Vrβ).

Figure 33A:
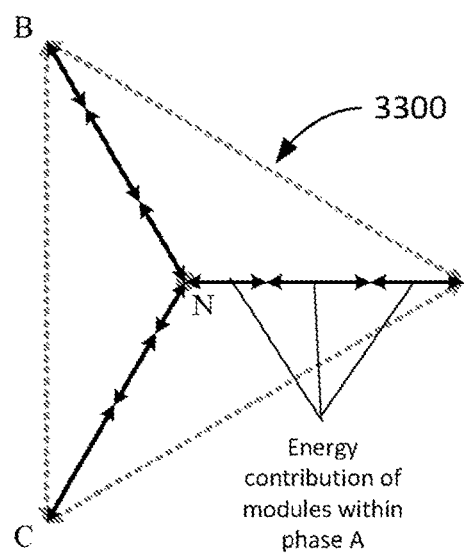
FIGS. 33A and 33B depict phasor diagrams of voltage sharing control for a three-phase structure for (A) intra-phase balancing only and (B) intra-phase and inter-phase balancing.
Figure 33B:
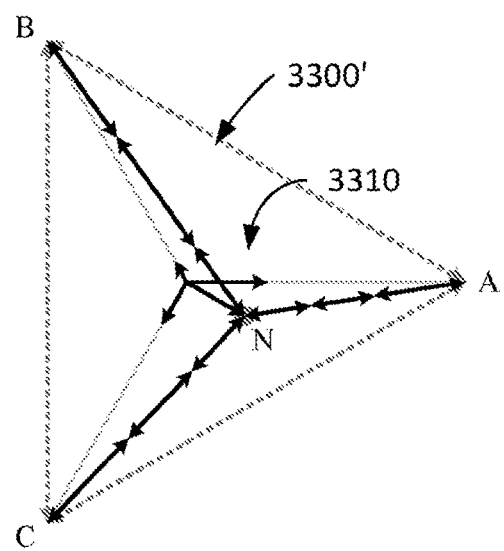

FIGS. 33A and 33B are phasor diagrams depicting example embodiments 3300 and 3300' of control techniques for a Y-connected three-phase system without interconnection (IC) modules between phases A, B, and C (see, e.g., system 100 as described with respect to FIGS. 18 and 22). Here, intra-phase balancing can be performed or achieved by controlling the modulation indexes of the modules within each phase A, B, and C, where each double-sided arrow indicates the energy contribution of a particular module within each phase in an example having nine modules with three in each phase).

Inter-phase balancing can be performed by the control circuitry (e.g., controller 3200, MCD 112) by adding certain common modes to the phase references (VrnA, VrnB, VrnC), the neutral point 'N' may be shifted from one position to another. A change in a phase reference causes a change in modulation indexes of all the modules in that phase which increases or decreases their aggregated contribution to the power. For example, after measuring one or more parameters (e.g., SOC, T, Q, SOH, V, I) of the modules in each phase, inter-phase balancing controller 3210 can determine to adjust the energy output (discharging) or input (charging) to one or more phases. For example, if a determination is made to lower the energy output of the modules in phase A by 10%, then a component equal to 10% of VrnA can be subtracted from VrnA, and this same 10% component (e.g., the common mode) of VrnA can also be subtracted from VrnB and VrnC, which will shift the neutral point towards A. As mentioned above, this can occur at the same time as intra-phase balancing is being performed.

For example in FIG. 33B, assuming that the system is discharging and the total energy available in the modules of phase A is smaller than the total energy available in modules of phase C, which in turn is smaller than the total energy available in the modules of phase B, for SOC balancing the neutral point can be shifted from the position of FIG. 33A to that of FIG. 33B, as shown by 3310, according to a similar common mode technique. This decreases the contribution of phase A, and to a lesser extent decreases the contribution of phase C, and increases the contribution of phase B to compensate. This provides control over the share of energy output by each phase to establish the three phase voltages.

Figure 34A:
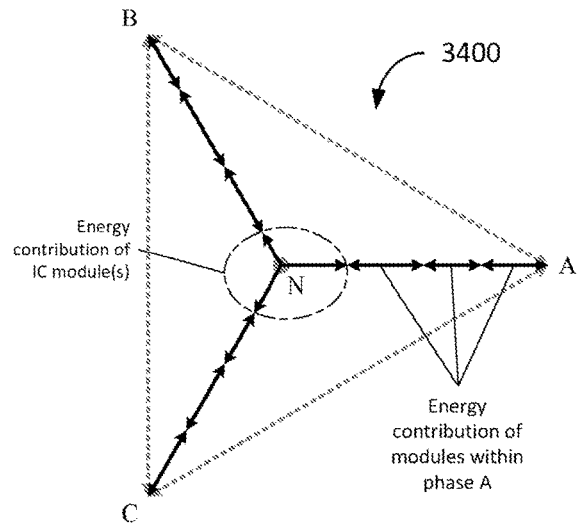
FIGS. 34A and 34B depict phasor diagrams of voltage sharing control for a three-phase structure with interconnection modules (or common modules) with intra-phase and inter-phase balancing through (A) common modules and (B) common modules and neutral point shift.
Figure 34B:
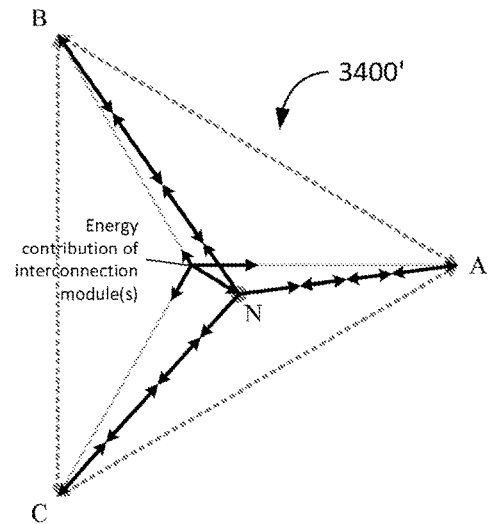

FIGS. 34A and 34B are phasor diagrams depicting example embodiments 3400 and 3400' of control techniques for a Y-connected three-phase system with interconnection (IC) modules between phases A, B, and C (see, e.g., system 100, FIGS. 20 and 24). Here, intra-phase balancing can again be achieved by controlling the modulation indexes of the modules within each phase array as described. Inter-phase balancing, e.g., controlled overall by controller 3200, can be performed by selectively applying energy from one or more IC modules to the arrays of one or more phases, which can be referred to as inter-phase energy injection. This is depicted in FIG. 34A, where a fourth contribution (as compared to the example of FIG. 33A) supplied by the IC module(s) has been added in the center of the phasor diagram.

FIG. 34A represents an example where the system is discharging and the total energy (SOC) available in the three modules of phase A is smaller than the total energy available in the three modules of phase C, which in turn is smaller than the total energy available in the three modules of phase B ($SOC_A < SOC_C < SOC_B$). Controller 3200 can supply or output a modulation index to the IC module of phase A that is greater than the modulation index for the IC module of phase B (which can be the same or a different IC module), that in turn is greater than the modulation index for the IC module of phase C (which can be the same or a different IC module than that of A and B) ($M_{IA} > M_{IC} > M_{IB}$). The modulation indexes for the non-interconnection modules within each phase can be decreased accordingly, and therefore the contribution of non-interconnection modules of phase B is more than those of phase C, which in turn is more than those of phase A, which moves the system toward balanced SOC in all phases. A similar approach can be used to balance one or more of the other parameters (T, Q, SOH, V, I).

In systems with IC modules between phases, inter-phase balancing can also be performed by neutral point shifting (or common mode injection) as described above. FIG. 34B depicts an example where inter-phase balancing is performed by controller 3200 in a system with IC modules using both common mode injection and inter-phase energy injection. Such a combination allows for more robust and flexible balancing under a wider range of operating conditions.

System 100 can determine the appropriate circumstances under which to perform inter-phase balancing with neutral point shifting alone, inter-phase energy injection alone, or a combination of both simultaneously. Neutral point shifting can be performed with energy from all of the modules of each phase array, whereas inter-phase energy injection is performed with energy from just the one or more IC modules. Thus neutral point shifting has a wider range of energy available to cover more disparate inter-phase imbalances. There may be embodiments where system 100 is supplying auxiliary loads or other systems where shifting the neutral point is undesirable, and in some cases neutral point shifting may increase the phase shift between voltage and current of the phase array, which may increase DC second order harmonics. Inter-phase energy injection permits balancing without shifting the neutral point and can avoid these potential side effects. In some embodiments, control circuitry 102 (e.g., controller 3200, MCD 114) can use inter-phase energy injection for inter-phase imbalances that are relative small or minor, and can use neutral point shifting (either alone or with inter-phase energy injection) for inter-phase imbalances that are relatively larger or more severe, and/or that require balancing in a short period of time. In these embodiments, control circuitry 102 can be configured to assess or determine the degree of inter-phase imbalance and compare it to a threshold (e.g., SOC, temperature) that differentiates between the inter-phase imbalances that are relatively small and relatively large (or other condition that governs which technique to use), and execute inter-phase balancing using only inter-phase energy injection for small differences and using either neutral point shifting or a combination of both for relatively larger differences.

Figure 35A:
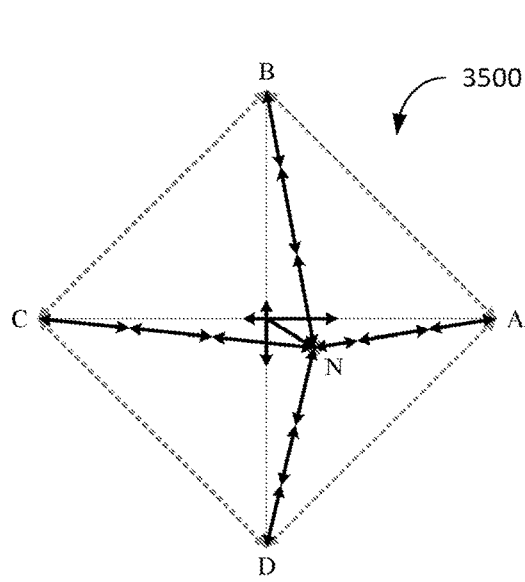
FIGS. 35A and 35B depict phasor diagrams of voltage sharing control with intra-phase and inter-phase balancing for four-phase systems with (A) neutral point shift and (B) interconnection modules and neutral point shift.
Figure 35B:
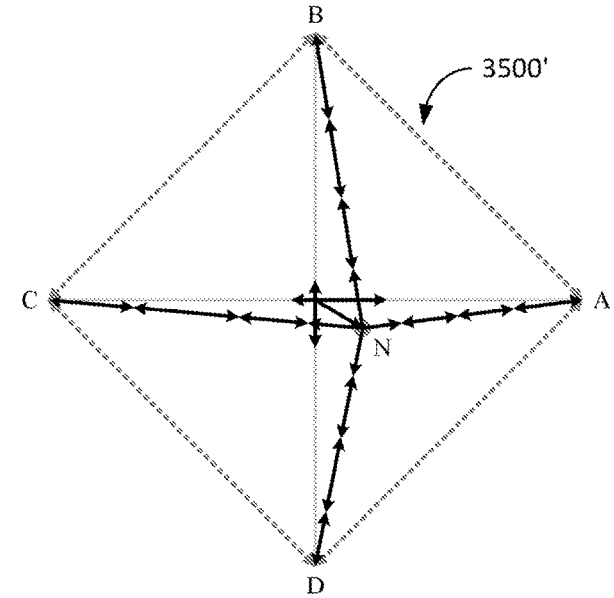

FIGS. 35A and 35B are phasor diagrams depicting example embodiments 3500 and 3500' of control techniques for a four-phase system without IC modules and with IC modules, respectively, between phases A, B, C, and D. Here, intra-phase balancing can be achieved by controlling the modulation indexes of the modules within each of phases A, B, C, and D. Inter-phase balancing can be achieved by neutral point shifting and/or by controlling the contribution of the interconnection modules to each phase where applicable (inter-phase energy injection).

Figure 36A:
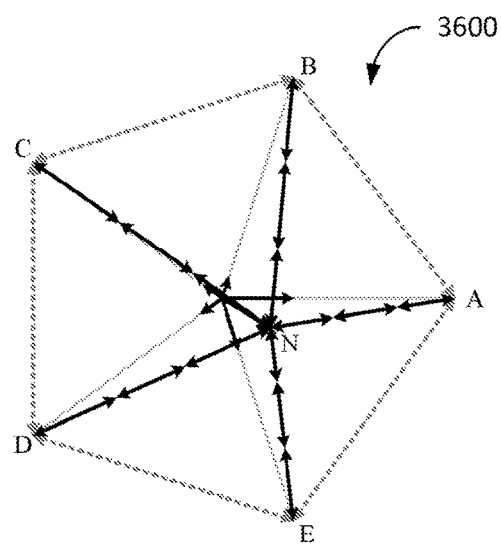
FIGS. 36A and 36B depict phasor diagrams of voltage sharing control with intra-phase and inter-phase balancing for five-phase systems with (A) neutral point shift and (B) interconnection modules and neutral point shift.
Figure 36B:
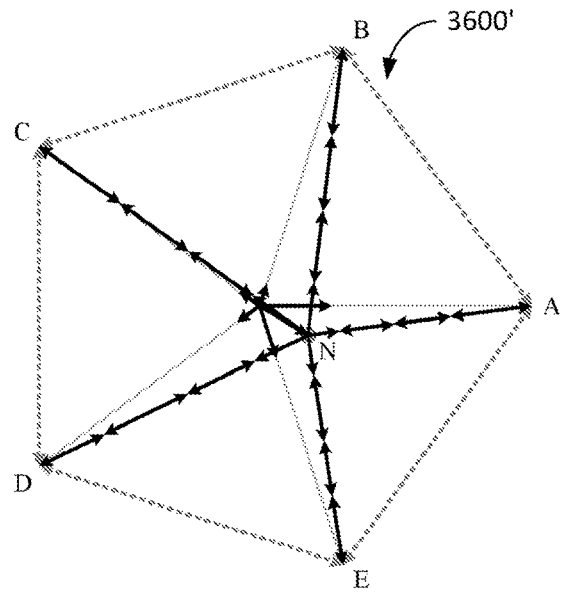

FIGS. 36A and 36B are phasor diagrams depicting example embodiments 3600 and 3600' of control techniques for a five-phase system without IC modules and with IC modules, respectively, between phases A, B, C, D, and E. Here, intra-phase balancing can be achieved by controlling the modulation indexes of the modules within each of phases A, B, C, D, and E. Inter-phase balancing can be achieved by neutral point shifting and/or by controlling the contribution of the interconnection modules to each phase where applicable (inter-phase energy injection).

Figure 37A:
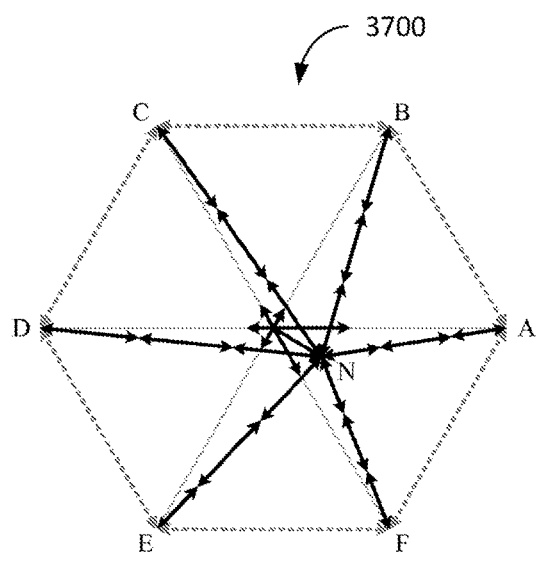
FIGS. 37A and 37B depict phasor diagrams of voltage sharing control with intra-phase and inter-phase balancing for six-phase systems with (A) neutral point shift and (B) interconnection modules and neutral point shift.
Figure 37B:
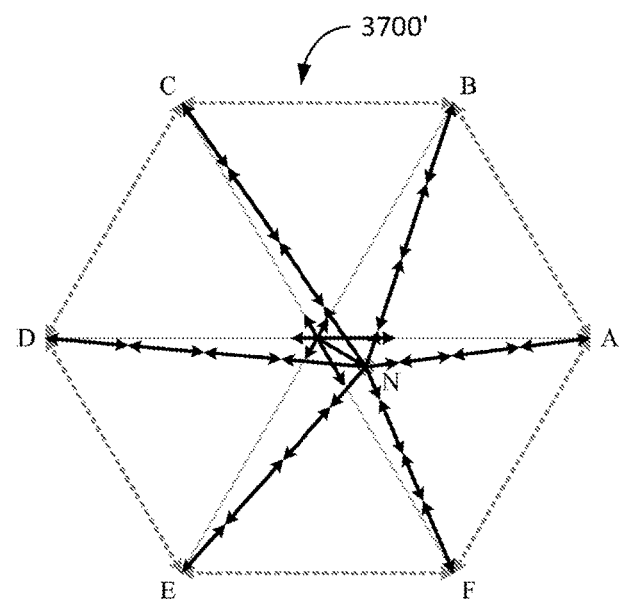
Figure 38A:
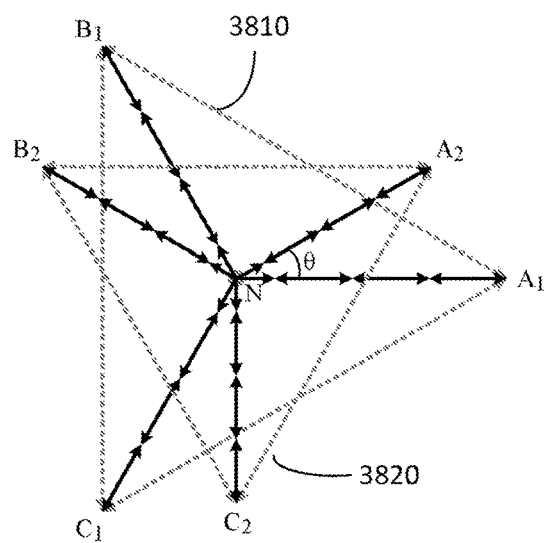
FIGS. 38A and 38B depict phasor diagrams of voltage sharing control with intra-phase and inter-phase balancing for an example system shown in FIG. 27 through (A) interconnection modules and (B) interconnection modules and neutral point shift.
Figure 38B:
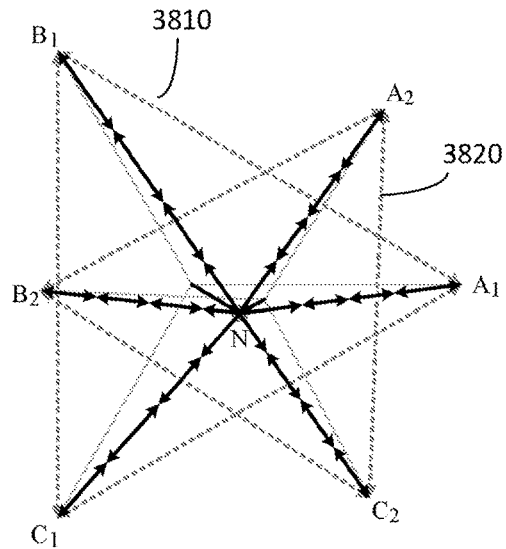

FIGS. 37A and 37B are phasor diagrams depicting example embodiments 3700 and 3700' of control techniques for a six-phase system without IC modules and with IC modules (e.g., described with respect to FIG. 26), respectively, between phases A, B, C, D, E, and F. Here, intra-phase balancing can be achieved by controlling the modulation indexes of the modules within each of phases A, B, C, D, E, and F. Inter-phase balancing can be achieved by neutral point shifting and/or by controlling the contribution of the interconnection modules to each phase where applicable (inter-phase energy injection).

In system 100 as described with respect to FIG. 27, two three-phase systems 2700 and 2700' that can discharge and charge with a different voltage and frequency are shown. Intra-phase balancing for these systems can be achieved through controlling the modulation indexes of the modules 108 within each phase A, B, C, A', B', C'. Inter-phase balancing within each system 2700 and 2700' and between the two systems can be achieved by controlling the voltage contribution of the IC modules 108-IC to each phase. Examples 3810 and 3820 of inter-phase balancing with IC modules 108-IC is depicted in the phasor diagram of FIG. 38A, as applied to systems 2700 and 2700', respectively, for an example where N is 3. Inter-phase balancing within each system 2700 and 2700' may alternatively or additionally be accomplished by neutral point shifting as shown in the examples 3810 and 3820 of FIG. 38B.

Figure 39A:
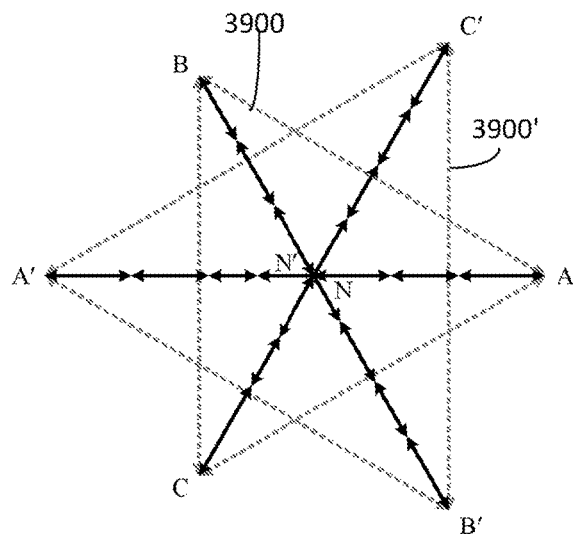
FIGS. 39A and 39B depict phasor diagrams of voltage sharing control with intra-phase and inter-phase balancing for systems shown in FIG. 28 through (A) interconnection modules and (B) interconnection modules and neutral point shift.
Figure 39B:
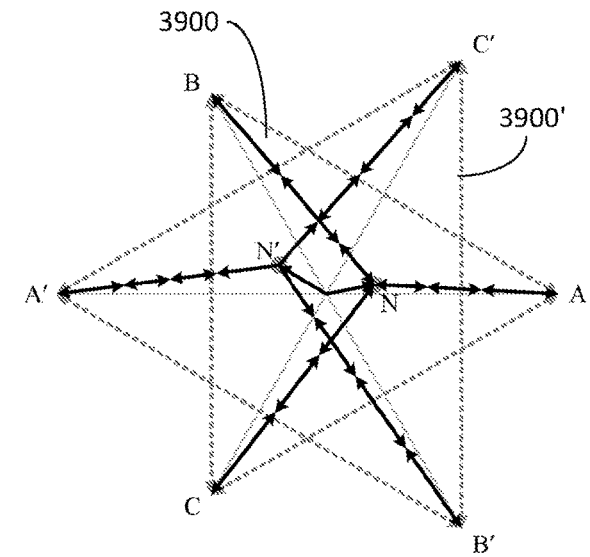

In system 100 as described with respect to FIG. 28, two three-phase systems 2800 and 2800' are described that discharge with similar frequency but may have different voltage are considered. Balancing of systems 2800 and 2800' is described with respect to examples 3900 and 3900', respectively, in FIGS. 39A and 39B (for an example where N=2 for system 2800 and M-N=3 for system 2800'). In FIG. 39A, since complementary phases in the two systems 3900, 3900' work in pairs to generate voltage across each motor winding, modules 108 in phase pairs (e.g., A and A', B and B', C and C') may be considered for intra-phase balancing. For example, to establish a certain voltage between A and A', all the modules 108 in the A and A' phases can contribute proportionally according to their status information. Inter-phase balancing, or in this case balancing between phase pairs may be implemented through interconnection modules 108-IC as shown in FIG. 39A. Inter-phase balancing within each system 2800 and 2800' may alternatively or additionally be accomplished by neutral point shifting as shown in the examples 3900 and 3900' of FIG. 39B.

Figure 40A:
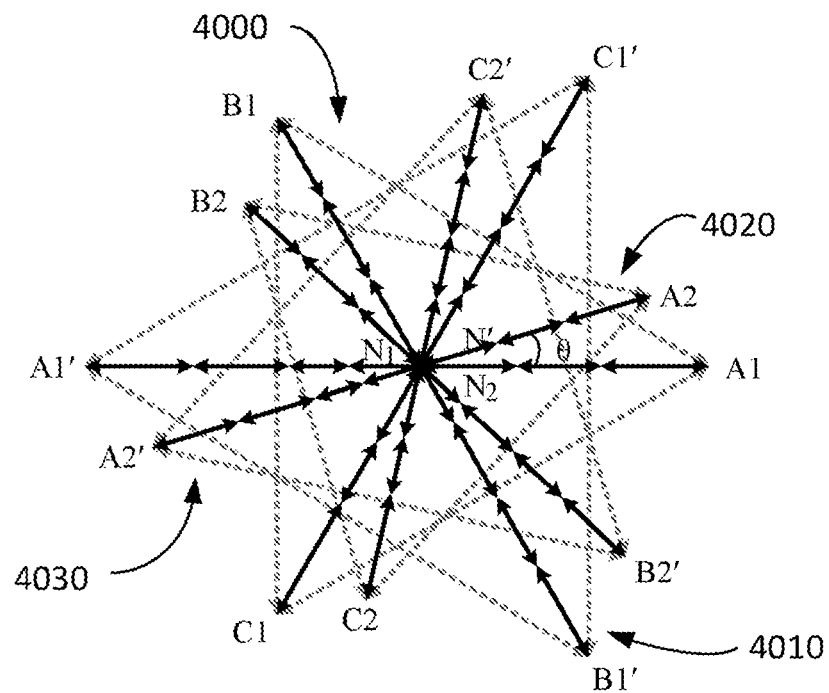
FIGS. 40A and 40B depict phasor diagrams of voltage sharing control with intra-phase and inter-phase balancing for systems shown in FIG. 29 through (A) interconnection modules and (B) interconnection modules and neutral point shift.

In system 100 as described with respect to FIG. 29, system 2901 and system 2902 may operate in different voltages and frequencies. Within system 2901, sub-systems 2900 and 2900' may operate at similar or equal frequency but may have different voltages, and within system 2902, sub-systems 2900" and 2900'" may operate at similar or equal frequency but may have different voltages. Balancing of systems 2900, 2900', 2900", 2900'" is described with respect to examples 4000, 4010, 4020, 4030, respectively, in FIGS. 40A and 40B (for an example where each system 2900, 2900', 2900", and 2900'" has 3 rows of modules 108 not including IC modules 108-IC). In FIG. 40A, since complementary phases in the four systems 4000, 4010, 4020, 4030 work in pairs to generate voltage across each motor winding, modules 108 in phase pairs (e.g., A1 and A1', B1 and B1', C1 and C1', A2 and A2', B2 and B2', C2 and C2',) may be considered for intra-phase balancing. For example, to establish a certain voltage between A1 and A1', all the modules 108 in the A1 and A1' phases can contribute proportionally according to their status information.

Figure 40B:
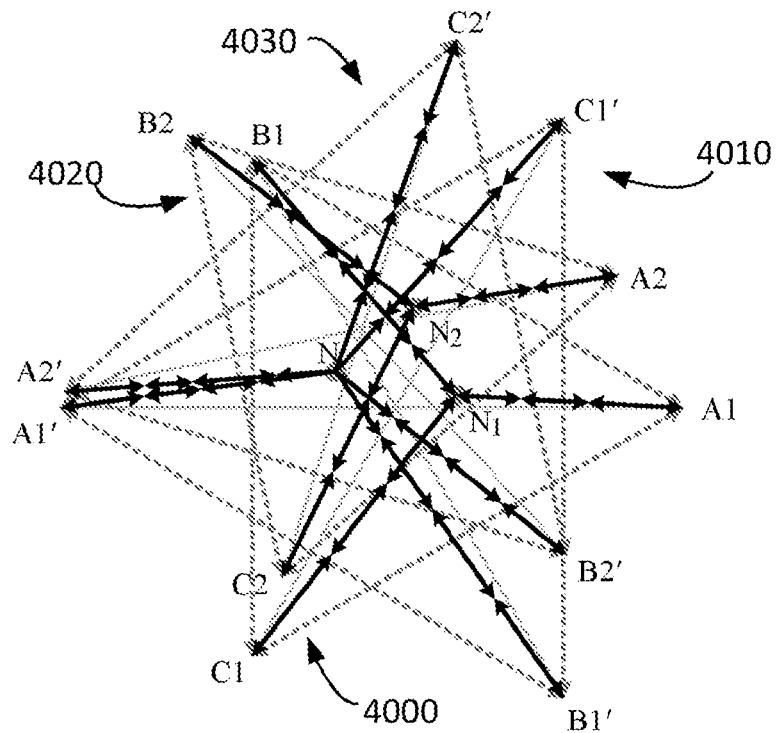

Inter-phase balancing, or in this case balancing between phase pairs may be implemented through interconnection modules 108-IC of 4010 and 4030 as shown in FIG. 40A. Inter-phase balancing within each system 2900, 2900', 2900", and 2900'" may alternatively or additionally be accomplished by neutral point shifting as shown in the examples of FIG. 40B.

Additional Example Embodiments of IC Modules

An interconnection (IC) module can be used for either or both of inter-phase balancing and auxiliary load supply. In addition to being employable as a standard module stage (e.g., one of N modules) within a phase, ConSource module V3 is shown and described as being employable as an IC module 108-IC capable of both inter-phase balancing and auxiliary load supply (e.g., see the example embodiments described with respect to FIGS. 4, 17, 20, 21, 24-29). IC modules can be implemented in other configurations as well, including those of FIG. 2 and FIG. 3 where the module outputs (out1 and out2) are connected to separate arrays of modules operating in different phases. IC modules can include any number of one or more energy sources, an optional energy buffer, switch circuitry for supplying energy to one or more module arrays and/or for supplying power to one or more auxiliary loads, can include control circuitry (e.g., a local control device), and can include measurement circuitry (e.g., one or more circuits and/or sensors) for measuring various parameters about the IC module itself or its various loads (e.g., SOC of an energy source, temperature of an energy source or energy buffer, capacity of an energy source, SOH of an energy source, voltage and/or current measurements pertaining to the IC module, voltage and/or current measurements pertaining to the auxiliary load(s), etc.).

Figure 41A:
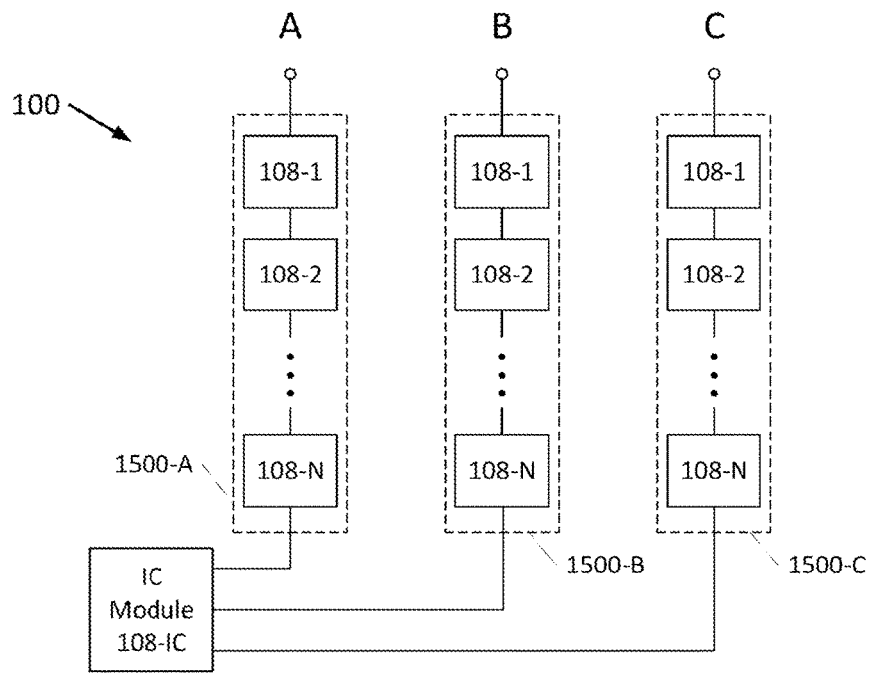
FIGS. 41A-41F are block and schematic diagrams depicting example embodiments of energy supply systems with interconnection modules.

FIG. 41A is a block diagram depicting an example embodiment of a system 100 with an IC module 108-IC configured as for use in inter-phase balancing between arrays 1500-A, 1500-B, and 1500-C of phases A, B, and C, respectively. IC module 108-IC can be configured according to any of ConSource module embodiments V1, V2, or V3. IC module 108-IC can selectively connect the one or more energy sources of the module 108-IC to one or more of the arrays 1500-A, 1500-B, and 1500-C, or to no output. System 100 can be controlled by control circuitry 102 (not shown, see FIG. 1A). Array 1500-A outputs an AC voltage waveform (VoutA) at node A, array 1500-B outputs an AC voltage waveform (VoutB) at node B, and array 1500-C outputs an AC voltage waveform (VoutC) and node C.

Figure 41B:
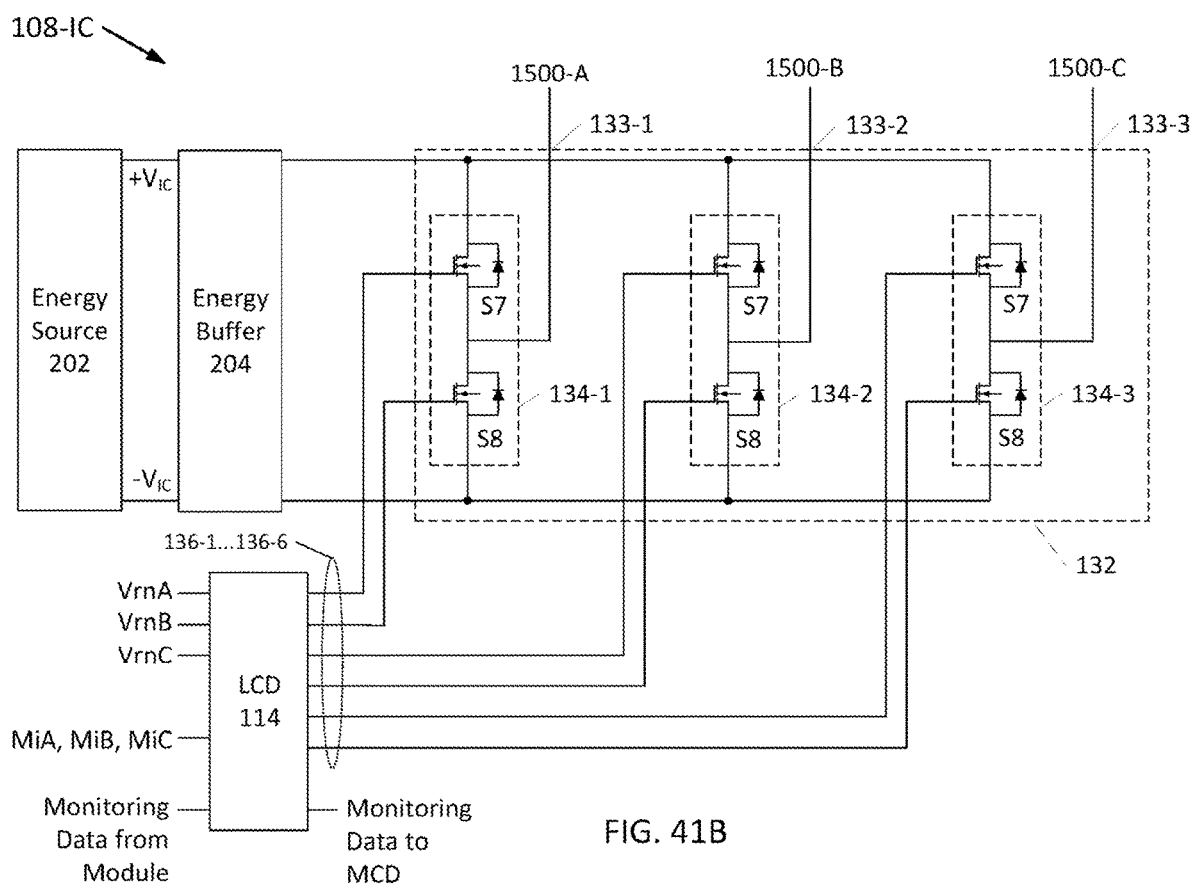

FIG. 41B is a schematic diagram depicting an example embodiment of IC module 108-IC having Energy Source 202 coupled with switch circuitry 132. As described with respect to switch circuitry 207 and 208, switch circuitry 132 can be configured in any arrangement and with any switch types (e.g., MOSFET, IGBT, Silicon, GaN, etc.) suitable for the requirements of the application. Switch circuitry 132 has an output 133-1, 133-2, and 133-3 coupled to a module of each of arrays 1500-A, 1500-B, and 1500-C. In other embodiments, IC module 108-IC can be coupled with a system having only two phases, in which case only two outputs 133 are necessary. Similarly, IC module 108-IC can be scaled up with additional switch circuitry and outputs to couple to systems having more than three phases.

With reference to FIGS. 41A and 41B, the three arrays 1500 are located electrically between IC module 108-IC and the outputs A, B, C to the load. Put differently, array 1500-A has a first terminal A for connection to a load and a second terminal (located opposite to the first terminal on the opposite end of array 1500-A) for connection to output 133-1 of IC module 108-IC. Similarly, array 1500-B and array 1500-C each have a first terminal B and C, respectively, for connection to the load, and a second terminal for connection to outputs 133-2 and 133-3, respectively, of IC module 108-IC. Positioning of IC module 108-IC in this manner allows, among other things, the IC module to control the routing of current between each of the three phase arrays 1500-A, B, and C.

In this embodiment, switch circuitry 132 is implemented with three switch sections 134-1, 134-2, and 134-3, each coupled to a respective output 133. Each switch section 134 can be controlled by control circuitry (e.g., control circuitry 102, see FIG. 1A) via one or more control input lines 136. The control circuitry can control switch circuitry 132 according to any desired control technique, including the PWM and hysteresis techniques mentioned herein.

In the example of FIG. 41B, control circuitry 102 is implemented as LCD 114 and MCD 112 (not shown). LCD 114 is associated with this IC module 108-IC and can receive monitoring data from the IC module 108-IC (e.g., SOC of ES1, temperature of ES1, Q of ES1, etc.) from sensors or other measurement devices or circuits (not shown) coupled with module 108-IC. This monitoring data and/or other data derived from this monitoring data can be out to MDC 112 for use in system control as described herein. LCD 114 can also receive timing information (not shown) for purposes of synchronization of modules of the system 100. One or more carrier signals (not shown), such as the sawtooth signals used in PWM (FIGS. 14A, 14B) can also be received by LCD 114 or generated internally by LCD 114.

Switch sections 134 can each be implemented as a half leg with switches S7 and S8, selectively controllable by LCD 114 via control input lines 136-1 through 136-6. (Switches S7 and S8 can be the same as switches S3 and S4 (or S5 and S6) described earlier.) For inter-phase balancing, energy from energy source 202 can be supplied to any one or two phase arrays 1500 over time using switch sections 134. Supply of supplemental energy to one or two phase arrays allows the energy output of those cascaded modules 108-1 thru 108-N of those supplied phase arrays to be reduced, relative to the unsupplied phase array(s).

For example, in some example embodiments applying PWM, LCD 114 can be configured to receive the normalized voltage reference signal (Vrn) (from MCD 112) for each of the one or more phase arrays that IC module 108-IC is coupled to, which in this example is all three: VrnA, VrnB, VrnC. LCD 114 can also receive modulation indexes MiA, MiB, MiC for the switch sections 134-1, 134-2, 134-3 for each phase array, respectively, from MCD 112. LCD 114 can modulate (e.g., multiply) each respective Vrn with the modulation index for the switch section coupled directly to that phase array (e.g., VrnA multiplied by MiA) and then utilize a carrier signal to generate the control signal(s) for each switch section 134. In other embodiments, MCD 112 can perform the modulation and output modulated voltage reference waveforms for each section 134 directly to LCD 114. In still other embodiments, all processing and modulation can occur by a single control entity that can output the control signals directly to each section 134.

This switching can be modulated such that power from Energy Source 202 is supplied to the array(s) at appropriate intervals and durations. Such methodology can be implemented in various ways.

In one example embodiment, the PWM approach described with respect to FIGS. 14A-14D is applied to the embodiment of FIGS. 41A and 41B, where the switch circuitry 207 of each module 108-1 through 108-N is configured as an H-bridge (FIG. 5A). For an example case where there are four cascaded stages (N=4) in each array 1500, plus an IC module 108-IC, then nine carrier signals (2N+1) equally offset in phase angle are used to generate control signals. Eight of the nine carrier signals are used to generate control signals for each of the four modules 108-1 through 108-4 (e.g., one carrier for S3 and S4 and one carrier for S5 and S6 per module) of a particular array 1500, and the ninth carrier can be used to generate the control signals for the switch section 134 of the IC module 108-IC. Each AC output waveform (Vout) can thus be an eleven level waveform with a first level at zero volts, eight levels producible by the four cascaded modules 108-1 through 108-4, and two producible by IC module 108-IC (+Vic and −Vic shown in FIG. 41B). (Energy Source 202 of IC module 108-IC is preferably the same standard voltage as the energy sources of the cascaded modules, although such is not required.)

During balanced operation, the modulation index for each switch section 134 can be set at a value that causes the same or similar amount of net energy to be supplied by energy source 202 and/or energy buffer 204 to each array 1500. For example, the modulation index used for each switch section 134 could be the same or similar, and can be set at a level or value that causes the IC module(s) to perform a net or time average discharge of energy to one or more arrays 1500 during balanced operation, so as to drain the IC module(s) at the same rate as other modules in the system. In some embodiments, the modulation index used for each switch section 134 could be the same or similar, and can be set at a level or value that does not cause a net or time average discharge of energy during balanced operation (causes a net energy discharge of zero). This can be useful in a situation where the IC module(s) may be drained below the level of the other modules and continued operation of the other modules is required without draining the IC module(s) in order to reach similar SOC levels across the entire system 100. For example, this could occur if an EV is supplying power to the auxiliary loads for an extended period of time without driving.

When an unbalanced condition occurs between arrays 1500, then the modulation indexes of system 100 can be adjusted to cause the system to converge back to a balanced condition. For example, control circuitry 102 can detect that one of arrays 1500 has a relatively lower SOC parameter (e.g., sum total SOC of cascaded modules 108-1 to 108-4) than the other arrays. Control circuitry 102 can then cause the IC module 108-IC to discharge more to that low array than the others, and can also cause the cascaded modules of that low array to discharge relatively less (e.g., on a time average basis). The relative net energy contributed by the IC module 108-IC increases as compared to the modules of the array being assisted, and also as compared to the amount of net energy the IC module contributes to the other arrays. This can be accomplished by increasing the modulation index for the IC module switch section supplying that low array, and by decreasing the modulation indexes of one or more cascaded modules of that low array, in a manner that maintains Vout for that low array at the appropriate or required levels, and leaving the modulation indexes for other switch sections 134 supplying the other phase arrays relatively unchanged. Additional example embodiments of inter-phase balancing with IC modules are described with respect to FIGS. 42A-42B below.

IC module 108-IC can also be scaled to supply current to one or more phases of a first system or pack, and one or more phases of a second system or pack (see e.g., IC modules 108-IC of FIGS. 27A, 27B, and 29). For example, a first switch section 134-1 of an IC module can be coupled with a phase array of a first pack, and a second switch section 134-2 of the IC module can be coupled with a phase array of a different second pack. The first pack can have multiple arrays providing multi-phase supply to a first motor and the second pack can have multiple arrays providing multi-phase supply to a second motor (e.g., as depicted in FIGS. 27A, 27B and 29). For inter-pack balancing, energy from the IC module can be supplied to the two phase arrays of the different packs over time using switch sections 134-1 and 134-2. The system can be scaled such that each IC module supplies two arrays, one from each pack, thus requiring three IC modules for two three phase packs (as shown in FIGS. 27A, 27B, and 29), or each IC module supplies more than two arrays, up to and including all arrays of both packs (e.g., one IC module coupled all three arrays of a first three-phase pack and all three arrays of a second three phase pack). The control circuitry can monitor relative parameters (e.g., SOC and temperature) of the arrays of the different packs and adjust the energy output of the IC modules to compensate for imbalances between arrays or phases of different packs in the same manner described herein as compensating for imbalances between arrays or phases of the same pack. In all cases with multiple IC modules, the energy sources can be coupled together in parallel so as to share energy as described herein.

Figure 41C:
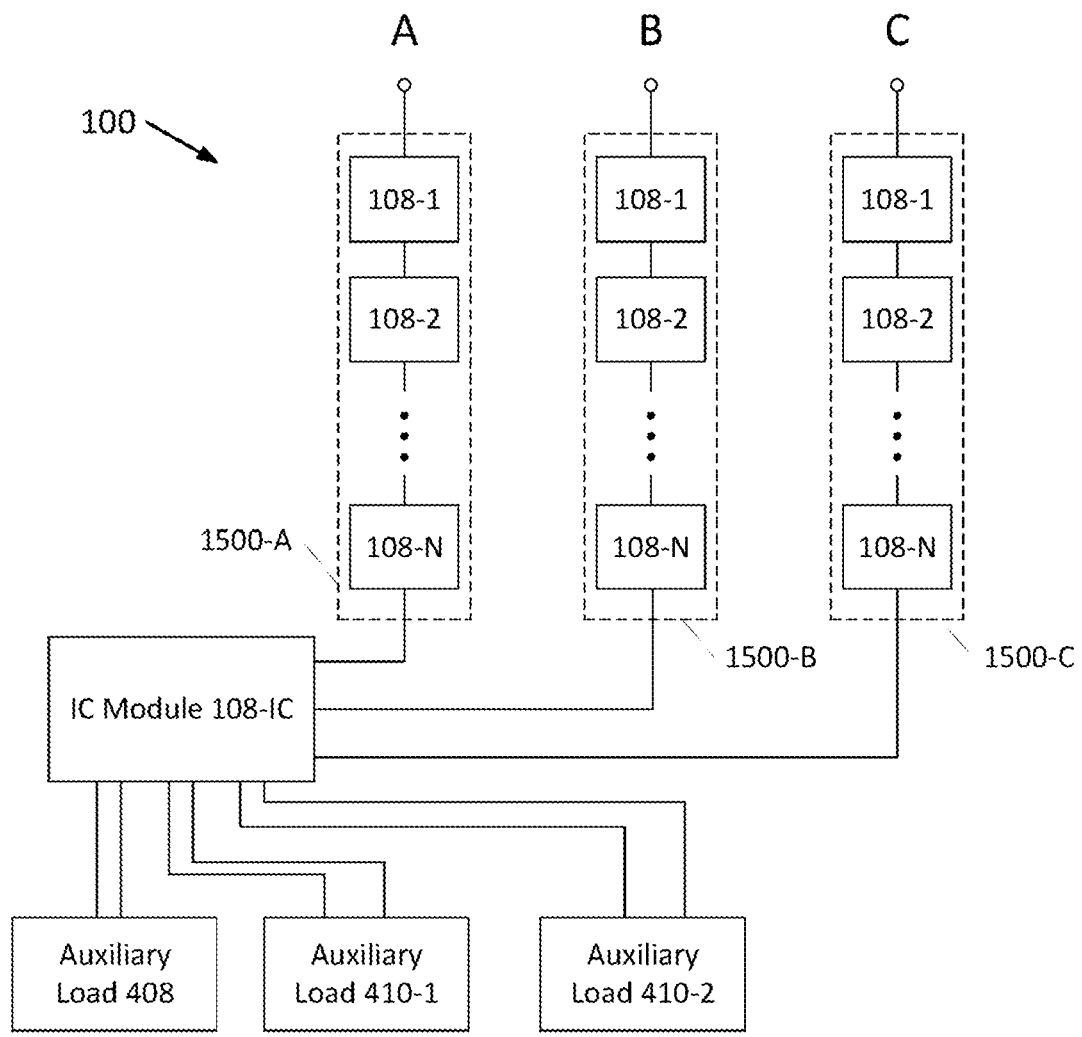
Figure 41D:
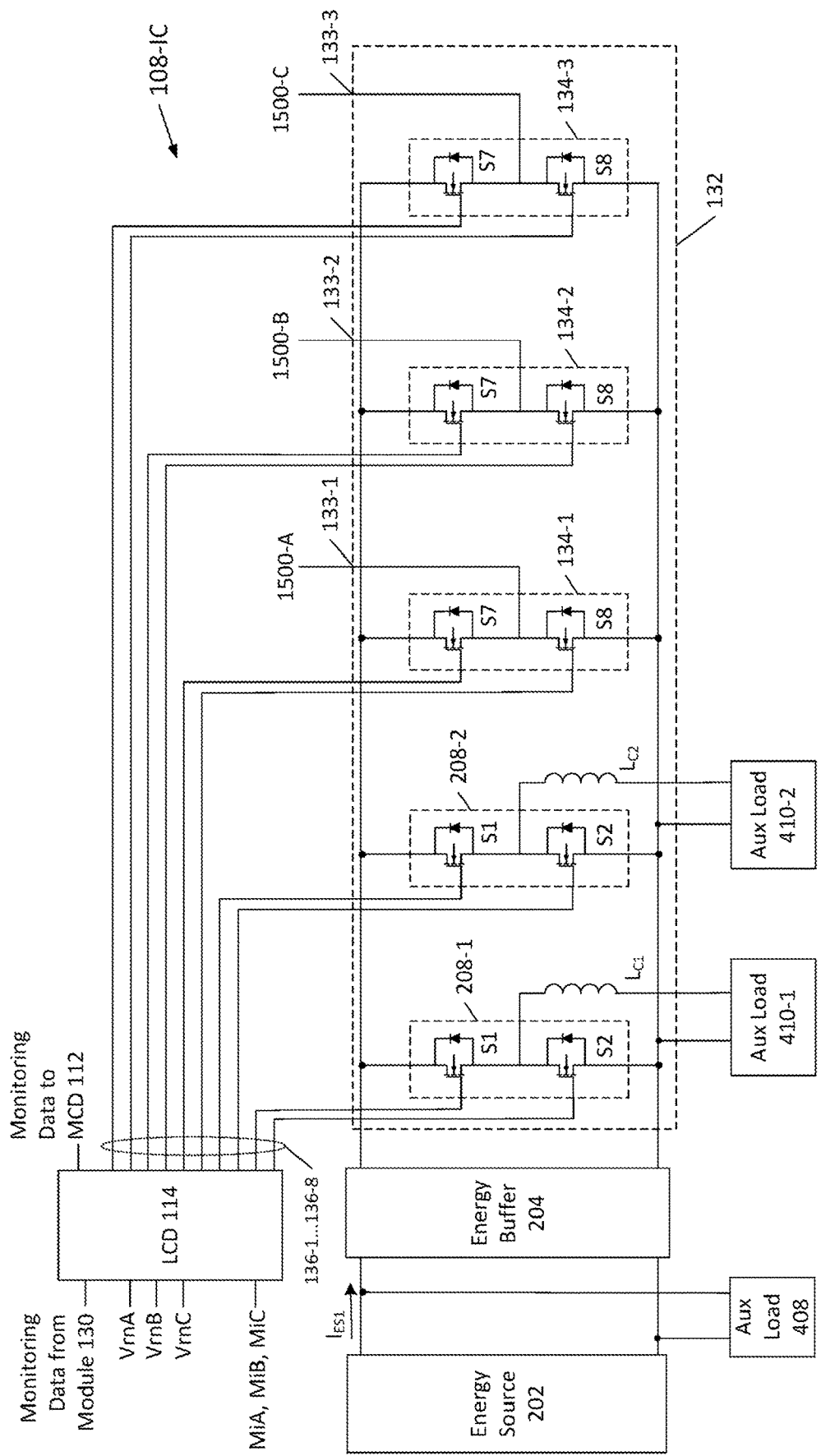

IC module 108-IC can also be configured to supply power to one or more Auxiliary Loads 408 (at the same voltage as Energy Source 202) and/or one or more Auxiliary Loads 410 (at voltages stepped down from Energy Source 202). FIG. 41C is a block diagram depicting an example embodiment of a system 100 similar to that of FIG. 41A, but with IC module 108-IC supplying auxiliary loads 408, 410-1, and 410-2. FIG. 41D is a schematic and block diagram depicting this example embodiment of system 100 with emphasis on IC module 108-IC having energy source 202 coupled with switch circuitry 132. Here, control circuitry 102 is again implemented as LCD 114 and MCD 112 (not shown). LCD 114 can receive monitoring data from IC module 108-IC (e.g., SOC of ES1, temperature of ES1, Q of ES1, voltage of Aux Loads 410, etc.) and can output this and/or other monitoring data to MCD 112 for use in system control as described herein. In this embodiment, switch circuitry 132 is configured to provide inter-phase balance capability and also to supply Auxiliary loads 408, 410-1, and 410-2. Switch circuitry 132 is implemented with two additional switch sections 208-1 and 208-2, which can have numerous different configurations. Here, sections 208-1 and 208-2 each include switches S1 and S2, and thus are configured like the embodiment described with respect to FIG. 5B. Switch section 208-1 has an output coupled to inductor $L_{C1}$, which is in turn coupled with Auxiliary Load 410-1. Switch section 208-2 has an output coupled to inductor $L_{C2}$, which is in turn coupled with Auxiliary Load 410-2. Switch sections 208-1 and 208-2 can be controlled by LCD 112 with one or more control lines 136.

Auxiliary Loads 410-1 and 410-2 can operate at different voltages based on the inductance of $L_{C1}$ and $L_{C2}$ and the duty cycles applied to switch sections 208-1 and 208-2. For example, if Energy Source 202 operates at 48V, then Auxiliary Load 408 can also operate at 48V, Auxiliary Load 410-1 can operate at 24V, and Auxiliary Load 410-2 can operate at 12V. Those of ordinary skill in the art will recognize from this disclosure that the embodiments can be operated at almost limitless different voltages and combinations of voltages. Voltage and/or current monitoring circuitry (not shown) can monitor the voltage and/or current supplied to Auxiliary Loads 410-1 and 410-2, which is then fed back to LCD 114 as monitoring data from the module. This data can be used by LCD 114 to control the duty cycle of switch sections 208-1 and 208-2 and thus independently regulate the voltages supplied to loads 410-1 and 410-2.

In order to increase the power supply capability of IC module 108-IC, Energy Source 202 can be configured with a higher capacity than the energy sources of modules 108. For example, in an embodiment where one IC module applies energy to three phase arrays, and the energy output by the IC module for each phase array is approximately one half that of the modules in that phase array, then the IC module preferably has a capacity 1.5 times greater than the modules in the phase arrays (assuming those modules have the same capacity), so as to allow the IC module to discharge at the same rate as the modules of the phase arrays themselves. If the IC module is also supplying an auxiliary load, then an even greater capacity may be desired, such as twice the capacity of the modules in the phase arrays, so as to permit the IC module to both supply the auxiliary load and discharge at relatively same rate as the other modules. Alternatively, or in addition to a higher capacity, IC modules 108-IC can be connected such that the Energy Sources 202 of more than one, or all, of the IC modules 108-IC are in parallel as described and shown herein with respect to ConSource module V3 108-IC (see, e.g., coupling together of ports 3 and 4 as described with respect to FIGS. 4, 20, 21, and 24-29). In those examples, placing the energy sources in parallel essentially doubles the capacity and permits the IC modules to discharge at relatively the same rate as the other modules in the system while also supplying the auxiliary loads.

Figure 41E:
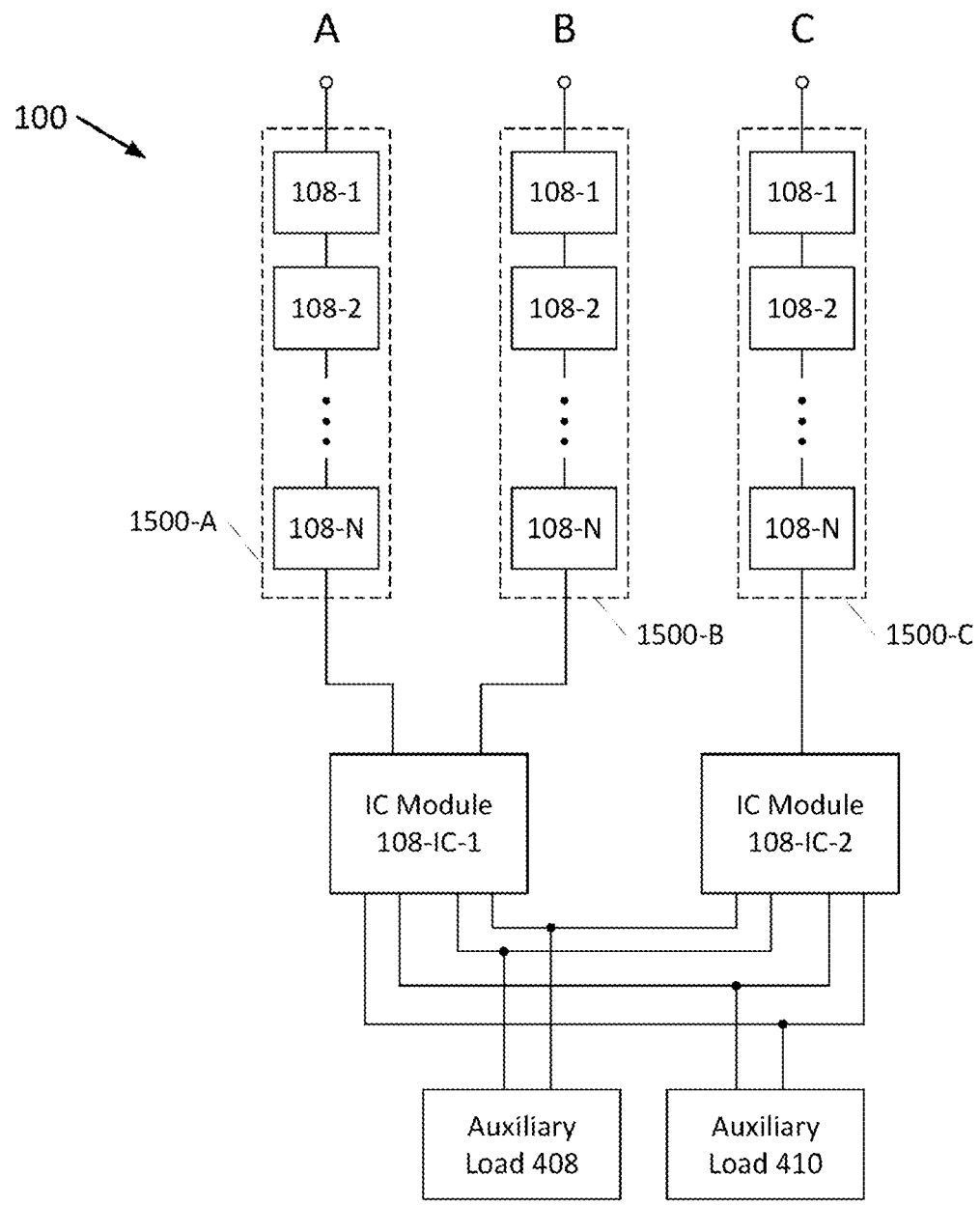
Figure 41F:
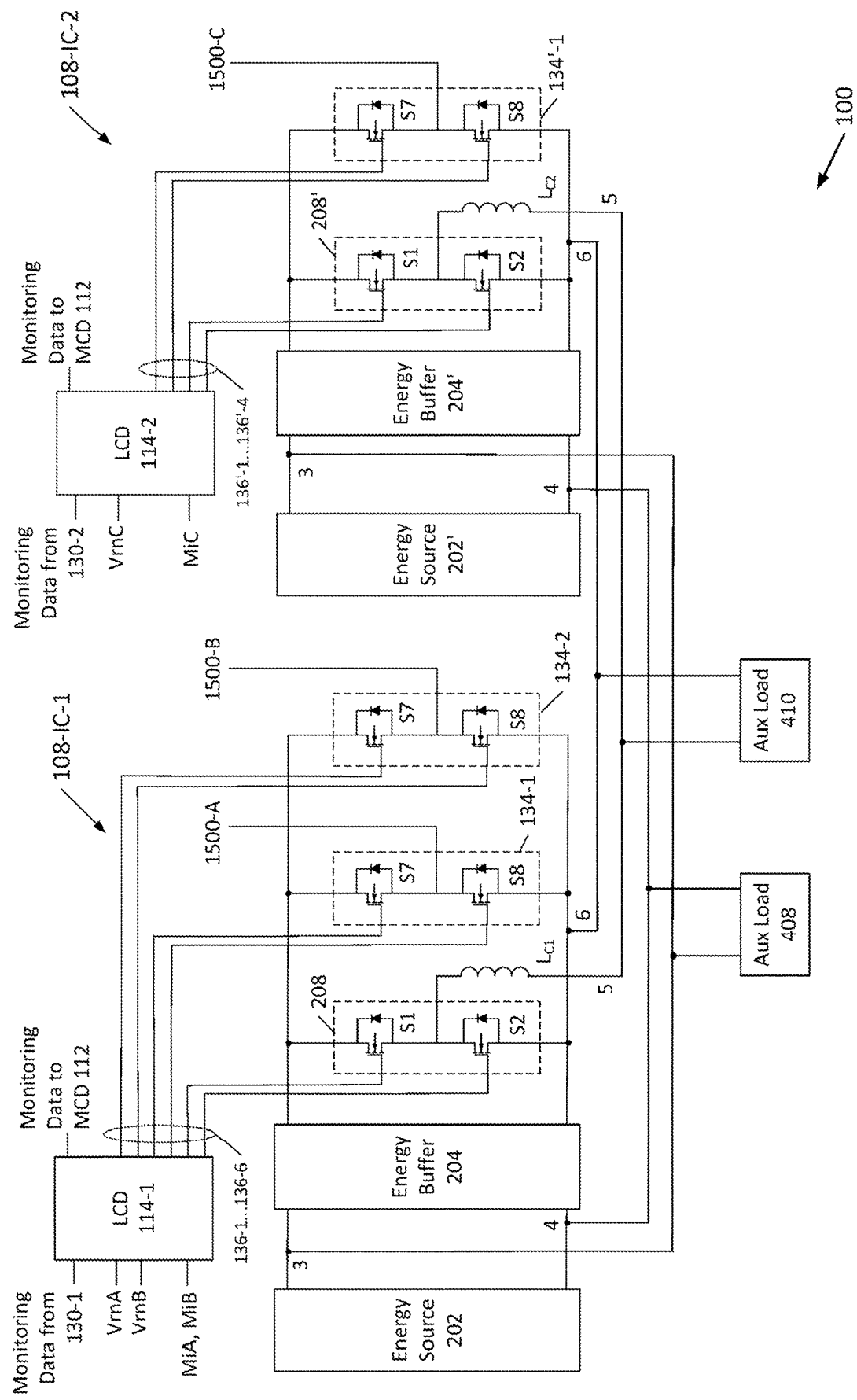

FIG. 41E is a block diagram depicting an example embodiment of a system 100 similar to that of FIG. 25, but without showing the load or motor. Here, two IC modules 108-IC-1 and 108-IC-2 are implemented, with module 108-IC-1 coupled with phase arrays 1500-A and 1500-B, and with module 108-IC-2 coupled with phase array 1550-C. Both modules 108-IC supply auxiliary loads 408 and 410. FIG. 41F is a schematic diagram of the system of FIG. 41E with emphasis on the two IC modules 108-IC and their LCDs 114, with module 108-IC-1 implemented as ConSource V3 module 108-IC and module 108-IC-2 implemented as a ConSource V3 module 108-IC but without the second switch section 134 (e.g., switches S5 and S6 of FIG. 5B). Here each module 108-IC-1 and 108-IC-2 includes switch circuitry 208 and a coupling inductor LC to supply Auxiliary Load 410 so as to double the current carrying capacity.

The use of two or more IC modules 108-IC with energy sources 202 connected in parallel, as shown here via connections to nodes 3 and 4 of each module, enables energy to be exchanged between modules, and enables both to operate while staying in a relatively balanced condition. In other words, the energy source 202 of IC module 108-IC-1 will stay at the same or similar charge level as the energy source 202' in the second IC module 108-IC-2. As the currents in each phase change polarity, each energy source 202 can potentially be continuously charged by current incoming from one or more of the phases operating with a negative polarity at that time. In configurations with multiple IC modules, the energy sources 202 of each IC module 108 preferably have the same capacity, although that is not required, and in some embodiments the IC modules can have different capacities. Similarly, the energy sources 202 of the IC modules can have the same capacity as the cascaded modules in each array, so that discharge rates are generally the same. But in other embodiments can have different capacities. Also, in other embodiments the energy sources of multiple IC modules 108-IC can be coupled in series instead of parallel.

Additional Example Embodiments of Inter-Phase Balancing with IC Modules

Figure 42A:
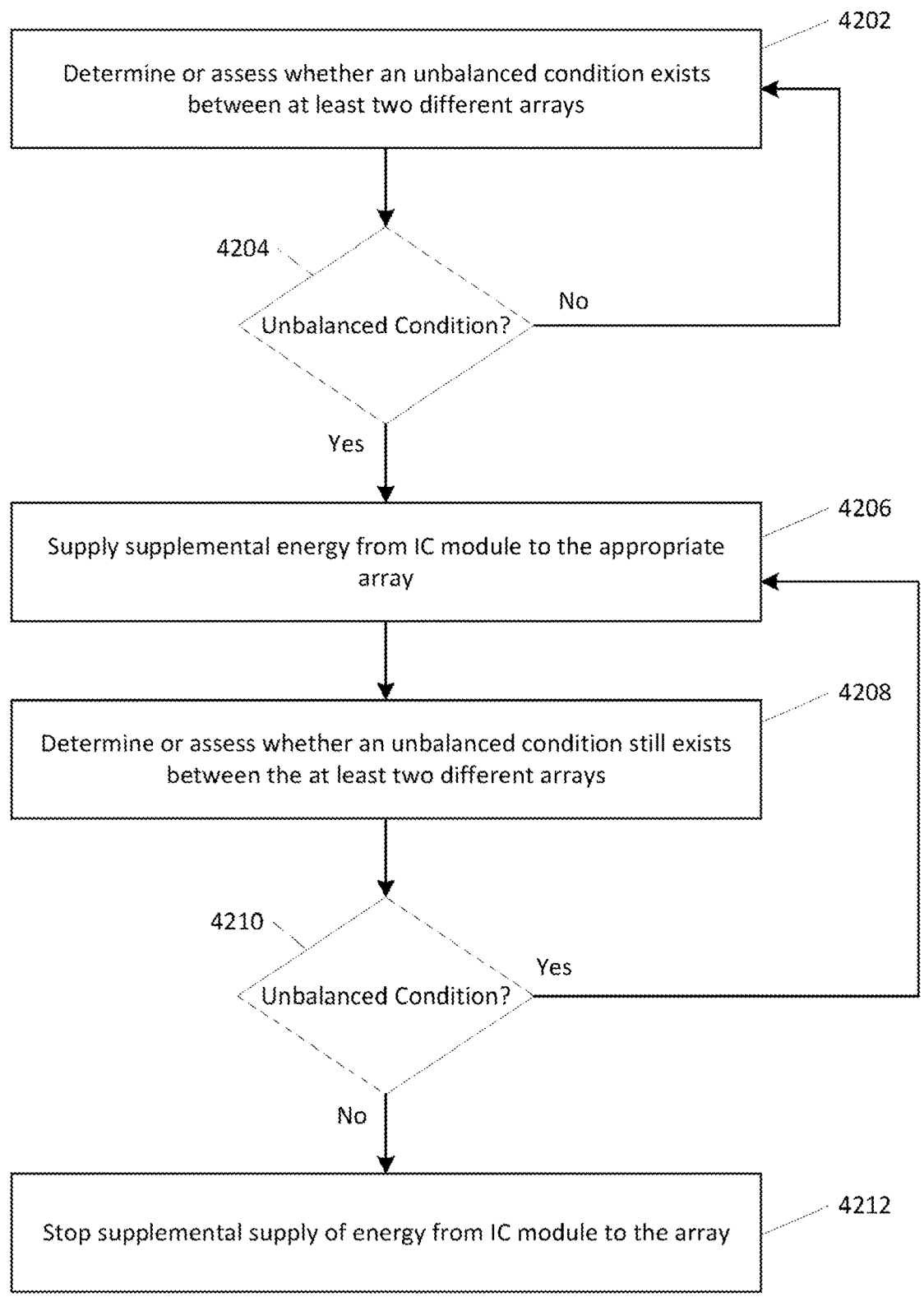
FIGS. 42A-42B are flow diagrams depicting example embodiments of methods of performing inter-phase balancing with an interconnection module.
Figure 42B:
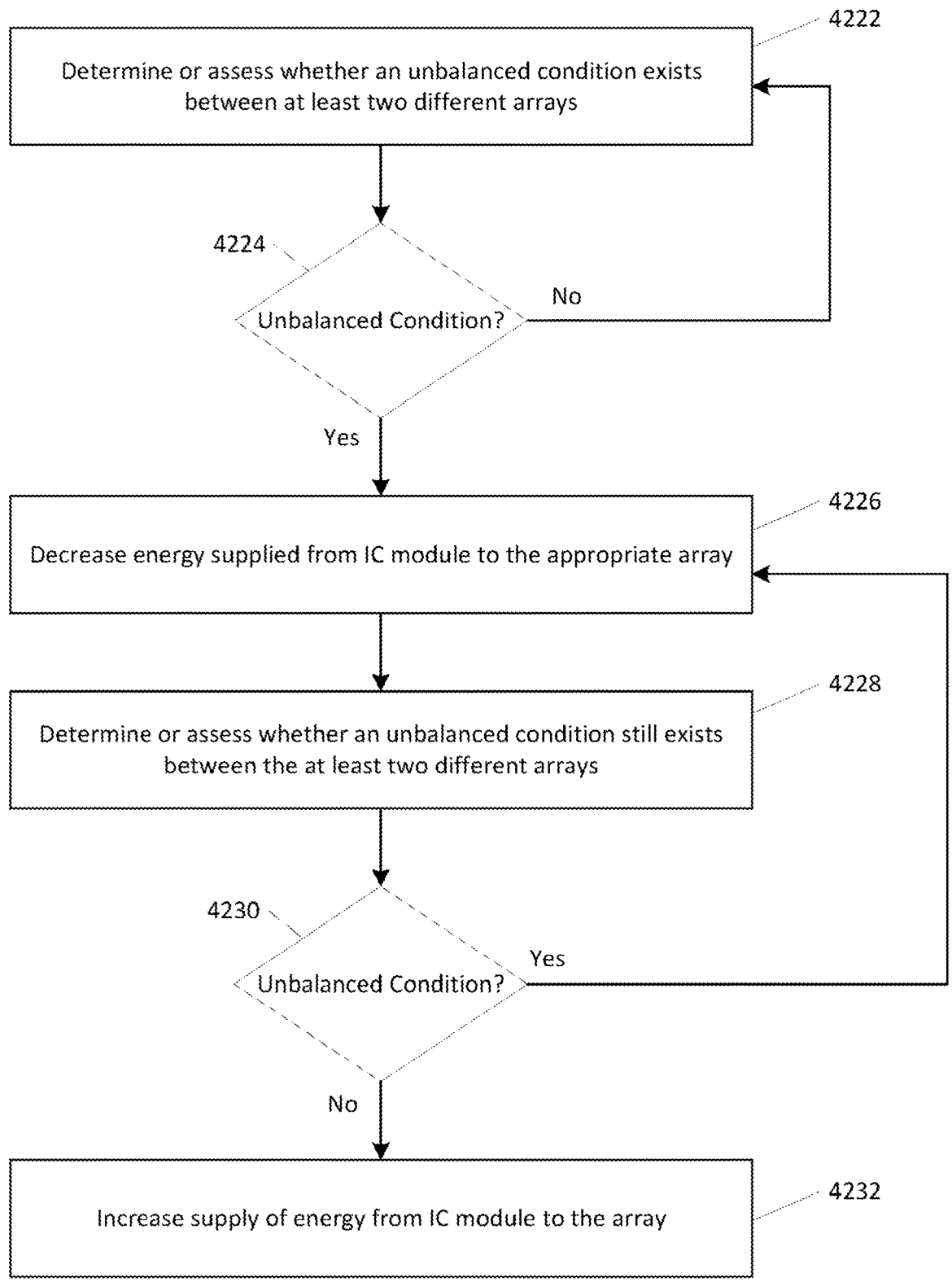

FIGS. 42A-42B are flow diagram depicting example embodiments of methods of performing inter-phase balancing in a system 100 having at least one IC module 108-IC. The system can have any configuration or topological arrangement of modules 108 described herein, or others, and can supply (or store) energy for or from any number of two or more phases. The arrays being balanced can be supplying the same load or motor, or can be in different systems or packs supplying different loads or motors (e.g., inter-system or inter-pack balancing). Because the switching circuitry of all modules tends to operate at a relatively high frequency in accordance with PWM and hysteresis techniques, the references to energy outputs by the modules (e.g., increasing, decreasing, or staying the same) is across time, e.g., on a time average or net basis. These references to energy outputs can also be expressed as cumulative or aggregate energy over time (e.g., over multiple consecutive periods of the output waveforms).

FIG. 42A shows a method 4200. At 4202, control circuitry 102 can determine or assess whether an unbalanced condition exists between at least two different arrays 1500 that is sufficient to invoke inter-phase balancing. This determination can be based on a broad range of one, two or more types of qualitative or quantitative information (e.g., measurements or characterizations) communicated to the control circuitry (e.g., collected by LCDs and communicated to the MCD). The following paragraphs describe a few non-limiting examples of these various types applicable to all embodiments described herein.

The unbalanced condition can relate to energy or charge in the arrays, such as an SOC parameter (e.g., measurement) of or characterizing one array being less than, more than, or substantially different than the SOC value for at least one different array or the system as a whole. The SOC parameter can be, e.g., total SOC of all modules in an array, central tendency value (e.g., average or median) of SOC of all modules in an array, SOC of one or more modules in the array, a rate of change of SOC in one or more modules in the array, or others.

The unbalanced condition can relate to temperature in the arrays, such as a temperature parameter of or characterizing one array being less than, more than, or substantially different than the temperature parameter for at least one different array or the system as a whole. The temperature parameter can be, e.g., a central tendency value (e.g., average or median) of temperature of all modules in an array, temperature of one or more modules in the array, a rate of change of temperature in one or more modules in the array, or others.

The unbalanced condition can relate to capacity (Q) in the arrays, such as a capacity parameter of or characterizing one array being less than, more than, or substantially different than the Q parameter for at least one different array or the system as a whole. The Q parameter can be, e.g., a central tendency value (e.g., average or median) of Q of all modules in an array, Q of one or more modules in the array, a rate of change of Q in one or more modules in the array, or others.

The unbalanced condition can relate to State of Health (SOH) in the arrays, such as an SOH parameter of or characterizing one array being less than, more than, or substantially different than the SOH parameter for at least one different array or the system as a whole. The SOH parameter can be, e.g., a central tendency value (e.g., average or median) of SOH of all modules in an array, SOH of one or more modules in the array, a rate of change of SOH in one or more modules in the array, or others.

The unbalanced condition can relate to a voltage in the arrays, such an voltage parameter of or characterizing one array being less than, more than, or substantially different than the voltage parameter for at least one different array or the system as a whole. The voltage parameter can be, e.g., a central tendency value (e.g., average or median) of current voltage level of all modules in an array, current voltage of one or more modules in the array, a rate of change of voltage in one or more modules in the array, or others.

The unbalanced condition can relate to a current in the arrays, such as a current parameter of or characterizing one array being less than, more than, or substantially different than the current parameter for at least one different array or the system as a whole. The current parameter can be, e.g., a central tendency value (e.g., average or median) of a present current level of all modules in an array, present current of one or more modules in the array, a rate of change of current in one or more modules in the array, or others.

The unbalanced condition can also be a fault or degradation condition that limits or prevents operation or performance of a module in an array, as such a fault or degradation can lead to an unbalanced condition across all types of measurements and characterizations.

The determination or assessment of whether two arrays are in an unbalanced condition can be relative as described above. The relative difference can be characterized in terms of a comparative fraction or percentile, or in terms of a standardized unit (e.g., Coulomb, degree of temperature, volt, amp, etc.). The system can be configured to invoke inter-phase balancing based on any desired amount or threshold of relative difference, where a smaller relative threshold (e.g., 1%) will invoke inter-phase balancing more frequently than a larger relative threshold (e.g., 5%). The determination or assessment of whether two arrays are in a sufficiently unbalanced condition can be based on an absolute or non-relative value, e.g., an unbalanced condition can be determined to exist if a first array has a value below an absolute threshold (maximum temperature, minimum SOC, etc.), regardless of what value(s) the other array(s) have. The determination of whether two arrays are in an unbalanced condition can be based on both relative and absolute factors, e.g., a temperature of a first array may exceed a relative threshold difference (e.g., 3 degrees Celsius (C) relative difference) as compared to a second array, but inter-phase balancing will not be performed until both arrays exceed a minimum absolute temperature to commence inter-phase balancing (e.g., 12 degrees C.).

Referring back to FIG. 42A, if the control circuitry determines that the unbalanced condition requirement is met, then method 4200 proceeds to step 4206 (as indicated by 4204). If the requirement is not met, then method 4200 reverts to step 4202. This reversion loop can continue indefinitely while system 100 is operating to continuously or repeatedly monitor for occurrence of the unbalanced condition.

At step 4206, the control circuitry causes supplemental net energy to be supplied from an energy source of the IC module 108-IC to the appropriate array 1500 of modules 108-1 through 108-N. The appropriate array is the array requiring additional energy to counteract the unbalanced condition. This step can, in some embodiments, include the control circuitry causing a reduction in energy supplied from one or more of the cascaded array of modules 108-1 through 108-N, where the reduction is equivalent to the supplemented energy added by the IC module 108-IC, thus allowing system 100 to meet the load requirements. The control circuitry can determine or estimate the amount of energy output adjustments required to modules 108-1 through 108-N and module 108-IC to cause the arrays to begin converging back to a balanced condition. The amount of supplemental energy can be an incremental amount above the amount (zero or non-zero) supplied by IC module 108-IC in the balanced operating state occurring prior to step 4206. Referring back to the example described with respect to FIGS. 41A-41B where N=4, in a sample case where array 1500-A requires supplementation by IC module 108-IC, then MCD 112 can determine an amount by which to decrease the modulation index for all of the modules 108-1 through 108-4 of array 1500-A and an amount by which to increase the modulation index for switch section 134-1, to meet the load requirements and to cause the arrays to converge towards a balanced condition over time. These modulation indexes can be communicated to LCD 114, which can then modulate VrnA for all of modules 108-1 through 108-4 and for switch section 134-1, and use the modulated waveforms to generate the control signals 136 for each.

After adjusting the relative energy outputs at 4206, control circuitry can again determine or assess whether the unbalanced condition persists at 4208. If the condition persists, then the method can revert to step 4206 and the supplemental energy can again be supplied by IC module 108-IC as described above (as indicated by 4210). If the unbalanced condition requirement is not met, then method 4200 can proceed to step 4212 where the supplemental supply of energy from IC module 108-IC can be stopped. This can include a reversion to modulation indexes (for IC module 108-IC and modules 108-1 through 108-4 of 1500-A) that were in use prior to entering the unbalanced condition, e.g., a reversion to modulation indexes for the balanced condition. Alternatively, this can include a reduction in modulation index for switch section 134-1 and an increase in the modulation indexes for cascaded modules 108-1 through 108-N, to values not necessarily the same as those in use in the prior balanced operation.

FIG. 42B is a flow diagram depicting another example embodiment of a method 4220 of inter-phase balancing in a system with at least one IC module 108-IC. Method 4220 is similar to method 4200 except inter-phase balancing is performed by decreasing the energy supplied by the IC module 108-IC to an array. In this example embodiment, IC module 108-IC is contributing energy or power to each array 1500 during a balanced condition. Steps 4222 and 4224 are similar to steps 4202 and 4204 of method 4200. At 4222, control circuitry 102 can determine or assess whether an unbalanced condition exists between at least two different arrays 1500 that is sufficient to invoke inter-phase balancing. If the unbalanced condition requirement is met, then method 4220 proceeds to step 4226 (as indicated by 4224). If the requirement is not met, then method 4220 reverts to step 4222. This reversion loop can continue indefinitely while system 100 is operating to continuously or repeatedly monitor for occurrence of the unbalanced condition.

Instead of using IC module 108-IC to increase energy output to an array (e.g., having a lower overall SOC), at step 4226, the control circuitry causes energy output from IC module 108-IC to the array having the greater operating margin (e.g., having a higher overall SOC) to be decreased. This step can include the control circuitry causing an increase in the energy supplied from one or more of the cascaded array of modules 108-1 through 108-N in the array with the greater margin, where the increase is equivalent to the decremented energy supplied by the IC module 108-IC to that array, thus allowing system 100 to meet the load requirements. The control circuitry can determine or estimate the amount of energy output adjustments required to the adjusted modules 108-1 through 108-N and module 108-IC to cause the arrays to begin converging back to a balanced condition. Referring back to the example described with respect to FIGS. 41A-41B where N=4, in a sample case where array 1500-A has a relatively greater overall SOC than array 1500-B and array 1500-C, then MCD 112 can determine an amount by which to increase the modulation index for all of the modules 108-1 through 108-4 of array 1500-A and an amount by which to decrease the modulation index for switch section 134-1 supplying array 1500-A, to meet the load requirements and to cause arrays 1500-A to converge towards a balanced condition over time with arrays 1500-B and 1500-C. These modulation indexes can be communicated to LCD 114, which can then modulate VrnA for all of modules 108-1 through 108-4 and for switch section 134-1, and use the modulated waveforms to generate the control signals 136 for each.

After adjusting the relative energy outputs at 4226, control circuitry can again determine or assess whether the unbalanced condition persists at 4228. If the condition persists, then the method can revert to step 4226 as described above (as indicated by 4230). If the unbalanced condition requirement is not met, then method 4200 can proceed to step 4232 where the reduction in supply of energy from IC module 108-IC can be stopped. This can include a reversion to modulation indexes (for IC module 108-IC and modules 108-1 through 108-4) that were in use prior to entering the unbalanced condition, e.g., a reversion to modulation indexes for the balanced condition. Alternatively, this can include an increase in modulation index for the switch section 134-1 and an decrease in the modulation indexes for cascaded modules 108-1 through 108-N of array 1500-A, to values not necessarily the same as those in use in the prior balanced operation.

The embodiments described with respect to FIGS. 42A and 42B can also be combined to compensate for any of the unbalanced conditions described herein. For example, in a case where array 1500-A has an overall lower SOC than array 1500-B, then the energy or power supplied by an IC module for array 1500-A can be increased and the energy or power output of one or more cascaded modules 108 of that array 1500-A can be correspondingly decreased. Concurrently, the energy or power supplied by an IC module for array 1500-B can be decreased and the energy or power output of one or more cascaded modules 108 of that array 1500-B can be correspondingly increased.

The interconnection of arrays 1500 through one or more IC modules 108-IC enables the effective and fast exchange of energy between arrays 1500 of multiple phases. For example, current passing into system 100 from one of nodes A, B, or C can be used to charge energy sources within the one more modules 108-IC, while those energy sources can be used for selective discharge of current to the one or more nodes A, B, and C.

Example Embodiments Related to Layouts and Housings

Figure 43A:
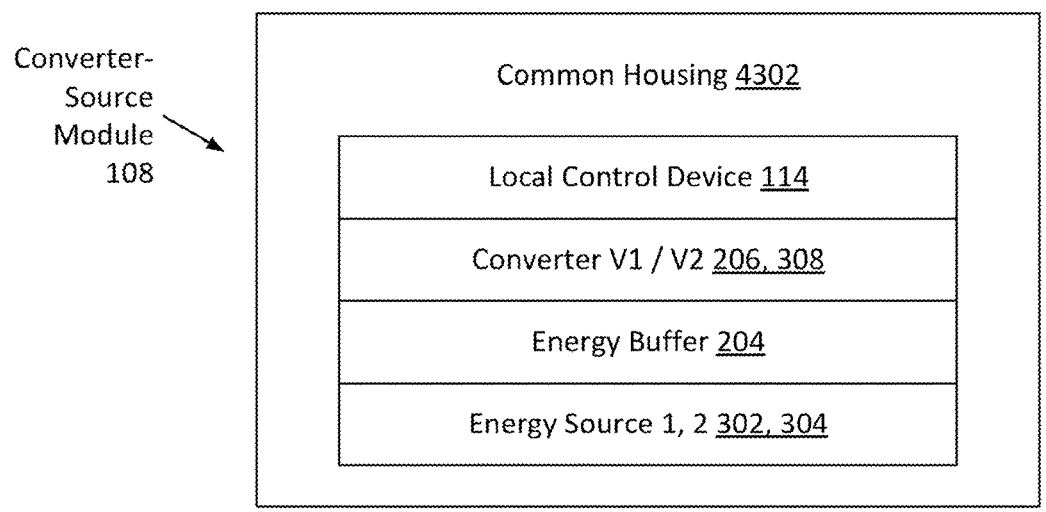
FIGS. 43A-43C are block diagrams depicting example embodiments of a converter-source module.

In many of the embodiments herein, the ConSource module is shown or described as being separate from the LCD. However, in any and all embodiments described herein, the ConSource module can be configured such that the LCD is a component thereof. For example, FIG. 43A is a block diagram depicting an example embodiment of a converter-source module 108 (which can also be referred to as a ConSource module V1, V2, or V3). In this embodiment, module 108 has a common housing or physical encasement 4302 that holds the LCD 114 for module 108, as well as the Converter V1 or V2 206, 308, the Energy Buffer 204 and Energy Source 1 202 (and optionally Energy Source 2 304 if present). Thus, in this embodiment module 108 is provided or manufactured as an integrated or unitary device or sub-system.

Figure 43B:
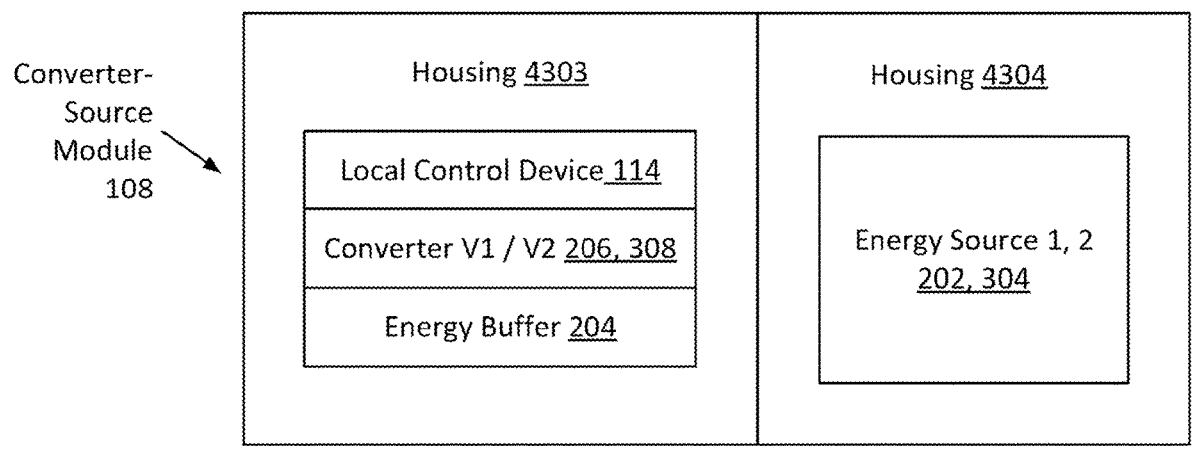

FIG. 43B is a block diagram depicting another example embodiment of a converter-source module 108. In this embodiment, module 108 has a housing or physical encasement 4303 that holds the LCD for module 108, as well as the Converter V1 or V2 206, 308, and the Energy Buffer 204. Energy Source 1 202 (and optionally Energy Source 2 304 if present) is provided in a separate housing 4304. Housings 4303 and 4304 can be physically joined, secured, or connected together prior to installation in system 100, or can be separate entities electrically connected together. Housings 4303, 4304 can have ports or other access to accommodate electrical connections between the various devices 114, 206, 308, 202, etc.

Figure 43C:
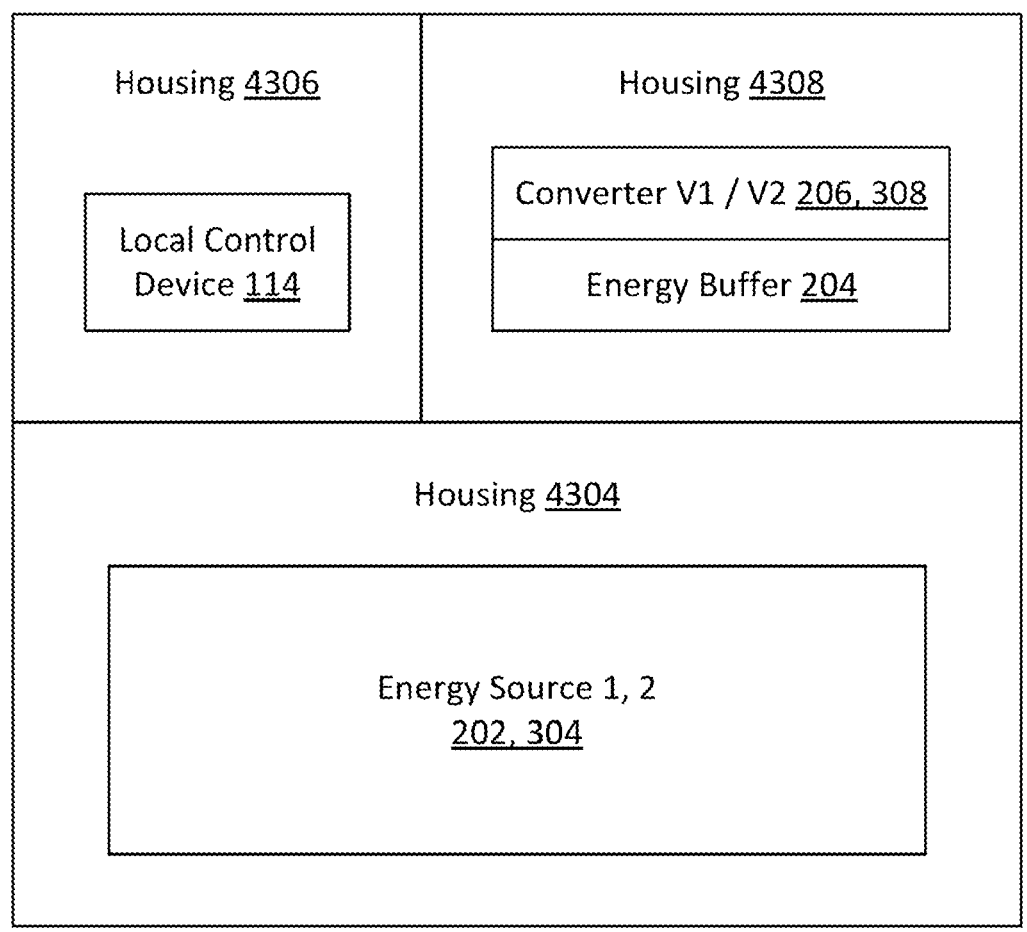

FIG. 43C is a block diagram depicting another example embodiment of a converter-source module 108. In this embodiment, module 108 has a first housing or physical encasement 4306 that holds LCD 114 for module 108 and a second housing or physical encasement 4308 that holds Converter V1 or V2 206, 308, and the Energy Buffer 204. Energy Source 1 202 (and optionally Energy Source 2 304 if present) is provided in a separate housing 4304. Housings 4306, 4308, and 4304 can be physically joined, secured, or connected together prior to installation in system 100, or can be separate entities electrically connected together. All of the housings 4306, 4308, and 4304 can have ports or other access to accommodate electrical connections between the various devices 114, 206, 308, 202, etc.

Figure 44A:
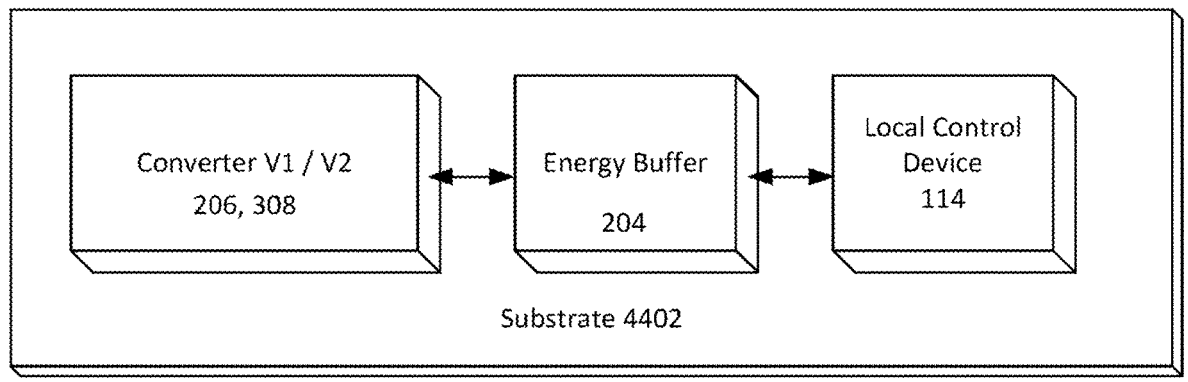
FIGS. 44A and 44B are schematic diagrams depicting example embodiments of a components of a converter-source module mounted on one or more substrates.

In any and all embodiments described herein, the various circuitry components can be integrated on or more substrates to reduce the form factor. For example, the LCD can be part of a ConSource module as described with respect to FIGS. 43A-43C. FIG. 44A is a schematic view depicting an example embodiment where the LCD 114, converter V1 or V2 206, 308, and Energy Buffer 204 are each mounted or secured to a single common substrate 4402, which can be a single printed circuit board (PCB). These components can be electrically coupled with substrate 4402 and each other to permit the exchanging of signals or data therebetween. Other passive or active componentry can likewise be mounted or secured to substrate 4402.

Figure 44B:
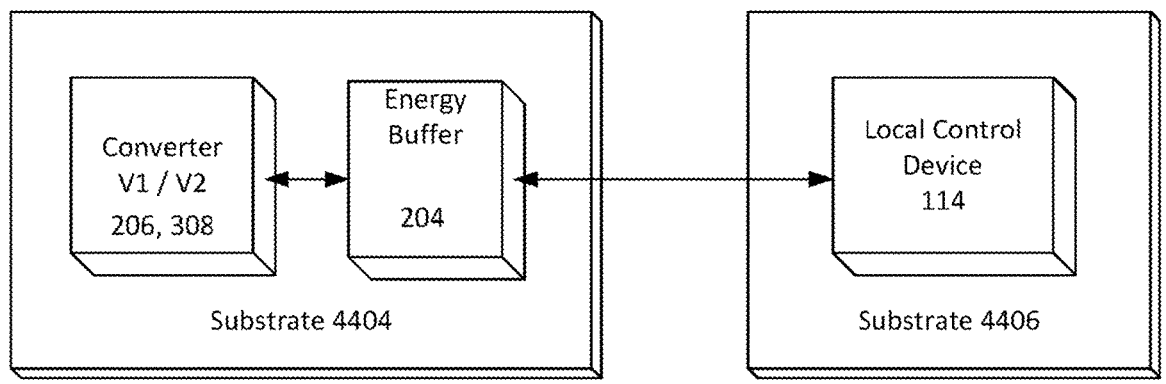

FIG. 44B is a schematic view depicting an example embodiment where the converter V1 or V2 206, 308 and Energy Buffer 204 are each mounted or secured to a single common substrate 4404, which can be a single printed circuit board (PCB). These components can be electrically coupled with substrate 4404 and each other to permit the exchanging of signals or data therebetween. The LCD 114 is mounted or secured to a different substrate 4406, which can also be a single PCB. Other passive or active componentry can likewise be mounted or secured to substrates 4404 and 4406. Communication between the LCD and the components on substrate 4404 can occur over one or more buses, wires, or fiber optics.

In the embodiments described herein, intra-phase balancing can be achieved by the one or more intra-phase balancing controllers, and inter-phase balancing can be achieved by one or more inter-phase balancing controllers. These intra-phase balancing controllers and inter-phase balancing controllers can be implemented in hardware, software, or a combination thereof. These intra-phase balancing controllers and inter-phase balancing controllers can be implemented wholly by a device, such as the master control device. These intra-phase balancing controllers and inter-phase balancing controllers can be implemented in distributed fashion between multiple devices, such as the master control device and one or more local control devices.

System 100 can operate across a wide range of frequencies as may be required in various stationary and mobile applications. For example, the system AC output frequency in stationary applications will often be 60 Hz. In an embodiment where a MSOFET is used for each switch in circuitry 207 (FIG. 5A), the switching frequency of each MOSFET (Fsw) can be in a range of 1 Khz-2 kHz, or more. In an example where there are 8 modules in each phase array, then the resulting frequency of pulsations in the AC output voltage will be $2F_{SW}*N=16$ kHz-32 kHz, or more. The switching frequency of conventional systems, like IGBT based high power inverters, is often less 5 kHz. In mobile applications the system frequency will depend on the needs of the motor(s), which commonly range from 0 Hz to 2000 Hz, or more, for a sinusoidal output waveform. In an example embodiment where Fsw of the switches of circuitry 207 is 5 Khz, then the switching frequency of an example system 100 (equivalent output pulsations) with five modules in series would be 2*5 kHz*5=50 kHz. This is compared to a conventional power inverter that has a switching frequency is less than 20 kHz. These examples merely illustrate the enhanced performance of system 100 over conventional systems, and are in no way intended to be limiting.

In all of the embodiments described herein, the primary energy source of each module of a particular system can have the same voltage (either standard operating voltage or nominal voltage). Such a configuration simplifies management and construction of the system. The primary and second energy sources can also have the same voltage (standard or nominal). Other configurations can be implemented, such as those where primary energy sources of different modules of the same system have different voltages (standard or nominal), and those where the primary and secondary energy sources of a module have different voltages (standard or nominal). Still other configurations can be implemented, where primary energy sources of modules of a system have primary energy source batteries that are different chemistries, or where modules of the system have a primary energy source battery of a first chemistry, and a secondary energy source battery of a second chemistry. The modules that differ from each other can be based on placement in the system (e.g., modules within a phase array are different than the IC module(s)).

In FIGS. 1A-8F, 11, 13, 15-30, 32, 41A-41F, and 43A-44B, various constituents of the figures (e.g., elements, components, devices, systems, and/or functional blocks) are depicted as being coupled with or connected to one or more other constituents (e.g., elements, components, devices, systems, and/or functional blocks). These constituents are often shown as being coupled or connected without the presence of an intervening entity, such as in a direct coupling or connection. Those of ordinary skill in the art will readily recognize, in light of the present description, that these couplings or connections can be direct (without one or more intervening components) or indirect (with one or more intervening components not shown). Thus, this paragraph serves as antecedent support for all couplings or connections being direct couplings connections or indirect couplings or connections.

A detailed discussion regarding systems (e.g., an ACi-battery pack), devices, and methods that may be used in conjunction with the systems, devices, and methods described herein is provided in International Publication No. WO 2019/183553, filed Mar. 22, 2019, entitled Systems And Methods For Power Management And Control, which is incorporated by reference herein for all purposes as if set forth in full.

The embodiments described herein, when used as a battery pack, e.g., in the automotive industry, permit the elimination of the conventional Battery Management System as a sub-system accompanying each battery module. The functionality typically performed by the Battery Management System is subsumed or replaced by the different and in many ways greater functionality of the system embodiments described herein.

A person of ordinary skill in the art would understand that the a "module" as that term is used herein, refers to a device, assembly, or sub-system within system 100, and that system 100 does not have to be configured to permit each individual module to be physically removable and replaceable with respect to the other modules. For example, system 100 may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

The example embodiments described herein can be used with one or more cooling systems to dissipate heat from any and all components of the system (e.g., switch circuitry, energy source, energy buffer, control circuitry, etc.). The cooling systems can utilize a cooling medium such as a gas, liquid, or solid. The cooling systems can utilize one or more piezo cooling elements.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device is configured to generate multiple switching signals for the multiple switches.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the first energy source provides the operating power for the local control device.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device is configured to detect a fault in the converter-source module and generate a fault signal. In these embodiments, the fault signal is indicative of an actual fault or a potential fault. In many of these embodiments, the module-based energy system further includes a master control device communicatively coupled to the local control device, where the local control device is configured to output the fault signal to the master control device.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, energy buffer, and converter are implemented together on a single printed circuit board.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, energy buffer, and converter are housed within a common housing that does not house the first energy source.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, first energy source, energy buffer, and converter are housed within a common housing that does not house another converter-source module.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the module-based energy system further includes a local control device communicatively coupled with the converter-source module, where the local control device, energy buffer, and converter are housed within a common housing that does not house the first energy source.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module, and where the energy buffer and converter are implemented together on a single printed circuit board.

In many embodiments, a module-based energy system includes a converter-source module. In these embodiments, the converter-source module includes a first energy source including a fuel cell, an energy buffer coupled with the first energy source, and a converter coupled with the first energy source and the energy buffer, where the converter includes multiple switches configured to select an output voltage of the module.

In many embodiments, a module-based energy system includes a converter-source module. In these embodiments, the converter-source module includes a first energy source, an energy buffer coupled with the first energy source, and a converter coupled with the first energy source and the energy buffer, where the energy buffer includes a Z-source network including two inductors and two capacitors, or a quasi Z-source network including two inductors, two capacitors and a diode. In these embodiments, the converter-source module further includes a converter coupled with the first energy source and the energy buffer, where the converter includes multiple switches configured to select an output voltage of the module.

In many embodiments, a module-based energy system includes a converter-source module. In these embodiments, the converter-source module includes a first energy source, an energy buffer coupled with the first energy source, a second energy source, and a converter including a first input, a second input, and a third input, where the first and third inputs are coupled with the first energy source and the energy buffer, where the second and third inputs are coupled with the second energy source, where the converter further includes multiple switches configured to select an output voltage of the module, and where both the first and second energy sources each include a battery or both the first and second energy sources each do not include a battery.

In many of these embodiments, the first and second energy sources each include a capacitor or a fuel cell. In many of these embodiments, the converter includes a first switch, an inductor, and a second switch, where the first switch is coupled between the first input and a first node, the inductor is coupled between the second input and the first node, and the second switch is coupled between the third input and the first node. In many of these embodiments, the multiple switches include a third switch, a fourth switch, a fifth switch, and a sixth switch. In many of these embodiments, both the first and second energy sources each include a battery, where the second energy source further includes a first capacitor in parallel with the battery. In many of these embodiments, both the first and second energy sources each include a battery, where the second energy source further includes a first capacitor in parallel with the battery and a second capacitor in parallel with the battery.

In many embodiments, a module-based energy system includes a converter-source module. In these embodiments, the converter-source module includes a first energy source, an energy buffer coupled with the first energy source, and a converter coupled with the first energy source and the energy buffer, where the converter includes multiple switches configured to select an output voltage of the module. In these embodiments, the converter-source module further includes a first output port for connection to a primary load or another converter-source module and a second output port for connection to an auxiliary load.

In many of these embodiments, the auxiliary load is a first auxiliary load and the converter-source module includes a third output port for connection to a second auxiliary load. In many of these embodiments, the first output port is coupled with a primary load or another converter-source module, the second output port is coupled with the first auxiliary load, and the third output port is coupled with the second auxiliary load. In many of these embodiments, the converter includes a first input, a second input, and a third input, where the first and third inputs are coupled with the first energy source, the energy buffer, and the second output port, and where the second and third inputs are coupled with the third output port. In many of these embodiments, the converter includes a first switch, an inductor, and a second switch, where the first switch is coupled between the first input and a first node, the inductor is coupled between the second input and the first node, and the second switch is coupled between the third input and the first node. In many of these embodiments, the multiple switches include a third switch, a fourth switch, a fifth switch, and a sixth switch. In many of these embodiments, third switch, fourth switch, fifth switch, and sixth switch are coupled together as an H-bridge. In many of these embodiments, the first output port includes a first output and a second output, where the third switch is coupled between the first input and the first output, the fourth switch is coupled between the third input and the first output, the fifth switch is coupled between the first input and the second output, and the sixth switch is coupled between the third input and the second output.

In many of the aforementioned embodiments, the module-based energy system further includes multiple converter-source modules coupled with the converter-source module in an array.

In many of these embodiments, each of the converter-source modules in the multiple converter-source modules includes a first energy source, an energy buffer coupled with the first energy source, and a converter including multiple switches configured to select an output voltage of that converter-source module. In many of these embodiments, the multiple switches select between a first voltage with a positive polarity, a zero or reference voltage, and the first voltage with a negative polarity. In many of these embodiments, the first voltage is a direct current (DC) voltage. In many of these embodiments, the array is configured to output an alternating current (AC) signal.

In many of the aforementioned embodiments, the converter includes one or more sensors configured to output one or more sensed signals indicative of a temperature of the first energy source, a state of charge of the first energy source, a voltage of the first energy source, or a current.

In many of the aforementioned embodiments, the module-based energy system further includes a local control device communicatively coupled with the converter-source module.

In many of these embodiments, the module-based energy system further includes multiple converter-source modules and multiple local control devices, where each local control device in the multiple local control devices is dedicated for use with one converter-source module of the multiple converter-source modules. In many of these embodiments, the converter-source module is a first converter-source module, where the system includes a second converter-source module, and where the local control device controls both the first and second converter-source modules.

In many of the aforementioned embodiments, the local control device includes processing circuitry and a memory communicatively coupled with the processing circuitry, where the memory includes instructions executable by the processing circuitry.

In many of the aforementioned embodiments, the local control device is configured to generate switching signals for the converter using pulse width modulation.

In many of these embodiments, the local control device is configured to modulate or scale a received reference signal and use the modulated reference signal for generation of the switching signals. In many of these embodiments, the local control device is configured to use a received modulation index to modulate the received reference signal.

In many of the aforementioned embodiments, the local control device is configured to receive one or more signals indicative of one or more of the following operating characteristics of the converter-source module or a component thereof: temperature, state of charge, capacity, state of health, voltage, or current.

In many of these embodiments, the local control device is configured to communicate, to a master control device, information indicative of one or more of the following operating characteristics of the converter-source module or a component thereof: temperature, state of charge, capacity, state of health, voltage, or current.

In many of the aforementioned embodiments, the local control device is powered only by the first energy source.

In many of the aforementioned embodiments, the local control device is powered by an energy source other than the first energy source.

In many of the aforementioned embodiments, the converter-source module includes a second energy source, where the local control device is configured to cause the converter-source module to actively filter a second order harmonic in an output current from the first energy source with current from the second energy source.

In many of these embodiments, the first energy source includes a battery and the second energy source includes a capacitor. In many of these embodiments, the capacitor of the second energy source is an ultra-capacitor or super-capacitor.

In many of the aforementioned embodiments, the converter-source module includes a second energy source, where the local control device is configured to control the converter to manage power transfer: from the first energy source to a cumulative load of converter-source modules, from the second energy source to the cumulative load of converter-source modules, and between the first energy source and second energy source.

In many of these embodiments, power transfer between the first energy source and second energy source includes power transfer from the first energy source to the second energy source and power transfer from the second energy source to the first energy source. In many of these embodiments, the local control device is configured to control the converter to manage power transfer based, at least in part, on a power consumption of a first auxiliary load and a power consumption of a second auxiliary load. In many of these embodiments, the local control device includes a processor and memory, where the memory includes instructions that, when executed by the processing circuitry, cause the processing circuitry to manage power transfer: from the first energy source to a cumulative load of converter-source modules, from the second energy source to the cumulative load of converter-source modules, and between the first energy source and second energy source. In many of these embodiments, the local control device is configured to manage power transfer by generation of switching signals for the converter.

In many of the aforementioned embodiments, the module-based energy system further includes a master control device configured to manage one or more operating parameters of the converter-source module relative to one or more operating parameters of other converter-source modules within the system.

In many of the aforementioned embodiments, the module-based energy system further includes a master control device communicatively coupled with the local control device.

In many of these embodiments, the master control device is communicatively coupled with the local control device over a serial data cable. In many of these embodiments, the master control device includes processing circuitry and a memory communicatively coupled with the processing circuitry, where the memory includes instructions executable by the processing circuitry. In many of these embodiments, the module-based energy system further includes multiple local control devices coupled with multiple converter-source modules, where the master control device is communicatively coupled with each of the local control devices of the multiple local control devices. In many of these embodiments, the master control device is configured to read data indicative of one or more operating characteristics of the multiple converter-source modules, and to determine a contribution for at least one converter-source module of the multiple converter-source modules. In many of these embodiments, the master control device is configured to determine a contribution for each of the multiple converter-source modules. In many of these embodiments, the master control device is configured to output a modulation or scaling index for each of the multiple converter-source modules, where the modulation or scaling index is indicative of power flow contribution. In many of these embodiments, the master control device is configured to output a reference signal to each of the local control devices, where each of the local control devices is configured to modulate or scale the reference signal with a received modulation or scaling index, and generate switching signals based on the modulated or scaled reference signal.

In many of the aforementioned embodiments, the module-based energy system is configured for operation in a mobile entity.

In many of these embodiments, the mobile entity is one of: a car, a bus, a truck, a motorcycle, a scooter, an industrial vehicle, a mining vehicle, a flying vehicle, a maritime vessel, a locomotive, a train or rail-based vehicle, or a military vehicle.

In many of the aforementioned embodiments, the module-based energy system is configured for operation as a stationary energy system.

In many of these embodiments, the stationary energy system is one of: a residential storage system, an industrial storage system, a commercial storage system, a data center storage system, a grid, a micro-grid, or a charging station.

In many of the aforementioned embodiments, the module-based energy system is configured as a battery pack for an electric vehicle.

In many embodiments, a module-based energy system includes multiple converter-source modules, each including a first energy source, an energy buffer, and a converter electrically coupled together, where the multiple converter-source modules are electrically coupled together in an array.

In these embodiments, the module-based energy system further includes control circuitry communicatively coupled with the multiple converter-source modules, where the control circuitry is configured to monitor at least one operating characteristic of each of the multiple converter-source modules and, based on the monitored at least one operating characteristic, independently control each converter-source module within the multiple converter-source modules for performance optimization of the array.

In many of these embodiments, the at least one operating characteristic is selected from: state of charge, temperature, state of health, capacity, fault presence, voltage, or current. In many of these embodiments temperature is at least one of: a temperature of the first energy source or a component thereof, a temperature of the energy buffer or a component thereof, a temperature of the converter or a component thereof. In many of these embodiments, capacity is at least one of: capacity of the first energy source or capacity of one or more components of the first energy source. In many of these embodiments, fault presence is at least one of: an indication of the presence of a measured fault, an indication of the presence of a potential fault; an indication of the presence of an alarm condition, or an indication of the presence of a warning condition. In many of these embodiments, voltage is at least one of: a voltage of the first energy source or a component thereof, a voltage of the energy buffer or a component thereof, a voltage of the converter or a component thereof. In many of these embodiments, current is at least once of: a current of the first energy source or a component thereof, a current of the energy buffer or a component thereof, a current of the converter or a component thereof. In many of these embodiments, each converter-source module includes at least one sensor to sense the at least one operating characteristic. In many of these embodiments, the control circuitry is configured to monitor all of the following operating characteristics: state of charge, temperature, state of health, capacity, fault presence, voltage, and current. In many of these embodiments, the control circuitry is configured to independently control discharging or charging of each converter-source module by generation of multiple switching signals and output of the multiple switching signals to the converter of each converter-source module. In many of these embodiments, the control circuitry is configured to generate the multiple switching signals with pulse width modulation or hysteresis.

In many of these embodiments, at least one converter-source module of the multiple converter-source modules is a converter-source module as described in many of the aforementioned embodiments.

In many of these embodiments, every converter-source module of the multiple converter-source modules is a converter-source module as described in many of the aforementioned embodiments.

In many of these embodiments, the control circuitry is configured to independently control discharging or charging of each converter-source module within the multiple converter-source modules for performance optimization of the array. In many of these embodiments, the control circuitry is configured to independently control discharging or charging of each converter-source module based on a power requirement of a load coupled with the array. In many of these embodiments, the load is a motor, a commercial structure, a residential structure, an industrial structure, or an energy grid. In many of these embodiments, the control circuitry includes multiple local control devices and a master control device communicatively coupled with the multiple local control devices.

In many embodiments, a module-based energy system includes an array of N converter-source modules, where N is 2 or greater, where each of the N converter-source modules is connected in series, where each of the N converter-source modules is configured according to any of the aforementioned embodiments, and where the array includes a first output terminal of a first converter-source module and a second output terminal of an Nth converter-source module.

In many of these embodiments, the module-based energy system further includes multiple local control devices, each communicatively coupled with one or more of the N converter-source modules. In many of these embodiments, the module-based energy system further includes a master controller communicatively coupled with the multiple local control devices. In many of these embodiments, the module-based energy system further includes a load connected between the first and second output terminals. In many of these systems, the load is one of a DC load or a single-phase AC load.

In many embodiments, a module-based energy system includes M arrays of converter-source modules, where M is 2 or greater, where each of the M arrays includes N converter-source modules, where N is 2 or greater, where each of the N converter-source modules is connected in series in each of the M arrays, where each of the N converter-source modules is configured according to any of aforementioned embodiments, where each of the M arrays includes an individual output terminal of a first converter-source module, and where an Nth converter-source module of each of the M arrays is connected to a common output terminal.

In many of these embodiments, the module-based energy system further includes multiple local control devices, each communicatively coupled with one or more of the N converter-source modules of each of the M arrays. In many of these embodiments, the module-based energy system further includes a master controller communicatively coupled with the multiple local control devices. In many of these embodiments, the M arrays includes first and second arrays. In many of these embodiments, the module-based energy system further includes a load connected between the individual output terminals of the first and second arrays. In many of these embodiments, the common output terminal is coupled to a neutral of the load. In many of these embodiments, the module-based energy system further includes a load connected between the common output terminal and a joint coupling of the individual output terminals of the first and second arrays. In many of these embodiments, the load is one of a DC load or a single-phase AC load. In many of these embodiments, the M arrays includes first, second and third arrays. In many of these embodiments, the module-based energy system further includes a three-phase load connected between the individual output terminals of the first, second and third arrays. In many of these embodiments, the common output terminal is coupled to a neutral of the load. In many of these embodiments, the module-based energy system further includes a DC or single phase AC load connected between the common output terminal and a joint coupling of the individual output terminals of the first, second and third arrays.

In many of these embodiments, the module-based energy system further includes multiple local control devices, each communicatively coupled with one or more of the N converter-source modules of the first, second, third, fourth, fifth, sixth, seventh, eighth, ninth, tenth, eleventh and twelfth arrays. In many of these embodiments, the module-based energy system further includes a master controller communicatively coupled with the multiple local control devices.

In many embodiments, a module-based energy system includes multiple connected converter-source modules and control circuitry, where the control circuitry is configured to adjust a contribution of one or more of the converter-source modules based on status information associated with one or more of the converter-source modules.

In many of these embodiments, the converter-source module includes a converter-source module according to many of the aforementioned embodiments.

In many of these embodiments, the converter-source module includes an energy source including at least one energy storage element, an energy buffer, and a converter. In many of these embodiments, the status information includes one or more of state of charge, state of health, temperature, capacity, current, or voltage of the converter-source module or a component thereof. In many of these embodiments, the master control device is configured to balance state of charge (SOC) of the multiple connected converter-source modules. In many of these embodiments, the control circuitry includes processing circuitry and at least one memory having instructions stored thereon that, when executed by the processing circuitry, cause the processing circuitry to cause adjustment of the contribution of one or more converter-source modules based on status information associated with one or more of the converter-source modules. In many of these embodiments, the processing circuitry and at least one memory are components of a master control device, a local control device, or distributed between a master control device and one or more local control devices.

In many of these embodiments, the control circuitry is configured to cause the contribution of a first converter-source module to be lowered with respect to one or more other converter-source modules based on status information of the first converter-source module and the one or more other converter-source modules. In many of these embodiments, the status information of the first converter-source module indicates at least one of the following as compared to status information of the one or more other converter-source modules: a relatively lower state of charge, a relatively lower state of health, a relatively lower capacity, a relatively lower voltage, a relatively lower current, a relatively higher temperature, or a fault.

In many of these embodiments, the control circuitry is configured to cause the contribution of a first converter-source module to be raised with respect to one or more other converter-source modules based on status information of the first converter-source module and the one or more other converter-source modules. In many of these embodiments, the status information of the first converter-source module indicates at least one of the following as compared to status information of the one or more other converter-source modules: a relatively higher state of charge, a relatively higher state of health, a relatively higher capacity, a relatively higher voltage, a relatively higher current, a relatively lower temperature, or absence of a fault.

In many of these embodiments, the contribution is an output power over time of the first converter-source module. In many of these embodiments, the control circuitry includes a master control device and multiple local control devices. In many of these embodiments, the master control device is configured to generate a multiple modulation indexes for the multiple converter-source modules, with one modulation index independently generated for each converter-source module of the multiple converter-source modules.

In many of these embodiments, the master control device includes an intra-phase balancing controller. In many of these embodiments, the intra-phase balancing controller is configured to generate a modulation index for each converter-source module. In many of these embodiments, a modulation index for a converter-source module is determined based on one or more of a peak voltage Vpk of a reference voltage Vr of the module-based energy system, state of charge of the converter-source module, temperature of the converter-source module, capacity of the converter-source module, current of the converter-source module, or voltage of the converter-source module. In many of these embodiments, the master control device further includes a peak detector for detecting a peak voltage Vpk of a reference voltage Vr of the module-based energy system. In many of these embodiments, the master control device is configured to generate a normalized reference waveform Vrn from a reference voltage Vr. In many of these embodiments, the master control device is configured to generate the normalized reference waveform Vrn from the reference voltage Vr by division of the reference voltage Vr by its peak voltage Vpk. In many of these embodiments, the master control device is configured to output a normalized reference waveform Vrn to each of the multiple local control devices. In many of these embodiments, each local control device of the multiple local control devices is configured to modulate the received normalized reference waveform Vrn by the received modulation index. In many of these embodiments, each local control device of the multiple local control devices is configured to generate switching signals for a converter-source module based on the modulated reference waveform. In many of these embodiments, each local control device of the multiple local control devices is configured to generate switching signals for a converter-source module based on a pulse width modulation technique implemented with the modulated reference waveform.

In many of these embodiments, the multiple modulation indexes is generated to ensure a sum of generated voltages from the multiple converter-source modules does not exceed a peak voltage Vpk. In many of these embodiments, the multiple modulation indexes Mi are generated to cause states of charge (SOC) of energy sources of the multiple converter-source modules to converge towards a balanced condition. In many of these embodiments, the multiple modulation indexes Mi are generated to cause states of health (SOH) of the multiple converter-source modules to converge towards a balanced condition. In many of these embodiments, the multiple modulation indexes Mi are generated to cause capacities of the multiple converter-source modules to converge towards a balanced condition. In many of these embodiments, the multiple modulation indexes Mi are generated to cause voltages of the multiple converter-source modules to converge towards a balanced condition. In many of these embodiments, the multiple modulation indexes Mi are generated to cause currents of the multiple converter-source modules to converge towards a balanced condition. In many of these embodiments, the multiple modulation indexes Mi are generated to cause temperatures of the multiple converter-source modules to converge towards a balanced condition. In many of these embodiments, the multiple modulation indexes Mi are generated to reduce the contribution of one or more converter-source modules having a fault condition as compared to one or more other converter source modules not having a fault condition.

In many of these embodiments, the control circuitry includes one or both of an inter-phase balancing controller or an intra-phase balancing controller. In many of these embodiments, the multiple converter-source modules is arranged in a multi-dimensional array. In many of these embodiments, the intra-phase balancing controller is configured to adjust a contribution of the multiple converter-source modules within a one-dimensional array of the multi-dimensional array. In many of these embodiments, the inter-phase balancing controller is configured to control one or more of neutral point shifting or contribution of converter-source modules that are common to each phase.

In many of the aforementioned embodiments, the module-based energy system is one of single phase or multi-phase. In many of these embodiments, the module-based energy system is a multi-phase module-based energy system outputting signals in three-phases, four-phases, five-phases, or six-phases.

In many of the aforementioned embodiments, the multiple converter-source modules are arranged in a multi-dimensional array.

In many of the aforementioned embodiments, the multiple converter-source modules are arranged in accordance with any of many of the aforementioned embodiments.

In many of the aforementioned embodiments, the module-based energy system is configured for operation in an electric or hybrid mobile vehicle. In many of these embodiments, the electric or hybrid mobile vehicle is one of: a car, a bus, a truck, a motorcycle, a scooter, an industrial vehicle, a mining vehicle, a flying vehicle, a maritime vessel, a locomotive or rail-based vehicle, or a military vehicle.

In many of the aforementioned embodiments, the module-based energy system is configured for operation as a stationary energy system. In many of these embodiments, the stationary energy system is one of: a residential system, an industrial system, a commercial system, a data center storage system, a grid, a micro-grid, or a charging station.

In many of the aforementioned embodiments, the module-based energy system is configured as a battery pack for an electric vehicle.

In many embodiments, a module-based energy system includes multiple connected converter-source modules and control circuitry, where the control circuitry is configured to adjust power supply to one or more of the converter-source modules based on status information associated with one or more of the converter-source modules. In many of these embodiments, each converter-source module includes a converter-source module according to many of the aforementioned embodiments.

In many of these embodiments, each converter-source module includes an energy source including at least one energy storage element, an energy buffer, and a converter. In many of these embodiments, the control circuitry is configured to independently determine the amount of charge each converter-source module with the system receives from a power supply external to the system. In many of these embodiments, the control circuitry is configured to independently determine the amount of charge each converter-source module with the system receives from a power supply external to the system based on status information associated with one or more of the converter-source modules or components thereof, where the status information includes one or more of: state of charge (SOC), state of health (SOH), capacity, temperature, voltage, current, presence of a fault, or absence of a fault. In many of these embodiments, the multiple converter-source modules are arranged in a multi-dimensional array. In many of these embodiments, the multiple converter-source modules is arranged in accordance with many of the aforementioned embodiments.

In many embodiments, a converter-source module includes an energy source including at least one energy storage element, an energy buffer, and a converter including multiple, the converter configured to generate an output voltage based on a combination of the multiple switches.

In many of these embodiments, an output of the energy source is couplable to an input terminal of the energy buffer. In many of these embodiments, an output of the energy buffer is couplable to an input terminal of the converter. In many of these embodiments, the energy storage element is one of an ultra-capacitor, a battery including at least one cell or multiple battery cells connected in series and/or in parallel, or a fuel-cell. In many of these embodiments, the energy buffer includes one or more of: electrolytic capacitors, film capacitors, a Z-source network including two inductors and two capacitors, or a Quasi Z-source network including two inductors, two capacitors and a diode. In many of these embodiments, each of the multiple switches includes at least one of a semiconductor MOSFET or a semiconductor IGBT. In many of these embodiments, the converter is configured to generate three different voltage outputs by different combinations of the multiple switches. In many of these embodiments, the energy source is configured to output a direct current voltage VDC, and the three different voltage outputs are +VDC, 0, and −VDC. In many of these embodiments, the converter-source module is configured to receive switching signals for the multiple switches from a local control device.

In many embodiments, an energy system includes at least two converter-source modules according to many of the aforementioned embodiments.

In many of these embodiments, the at least two converter-source modules are connected in one of a one-dimensional array or a multi-dimensional array. In many of these embodiments, a least two one-dimensional arrays are connected together at different rows and columns directly or via additional converter-source modules. In many of these embodiments, the energy system includes at least two local control devices, one local control device for each converter-source module. In many of these embodiments, each local control device manages energy from the energy source, protects the energy buffer, and controls the converter.

In many embodiments, a module-based energy system includes a local control device and a converter-source module connected to the local control device, where the converter-source module includes an energy source having a storage element, first and second outputs of the energy source being connected to first and second inputs of an energy buffer, first and second outputs of the energy buffer being connected to first and second inputs of a converter, the converter including at least four switches to generate three voltage levels including a first voltage level with a positive polarity, a zero or reference voltage level, and the first voltage level with a negative polarity, where the three voltage levels are generated by connection of the first voltage level between the first and second inputs of the converter to first and second outputs of the converter by different combinations of the at least four switches.

In many of these embodiments, the storage element includes one of an ultra-capacitor, a battery module including one or more connected battery cells, and a fuel-cell module. In many of these embodiments, the energy buffer includes one of an electrolytic and/or film capacitor, a Z-source network formed by two inductors and two electrolytic and/or film capacitors, and a Quasi Z-source network formed by two inductors, two electrolytic and/or film capacitors and a diode. In many of these embodiments, the switches are configured as semiconductor switches. In many of these embodiments, the energy source includes a primary energy source and a secondary energy source, where in the primary energy source includes a storage element including one of an ultra-capacitor, a battery module including one or more connected battery cells, and a fuel-cell module. In many of these embodiments, the first and second outputs of the primary energy source are coupled to first and second input terminals of an energy buffer, where the energy buffer includes one of an electrolytic and/or film capacitor, a Z-source network formed by two inductors and two electrolytic and/or film capacitors, and a Quasi Z-source network formed by two inductors, two electrolytic and/or film capacitors and a diode. In many of these embodiments, a second output of the energy buffer is connected to a second output of the secondary energy source, and where a first output of the secondary energy source is connected to the second input of the converter. In many of these embodiments, the secondary energy source includes a storage element including one of an electrolytic and/or film capacitor, an ultra-capacitor, a battery module including one or more connected battery cells, an electrolytic and/or film capacitor connected in parallel with an ultra-capacitor, an electrolytic and/or film capacitor connected in parallel with a battery module including one or more connected battery cells, an electrolytic and/or film capacitor connected in parallel with ultra-capacitor and battery module including one or more connected battery cells. In many of these embodiments, the converter includes six switches. In many of these embodiments, the converter-source module is configured to power first and second auxiliary loads.

In many of these embodiments, the system further includes a balancing controller. In many of these embodiments, the balancing controller is a single phase balancing controller. In many of these embodiments, the balancing controller includes a peak detector, a divider and an intra-phase balancing controller. In many of these embodiments, the system further includes multiple converter-source modules, and the balancing controller is configured to balance state of charge and temperature among the multiple converter-source modules of the system. In many of these embodiments, the balancing controller is a three phase balancing controller. In many of these embodiments, the balancing controller includes an interphase balancing controller and a multiple intra-phase controllers. In many of these embodiments, the system further includes multiple converter-source modules, and the balancing controller is configured to balance state of charge and temperature among the multiple converter-source modules of the system.

In many embodiments, a module-based energy system is provided, including a converter-source module, including: a first energy source; and a converter coupled with the first energy source, where the converter includes multiple switches configured to select an output voltage of the module.

In many embodiments, a method of supplying an output power from a module-based energy system is provided, the method including: receiving, by control circuitry of the system, status information from at least one of multiple converter-source modules of the system, where each converter-source module includes an energy source and a converter and where each converter-source module is configured to contribute power to an output power of the system; and controlling, by the control circuitry, a power contribution of at least one converter-source module of the multiple converter-source modules based on the status information.

In these embodiments, the control circuitry can include a master control device and multiple local control devices. The master control device can receive the status information from at least one local control device, and the method can further include outputting a reference waveform and a modulation index from the master control device to the at least one local control device. The method can further include: modulating, by the local control device, the reference waveform with the modulation index; and generating multiple switching signals for a converter of a converter-source module associated with the local control device based, at least in part, on the modulated reference waveform. The switching signals can be generated with pulse width modulation.

In these embodiments, controlling, by the control circuitry, the power contribution of the at least one converter-source module can include: generating and outputting multiple switching signals from the control circuitry to the converter of the at least one converter-source module, where the method further includes switching, by the converter, an output voltage of the at least one converter-source module.

In these embodiments, controlling, by the control circuitry, the power contribution of the at least one converter-source module can include: reducing the power contribution of the at least one converter-source module or raising the power contribution of the at least one converter-source module. The power contribution can be reduced or raised as compared to a preceding power contribution of the at least one converter-source module or as compared to the power contribution of one or more other converter-source modules.

In these embodiments, the control circuitry can control the power contribution of every converter-source module of the multiple converter-source modules.

In these embodiments, the control circuitry can control the power contribution according to a pulse width modulation or hysteresis technique.

In these embodiments, the control circuitry can repeatedly receive status information for every converter-source module, where the status information is specific to each individual converter-source module. The control circuitry can control every converter-source module based on the status information, where the control occurs in real time.

In many embodiments, a method of charging a module-based energy system is provided that includes: receiving, by control circuitry of the system, status information from at least one of multiple converter-source modules of the system, where each converter-source module includes an energy source and a converter and where each converter-source module is configured to be charged by a power supply; and controlling, by the control circuitry, a power consumption of at least one converter-source module of the multiple converter-source modules based on the status information.

In these embodiments, controlling, by the control circuitry, the power consumption of the at least one converter-source module can include: generating and outputting multiple switching signals from the control circuitry to the converter of the at least one converter-source module, and where the method can further include switching, by the converter, multiple switches such that the power consumption of at least one converter-source module is reduced or raised, optionally where the power consumption is reduced or raised as compared to a preceding power consumption of the at least one converter-source module or as compared to the power consumption of one or more other converter-source modules.

In many embodiments, a module-based energy system is provided, the system including: a first array of cascaded modules configured to output a first voltage waveform to a load; a second array of cascaded modules configured to output a second voltage waveform to the load, where the first and second voltage waveforms each have a different phase angle; and an interconnection module coupled to both the first array and the second array, where the interconnection module includes an energy source and switch circuitry, and where the interconnection module is configured to adjust the amount of energy supplied by the energy source to the first and/or second arrays.

In many embodiments, the first array and second array are positioned electrically between the load and the interconnection module.

In some embodiments, the system further includes control circuitry configured to control the switch circuitry, where the energy source has a positive node and a negative node, and where the switch circuitry of the interconnection module is controllable to selectively couple the first and/or second arrays to the first and/or second nodes of the energy source. The control circuitry can be configured to control the switch circuitry such that the energy source discharges relatively more energy to the first array than to the second array under an unbalanced condition between the first and second arrays. The unbalanced condition can relate to state of charge, temperature, capacity, state of health, voltage, and/or current. The control circuitry can be configured to control the switch circuitry such that the energy source discharges relatively more energy to the first array for supply to the load from the first array.

In some embodiments, the unbalanced condition is that the first array has a relatively lower overall energy level than the second array.

In some embodiments, the control circuitry is configured to receive state of charge information from each cascaded module of the first and second arrays, determine if the first array or the second array has a relatively lower overall state of charge, and cause the energy source of the interconnection module to discharge more energy to the one of the first and second arrays having the relatively lower state of charge.

In some embodiments, the unbalanced condition is that the first array has a relatively higher temperature than the second array.

In some embodiments, the control circuitry is configured to receive temperature information from each cascaded module of the first and second arrays, determine if the first array or the second array has a relatively higher temperature, and cause the energy source of the interconnection module to discharge more energy to the one of the first and second arrays having the relatively higher temperature.

In some embodiments, the control circuitry is configured to control a balance of inter-phase energy between the first and second arrays with the energy source of the interconnection module.

In some embodiments, the control circuitry is configured to control the balance of inter-phase energy between the first and second arrays with a shift to a neutral point of the first and second arrays.

In some embodiments, the control circuitry is configured to control the switch circuitry according to a pulse width modulation or hysteresis technique.

In some embodiments, the system is configured to generate the first and second voltage waveforms according to a pulse width modulation technique. The control circuitry can be configured to control the switch circuitry, under a balanced inter-phase condition, such that the interconnection module supplies energy for both the first and second arrays. The energy supplied to the first array can be the same as that to the second array. The control circuitry can be configured to modulate the frequency of operation of the switch circuitry to adjust the energy supplied by the energy source to the first array relative to that to the second array. The control circuitry can be configured to cause relatively more energy to be output by the interconnection module to the first array under an unbalanced inter-phase condition as compared to a balanced inter-phase condition. The control circuitry can be configured to cause relatively less energy to be output by one or more modules of the first array under the unbalanced inter-phase condition as compared to a balanced inter-phase condition. The control circuitry can be configured to maintain the same energy output by one or more modules of the second array and by the interconnection module to the second array under the unbalanced inter-phase condition as compared to a balanced inter-phase condition. The control circuitry can be configured to cause relatively less energy to be output by the interconnection module to the second array and to cause relatively more energy to be output by one or more modules of the second array under an unbalanced inter-phase condition as compared to a balanced inter-phase condition.

The control circuitry can be configured to cause relatively less energy to be output by the interconnection module to the first array under an unbalanced inter-phase condition as compared to a balanced inter-phase condition. The control circuitry can be configured to cause relatively more energy to be output by one or more modules of the first array under the unbalanced inter-phase condition as compared to a balanced inter-phase condition.

In many of the aforementioned embodiments, the control circuitry can include a master control device and a local control device communicatively coupled with the master control device. The master control device can be configured to determine whether the first array and second array are in an unbalanced condition. The master control device can be configured to cause the local control device to generate one or more control signals for the switch circuitry that cause adjustment of energy supplied by the energy source to one of the first and second arrays. The master control device can be configured to modulate a normalized reference signal and output the modulated signal to the local control device. The master control device can be configured to output a reference signal and a modulation index to the local control device, and the local control device can be configured to adjust the reference signal based on the modulation index. The control circuitry can be configured to perform inter-phase balancing by adjusting one or more modulation indexes.

In some embodiments the load is a primary load and the interconnection module is configured to electrically couple to an auxiliary load. The interconnection module can include switch circuitry coupled with an inductor to regulate a voltage supply to the auxiliary load.

In some embodiments, the load is a primary load and the interconnection module is configured to electrically couple to an auxiliary load, and the control circuitry can be configured to measure a voltage and/or a current for the auxiliary load and control switch circuitry of the interconnection module to regulate a voltage or current supply to the auxiliary load.

In some embodiments, each module of the first array includes an energy source and switch circuitry, and each module of the second array includes an energy source and switch circuitry.

In some embodiments, each module in the system includes a local control device and a common housing, and the switch circuitry, energy source, and local control device for that module are housed within the common housing.

In some embodiments, each module in the system includes a local control device, a first housing, and a second housing, and the local control device and switch circuitry for that module are located in the first housing and the energy source for that module is located in the second housing, and the first and second housings are physically joined to each other.

In some embodiments, each module in the system includes a local control device, a first housing, a second housing, and a third housing, where the local control device for that module is located in the first housing, the switch circuitry for that module is located in the second housing, and the energy source for that module is located in the third housing, and the first, second, and third housings are physically joined together.

In some embodiments, for each module of the system, the switch circuitry and local control device are located on a first printed circuit board.

In some embodiments, the control circuitry is configured to: determine an amount of inter-phase imbalance between the first and second arrays; cause the interconnection module to adjust net energy output to decrease the amount of inter-phase imbalance if below a threshold; and cause a shift to a neutral point of the system to adjust net energy output to decrease the amount of interphase imbalance if above the threshold. The control circuitry can be configured to also cause the interconnection module to adjust net energy output to assist in decrease of the amount of inter-phase imbalance if the amount of interphase imbalance is above the threshold.

In many embodiments, a method of inter-phase balancing in a system is provided, where the system includes a first array of cascaded modules configured to output a first voltage waveform to a load, a second array of cascaded modules configured to output a second voltage waveform to the load, where the first and second voltage waveforms each have a different phase angle, an interconnection module coupled to both the first array and the second array, and control circuitry, and the method includes: determining, by the control circuitry, that an unbalanced condition exists between the first array and second array; and adjusting energy supplied from an energy source of the interconnection module to the first array.

In some embodiments, adjusting energy supplied from the energy source includes increasing net energy supplied from the energy source. The method can further include reducing net energy output by at least one module of the first array. The increase in net energy can be equivalent to the reduction in net energy. The method can further include reducing net energy supplied by all modules of the first array. The method can further include maintaining relative amounts of net energy output from the interconnection module to the second array and from the modules of the second array at a constant level.

In some embodiments, the method further includes: reducing net energy output from the interconnection module to the second array; and increasing net energy output by at least one module of the second array.

In some embodiments, the method further includes increasing a modulation index for switch circuitry of the interconnection module coupled to the first array in order to increase net energy supplied from the energy source of the interconnection module to the first array. The method can further include decreasing a modulation index for the at least one module of the first array to reduce net energy output by at least one module of the first array.

In some embodiments, the unbalanced condition is that the first array has a relatively lower overall energy level than the second array.

In some embodiments, the method further includes receiving, by the control circuitry, state of charge information from each module of the first and second arrays; and determining, by the control circuitry, if the first array has a relatively lower overall state of charge prior to increasing net energy supplied from an energy source of the interconnection module to the first array.

In some embodiments, the unbalanced condition is that the first array has a relatively higher temperature than the second array.

In some embodiments, the method further includes receiving temperature information from each module of the first and second arrays; and determining if the first array has a relatively higher temperature than the second array prior to increasing net energy supplied from an energy source of the interconnection module to the first array.

In some embodiments, the control circuitry is configured to use the interconnection module to control a balance of inter-phase energy between the first and second arrays.

In some embodiments, the control circuitry includes a master control device and a local control device communicatively coupled with the master control device. The method can further include determining, by the master control device, whether the first array and second array are in an unbalanced condition. The method can further include causing the local control device to generate one or more control signals for the switch circuitry that cause adjustment of energy supplied by the interconnection module to one of the first and second arrays. The method can further include modulating a normalized reference signal and outputting the modulated signal to the local control device. The method can further include outputting a reference signal and a modulation index to the local control device; and adjusting the reference signal based on the modulation index.

In some embodiments, the load is a primary load, and the method further includes providing voltage from the interconnection module to an auxiliary load. The method can further include regulating the voltage supplied by the interconnection module to the auxiliary load. The method can further include measuring a voltage and/or a current for the auxiliary load; and controlling switch circuitry of the interconnection module to regulate the voltage supplied to the auxiliary load.

In some embodiments, adjusting energy supplied from the energy source of the interconnection module to the first array includes reducing net energy supplied from the energy source. The interconnection module can supply energy for both the first and second arrays during a balanced condition. The method can further include increasing net energy output by at least one module of the first array. The increase in net energy is equivalent to the reduction in net energy. The method can further include increasing net energy supplied by all modules of the first array. The method can further include maintaining relative amounts of net energy output from the interconnection module to the second array and from the modules of the second array at a constant level. The method can further include increasing net energy output from the interconnection module to the second array; and reducing net energy output by at least one module of the second array. The method can further include decreasing a modulation index for switch circuitry of the interconnection module coupled to the first array in order to reduce net energy supplied from the energy source of the interconnection module to the first array.

In some embodiments, the method further includes determining or estimating, by the control circuitry, energy output adjustments that cause the first and second array to converge to a balanced condition.

In some embodiments, the unbalanced condition relates to state of charge, temperature, capacity, state of health, voltage, and/or current.

In some embodiments, the method further includes using the interconnection module and neutral point shifting to control a balance of inter-phase energy between the first and second arrays.

In some embodiments, the first and second voltage waveforms are generated according to a pulse width modulation or hysteresis technique.

In some embodiments, the interconnection module supplies energy for both the first and second arrays during a balanced condition.

In some embodiments, the method further includes performing inter-phase balancing by adjusting one or more modulation indexes.

In some embodiments, determining, by the control circuitry, that an unbalanced condition exists between the first array and second array includes referencing one or more types of qualitative or quantitative information.

In some embodiments, determining, by the control circuitry, that an unbalanced condition exists between the first array and second array includes referencing an SOC parameter of or characterizing one array being less than, more than, or substantially different than the SOC parameter for at least one different array or the system as a whole.

In some embodiments, determining, by the control circuitry, that an unbalanced condition exists between the first array and second array includes referencing a temperature parameter of or characterizing one array being less than, more than, or substantially different than the temperature parameter for at least one different array or the system as a whole.

In some embodiments, determining, by the control circuitry, that an unbalanced condition exists between the first array and second array includes referencing a State of Health (SOH) parameter of or characterizing one array being less than, more than, or substantially different than the SOH parameter for at least one different array or the system as a whole.

In some embodiments, determining, by the control circuitry, that an unbalanced condition exists between the first array and second array includes referencing a voltage parameter of or characterizing one array being less than, more than, or substantially different than the voltage parameter for at least one different array or the system as a whole.

In some embodiments, determining, by the control circuitry, that an unbalanced condition exists between the first array and second array includes referencing a current parameter of or characterizing one array being less than, more than, or substantially different than the current parameter for at least one different array or the system as a whole.

In some embodiments, determining, by the control circuitry, that an unbalanced condition exists between the first array and second array includes referencing a fault or degradation condition.

In some embodiments, the determination that an unbalanced condition exists between the first array and second array is based on a relative difference between the first and second arrays or an absolute factor.

In some embodiments, the method further includes: determining an amount of inter-phase imbalance between the first and second arrays; adjusting net energy output of the interconnection module to decrease the amount of inter-phase imbalance if below a threshold; and shifting a neutral point of the system to adjust net energy output to decrease the amount of interphase imbalance if above the threshold. In some embodiments, the method further includes adjusting net energy output of the interconnection module to assist in decreasing the amount of interphase imbalance if above the threshold.

In many embodiments a control system is provided that is configured to provide control for an module-based energy storage system including a first array of cascaded modules configured to output a first voltage waveform to a load, a second array of cascaded modules configured to output a second voltage waveform to the load, where the first and second voltage waveforms each have a different phase angle, and an interconnection module coupled to both the first array and the second array, where the control system includes: control circuitry and non-transitory memory communicatively coupled to the control circuitry, where a plurality of instructions are stored on the memory that, when executed by the control circuitry, cause the control circuitry to: determine that an unbalanced condition exists between the first array and second array; and cause adjustment of energy supplied from an energy source of the interconnection module to the first array.

In some embodiments, the plurality of instructions further cause the control circuitry to cause an increase in net energy supplied from the energy source of the interconnection module to the first array. The plurality of instructions can further cause the control circuitry to cause a reduction in net energy output by at least one module of the first array. The increase in net energy can be equivalent to the reduction in net energy. The plurality of instructions can further cause the control circuitry to cause a reduction of net energy supplied by all modules of the first array. The plurality of instructions can further cause the control circuitry to cause relative amounts of net energy output from the interconnection module to the second array and from the modules of the second array to be at a constant level. The plurality of instructions can further cause the control circuitry to cause a reduction in net energy output from the interconnection module to the second array and an increase in net energy output by at least one module of the second array.

In some embodiments, the plurality of instructions can further cause the control circuitry to increase a modulation index for switch circuitry of the interconnection module coupled to the first array in order to increase net energy supplied from the energy source of the interconnection module to the first array. The plurality of instructions can further cause the control circuitry to decrease a modulation index for the at least one module of the first array to reduce net energy output by at least one module of the first array.

In some embodiments, the unbalanced condition is that the first array has a relatively lower overall energy level than the second array.

In some embodiments, the plurality of instructions further cause the control circuitry to determine if the first array has a relatively lower overall state of charge prior to causing an increase in net energy supplied from an energy source of the interconnection module to the first array.

In some embodiments, the unbalanced condition is that the first array has a relatively higher temperature than the second array.

In some embodiments, the plurality of instructions further cause the control circuitry to determine if the first array has a relatively higher temperature than the second array prior to causing an increase in net energy supplied from an energy source of the interconnection module to the first array.

In some embodiments, the plurality of instructions further cause the control circuitry to cause a balance of inter-phase energy between the first and second arrays.

In some embodiments, the control circuitry includes a master control device and a local control device communicatively coupled with the master control device. The plurality of instructions can further cause the control circuitry to generate one or more control signals for the switch circuitry that cause adjustment of energy supplied by the interconnection module to one of the first and second arrays.

In some embodiments, the plurality of instructions can further cause the control circuitry to modulate a normalized reference signal with a modulation index.

In some embodiments, the load is a primary load, and the plurality of instructions further cause the control circuitry to regulate voltage provided from the interconnection module to an auxiliary load. The plurality of instructions can further cause the control circuitry to control switch circuitry of the interconnection module to regulate the voltage supplied to the auxiliary load.

In some embodiments, the plurality of instructions further cause the control circuitry to reduce net energy supplied from the energy source of the interconnection module to the first array. The plurality of instructions can further cause the control circuitry to cause the interconnection module to supply energy for both the first and second arrays during a balanced condition. The plurality of instructions can further cause the control circuitry to cause an increase of net energy output by at least one module of the first array. The increase in net energy is equivalent to the reduction in net energy. The plurality of instructions can further cause the control circuitry to increase net energy supplied by all modules of the first array. The plurality of instructions can further cause the control circuitry to cause relative amounts of net energy output from the interconnection module to the second array and from the modules of the second array to remain at a constant level. The plurality of instructions can further cause the control circuitry to: increase net energy output from the interconnection module to the second array; and reduce net energy output by at least one module of the second array. The plurality of instructions can further cause the control circuitry to decrease a modulation index for switch circuitry of the interconnection module coupled to the first array in order to reduce net energy supplied from the energy source of the interconnection module to the first array.

In some embodiments, the plurality of instructions further cause the control circuitry to determine or estimate energy output adjustments that cause the first and second array to converge to a balanced condition.

In some embodiments, the plurality of instructions further cause the control circuitry to the unbalanced condition relates to state of charge, temperature, capacity, state of health, voltage, and/or current.

In some embodiments, the plurality of instructions further cause the control circuitry to control the energy storage system to generate the first and second voltage waveforms according to a pulse width modulation or hysteresis technique.

In some embodiments, the plurality of instructions further cause the control circuitry to cause the interconnection module to supply energy for both the first and second arrays during a balanced condition.

In some embodiments, the plurality of instructions further cause the control circuitry to control the system to converge towards an inter-phase balanced condition by adjustment of modulation indexes of the system.

In some embodiments, the plurality of instructions further cause the control circuitry to determine that the unbalanced condition exists between the first array and second array by reference to an SOC parameter of or characterizing one array that is less than, more than, or substantially different than an SOC parameter for at least one different array or the system as a whole.

In some embodiments, the plurality of instructions further cause the control circuitry to determine that the unbalanced condition exists between the first array and second array by reference to a temperature parameter of or characterizing one array that is less than, more than, or substantially different than the temperature parameter for at least one different array or the system as a whole.

In some embodiments, the plurality of instructions further cause the control circuitry to determine that the unbalanced condition exists between the first array and second array by reference to a fault or degradation condition.

In some embodiments, the plurality of instructions further cause the control circuitry to use the interconnection module and neutral point shifting to control a balance of inter-phase energy between the first and second arrays.

In some embodiments, the plurality of instructions further cause the control circuitry to: determine an amount of inter-phase imbalance between the first and second arrays; cause the interconnection module to adjust net energy output to decrease the amount of inter-phase imbalance if below a threshold; and cause a shift to a neutral point of the system to adjust net energy output to decrease the amount of interphase imbalance if above the threshold. The plurality of instructions can further cause the control circuitry to also use the interconnection module to adjust net energy output to decrease the amount of inter-phase imbalance if the amount of interphase imbalance is above the threshold.

In some embodiments, the processing circuitry includes a plurality of processors and the memory includes a plurality of discrete memory devices.

In many embodiments, a module-based energy system is provided, the system including: a first array of cascaded modules configured to output a first voltage waveform to a load; a second array of cascaded modules configured to output a second voltage waveform to the load; a third array of cascaded modules configured to output a third voltage waveform to the load, where the first, second, and third voltage waveforms each have a different phase angle; a first interconnection module coupled to both the first array and the second array, where the first interconnection module includes a first energy source and first switch circuitry; and a second interconnection module coupled to the third array, where the second interconnection module includes a second energy source and second switch circuitry, where the first and second energy sources are electrically coupled together, and where the first interconnection module is configured to adjust the amount of energy supplied by the first and second energy sources to the first and/or second arrays, and where the second interconnection module is configured to adjust the amount of energy supplied by the first and second energy sources to the third array.

In some embodiments, the first array and second array are positioned electrically between the load and the first interconnection module, and the third array is positioned electrically between the load and the second interconnection module.

In some embodiments, the system further includes control circuitry configured to control the first and second switch circuitry, where the first energy source has a positive node and a negative node that are shared with the second energy source, and where the first switch circuitry is controllable to selectively couple the first and/or second arrays to the first and/or second nodes, and the second switch circuitry is controllable to selectively couple the third array to the first and/or second nodes. The control circuitry can be configured to control the first and second switch circuitry to adjust relative energy output from the first and second energy sources to one of the first, second, and third arrays to mitigate an imbalance of charge or temperature between at least two of the first, second, and third arrays. The control circuitry can be configured to control the balance of inter-phase energy between the first, second, and third arrays with a shift to a neutral point of the first, second, and third arrays. The control circuitry can be configured to control the first and second switch circuitry, under a balanced inter-phase condition, such that the first interconnection module supplies energy for both the first and second arrays and the second interconnection module supplies energy for the third array. The net energy supplied to the first, second, and third arrays can be the same for a period of time.

In many embodiments, a module-based energy system is provided, the system including: a first battery pack including a first plurality of arrays of cascaded converter modules configured to output a first plurality of voltage waveforms to power a first motor, each of the first plurality of voltage waveforms having a different phase angle; a second battery pack including a second plurality of arrays of cascaded converter modules configured to output a second plurality of voltage waveforms to power a second motor, each of the second plurality of voltage waveforms having a different phase angle; and an interconnection module coupled to a first array of the first plurality of arrays and a second array of the second plurality of arrays, where the interconnection module includes an energy source and switch circuitry, where the interconnection module is configured to adjust the amount of energy supplied by the energy source to the first and/or second arrays.

In some embodiments, the first battery pack includes a first housing, and the first plurality of arrays are co-located in the first housing, and where the second battery pack includes a second housing, and the second plurality of arrays are co-located in the second housing. The interconnection module can be located in the first housing.

In some embodiments, the first and second motors are in-wheel motors of an electric vehicle.

In many embodiments, the system further includes control circuitry configured to monitor operating parameters of the first and second battery packs and to cause the system to balance energy between the first battery pack and the second batter pack with the interconnection module. The control circuitry can be configured to control the switch circuitry such that the energy source discharges relatively more energy to the first array than to the second array under an unbalanced condition between the first and second arrays.

In some embodiments, the interconnection module is a first interconnection module, the energy source is a first energy source, and the switch circuitry is first switch circuitry, the system further including: a third battery pack including a third plurality of arrays of cascaded converter modules configured to output a third plurality of voltage waveforms to power a third motor, each of the third plurality of voltage waveforms having a different phase angle; a fourth battery pack including a fourth plurality of arrays of cascaded converter modules configured to output a fourth plurality of voltage waveforms to power a fourth motor, each of the fourth plurality of voltage waveforms having a different phase angle; and a second interconnection module coupled to a third array of the third plurality of arrays and a fourth array of the fourth plurality of arrays, where the second interconnection module includes a second energy source and second switch circuitry, where the second interconnection module is configured to adjust the amount of energy supplied by the second energy source to the third and/or fourth arrays. The first, second, third, and fourth motors can be in-wheel motors of a four wheel electric vehicle.

Processing circuitry can include one or more processors, microprocessors, controllers, and/or microcontrollers, each of which can be a discrete or stand-alone chip or distributed amongst (and a portion of) a number of different chips. Any type of processing circuitry can be implemented, such as, but not limited to, personal computing architectures (e.g., such as used in desktop PC's, laptops, tablets, etc.), programmable gate array architectures, proprietary architectures, custom architectures, and others. Processing circuitry can include a digital signal processor, which can be implemented in hardware and/or software. Processing circuitry can execute software instructions stored on memory that cause processing circuitry to take a host of different actions and control other components.

Processing circuitry can also perform other software and/or hardware routines. For example, processing circuitry can interface with communication circuitry and perform analog-to-digital conversions, encoding and decoding, other digital signal processing, multimedia functions, conversion of data into a format (e.g., in-phase and quadrature) suitable for provision to communication circuitry, and/or can cause communication circuitry to transmit the data (wired or wirelessly).

Any and all signals described herein can be communicated wirelessly except where noted or logically implausible. Communication circuitry can be included for wireless communication. The communication circuitry can be implemented as one or more chips and/or components (e.g., transmitter, receiver, transceiver, and/or other communication circuitry) that perform wireless communications over links under the appropriate protocol (e.g., Wi-Fi, Bluetooth, Bluetooth Low Energy, Near Field Communication (NFC), Radio Frequency Identification (RFID), proprietary protocols, and others). One or more other antennas can be included with communication circuitry as needed to operate with the various protocols and circuits. In some embodiments, communication circuitry can share antenna for transmission over links. Processing circuitry can also interface with communication circuitry to perform the reverse functions necessary to receive a wireless transmission and convert it into digital data, voice, and/or video. RF communication circuitry can include a transmitter and a receiver (e.g., integrated as a transceiver) and associated encoder logic.

Processing circuitry can also be adapted to execute the operating system and any software applications, and perform those other functions not related to the processing of communications transmitted and received.

Computer program instructions for carrying out operations in accordance with the described subject matter may be written in any combination of one or more programming languages, including an object oriented programming language such as Java, JavaScript, Smalltalk, C++, C #, Transact-SQL, XML, PHP or the like and conventional procedural programming languages, such as the "C" programming language or similar programming languages.

Memory, storage, and/or computer readable media can be shared by one or more of the various functional units present, or can be distributed amongst two or more of them (e.g., as separate memories present within different chips). Memory can also be a separate chip of its own.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and variants thereof.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A module-based energy system, comprising:
a first battery pack comprising a first plurality of arrays of cascaded converter modules configured to output a first plurality of AC voltage waveforms to power a first multi-phase motor, wherein:
- each of the cascaded converter modules in the first plurality of arrays comprises an energy source and is controllable to selectively output a respective output voltage;
- in each array of the first plurality of arrays, the cascaded converter modules are coupled together to output one of the first plurality of AC voltage waveforms comprising a superposition of the respective output voltages of that respective array;
- the first plurality of arrays of cascaded converter modules comprises first, second and third arrays of cascaded converter modules;

a second battery pack comprising a second plurality of arrays of cascaded converter modules configured to output a second plurality of AC voltage waveforms to power a second multi-phase motor, wherein:
- each of the cascaded converter modules in the second plurality of arrays comprises an energy source and is controllable to selectively output a respective output voltage;
- in each array of the second plurality of arrays, the cascaded converter modules are coupled together to output one of the second plurality of AC voltage waveforms comprising a superposition of the respective output voltages of that respective array;
- the second plurality of arrays of cascaded converter modules comprises first, second and third arrays of cascaded converter modules; and
- each respective array of the first plurality of arrays of the first battery pack is singly coupled to only a single respective array in the second plurality of arrays of the second battery pack by a series coupling of a first converter module in the respective array of the first plurality of arrays and a first converter module in the respective array of the second plurality of arrays such that energy can be transferred between the respective array of the first plurality of arrays and the respective array of the second plurality of arrays; and control circuitry coupled to each array of the first plurality of arrays and each array of the second plurality of arrays, the control circuitry configured to monitor one or more operating parameters of the cascaded converter modules in the first plurality of arrays and the second plurality of arrays and generate control signals that cause transfer of energy between the respective arrays of the first plurality of arrays and the respective arrays of the second plurality of arrays.

2. The module-based energy system of claim 1, further comprising:
- a first energy source coupled to a first array of the first plurality of arrays and a first array of the second plurality of arrays;
- a second energy source coupled to a second array of the first plurality of arrays and a second array of the second plurality of arrays; and
- a third energy source coupled to a third array of the first plurality of arrays and a third array of the second plurality of arrays;

wherein the control circuitry is configured to:
- detect an unbalanced condition between the first plurality of arrays and the second plurality of arrays; and
- in response to detecting the unbalanced condition, generate control signals that cause a respective energy source coupled to respective arrays in the first plurality of arrays and the second plurality of arrays to discharge different amounts of energy to the respective arrays.

3. The module-based energy system of claim 2, wherein the control circuitry is further configured to generate a respective modulation index for each of the first energy source, second source, and third energy source, wherein each modulation index controls the discharge of the different amounts of energy to the respective arrays.

4. The module-based energy system of claim 2, wherein the unbalanced condition comprises at least one of (i) the first plurality of arrays having a lower overall energy level than the second plurality of arrays or (ii) the first array of the first plurality of arrays to which the energy source is coupled has a lower overall energy level than the first array of the second plurality of arrays to which the energy source is coupled.

5. The module-based energy system of claim 2, wherein the unbalanced condition comprises (i) a difference in charge, temperature, capacity, state of health, voltage, and/or current between the first plurality of arrays and the second plurality of arrays and/or (ii) a difference in charge, temperature, capacity, state of health, voltage, and/or current between the first array of the first plurality of arrays to which the energy source is coupled and the first array of the second plurality of arrays to which the energy source is coupled.

6. The module-based energy system of claim 1, wherein:
- each array of the first plurality of arrays and each array of the second plurality of arrays have a same quantity of cascaded converter modules;
- all cascaded modules of each array of the first plurality of arrays are series connected to a respective phase of the first multi-phase motor; and
- all cascaded modules of each array of the second plurality of arrays are series connected to a respective phase of the second multi-phase motor.

7. The module-based energy system of claim 1, wherein:
- the first battery pack comprises a first housing, and the first plurality of arrays are co-located in the first housing;
- the second battery pack comprises a second housing, and the second plurality of arrays are co-located in the second housing; and
- the first housing is different from the second housing.

8. The module-based energy system of claim 1, wherein the first multi-phase motor and the second multi-phase motor are drive motors of an electric vehicle.

9. The module-based energy system of claim 1, wherein at least one of the first voltage and first frequency is different from at least one of the second voltage and second frequency.

10. The module-based energy system of claim 1, wherein the module-based energy system comprises a connection to supply auxiliary power to an auxiliary power load, wherein the connection is located in a position between a respective one of the first plurality of arrays and a respective one of the second plurality of arrays.

11. The module-based energy system of claim 1, wherein the control circuitry is configured to generate control signals that cause transfer of energy between a respective array of the first plurality of arrays and a respective array of the second plurality of arrays with neutral point shifting.

12. A method of transferring energy in a system comprising a first battery pack comprising a first plurality of arrays of cascaded converter modules configured to output a first plurality of AC voltage waveforms to power a first multi-phase motor and a second battery pack comprising a second plurality of arrays of cascaded converter modules configured to output a second plurality of AC voltage waveforms to power a second multi-phase motor, wherein each cascade converter includes an energy source and is controllable to selectively output a respective output voltage, the method comprising:
- respectively connecting the first plurality of arrays of the first battery pack to the second plurality of arrays of the second battery pack in respective series connections such that each respective array in the first plurality of arrays is connected to only a single respective array in the second plurality of arrays so that energy can be transferred between the respectively connected arrays of the first plurality of arrays and a respective array of the second plurality of arrays; and
- monitoring one or more operating parameters of the cascaded converter modules in the first plurality of arrays and the second plurality of arrays;
- based on the monitoring of the one or more operating parameters, generating control signals for control circuitry that cause the transfer of energy between the respective arrays of the first plurality of arrays and the respective arrays of the second plurality of arrays.

13. The method of claim 12, further comprising:
- detecting an unbalanced condition between the first plurality of arrays and the second plurality of arrays; and
- in response to detecting the unbalanced condition, generating control signals that cause a respective energy source coupled to respective arrays in the first plurality of arrays and the second plurality of arrays to discharge different amounts of energy to the respective arrays.

14. The method of claim 13, further comprising generating a respective modulation index for each of the energy sources, wherein each modulation index controls the discharge of the different amounts of energy to the respective arrays.

15. The method of claim 13, wherein the unbalanced condition comprises at least one of (i) the first plurality of arrays having a lower overall energy level than the second plurality of arrays or (ii) the first array of the first plurality of arrays to which the energy source is coupled has a lower overall energy level than the first array of the second plurality of arrays to which the energy source is coupled.

16. The method of claim 13, wherein the unbalanced condition comprises (i) a difference in charge, temperature, capacity, state of health, voltage, and/or current between the first plurality of arrays and the second plurality of arrays and/or (ii) a difference in charge, temperature, capacity, state of health, voltage, and/or current between the first array of the first plurality of arrays to which the energy source is coupled and the first array of the second plurality of arrays to which the energy source is coupled.

17. The method of claim 12 further comprising generating control signals that cause the transfer of energy between the respective array of the first plurality of arrays and the respective array of the second plurality of arrays with neutral point shifting.

* * * * *